United States Patent [19]

Schultz et al.

[11] 4,413,319

[45] Nov. 1, 1983

[54] PROGRAMMABLE CONTROLLER FOR EXECUTING BLOCK TRANSFER WITH REMOTE I/O INTERFACE RACKS

[75] Inventors: Ronald E. Schultz, Willoughby; Jonathan S. Veres, Garfield Heights; Mark J. German, Cleveland Heights, all of Ohio

[73] Assignee: Allen-Bradley Company, Milwaukee, Wis.

[21] Appl. No.: 242,132

[22] Filed: Mar. 9, 1981

[51] Int. Cl.³ .............................................. G06F 9/06
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,413,612 | 11/1968 | Brooks et al. | 364/200 |
| 3,500,466 | 3/1970 | Carleton | 364/200 |
| 3,651,484 | 3/1972 | Smeallie | 364/200 |
| 4,254,473 | 3/1981 | Galdun et al. | 364/900 |
| 4,293,924 | 10/1981 | Struger et al. | 364/900 |

*Primary Examiner*—Harvey E. Springborn
*Attorney, Agent, or Firm*—Quarles & Brady

[57] ABSTRACT

A programmable controller has a main processor and a scanner circuit in a unit that is connected through a multi-channel, multi-drop serial data link to a plurality of remotely located I/O racks. The I/O racks are adapted for connection to I/O devices connected to control a machine or process. The I/O racks each have an adapter module that communicates with a plurality of I/O modules in its rack. The adapter modules in the various racks are connected through the serial data link to a scanner circuit. Using a series of messages, the scanner circuit and the adapters couple both words of I/O status data for low density I/O modules and blocks of I/O status data for high density I/O modules. The scanner circuit also interfaces the main processor to the serial data link, coupling both conventional I/O status data and blocks of I/O status data from the main processor and organizing this data in messages for transmission over the serial data link.

19 Claims, 32 Drawing Figures

Microfiche Appendix Included
(3 Microfiche, 85 Pages)

CONTROL LOGIC "A" CIRCUIT

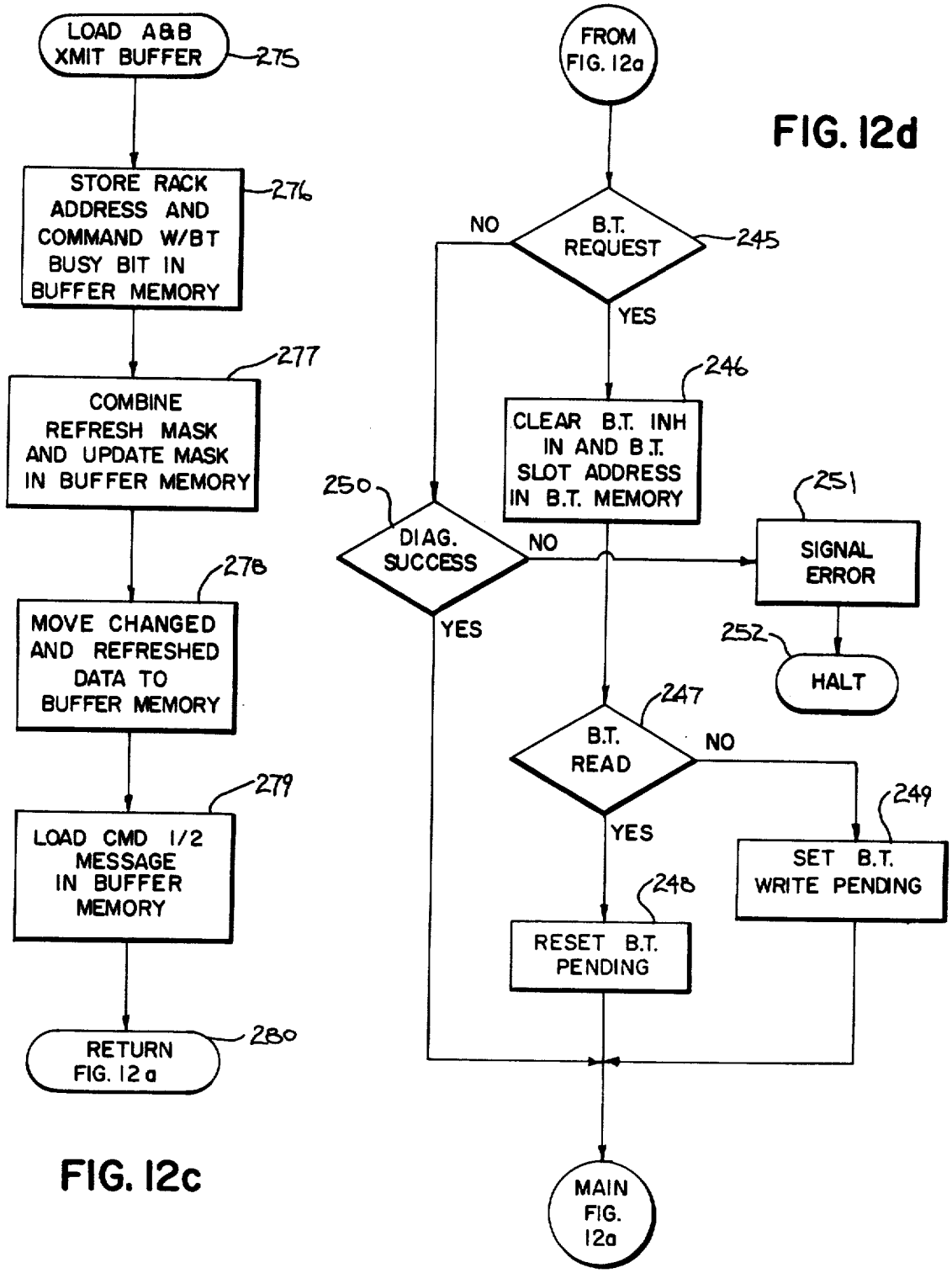

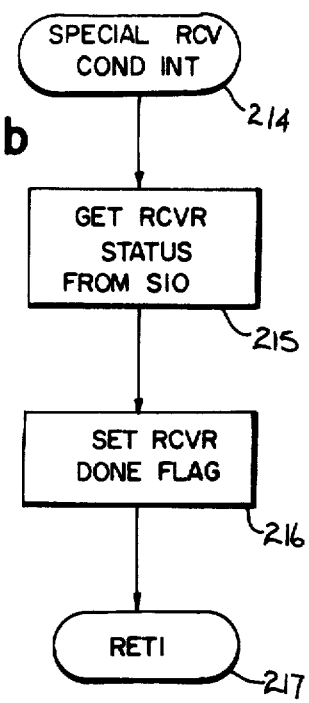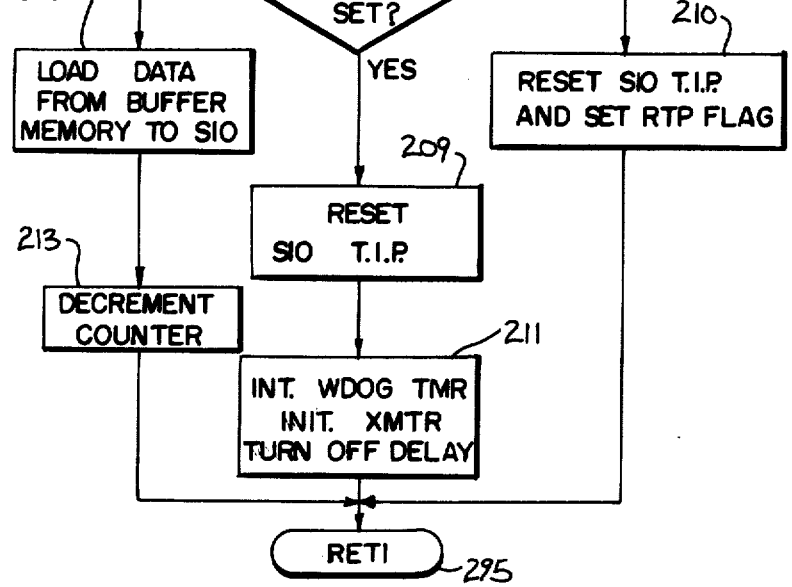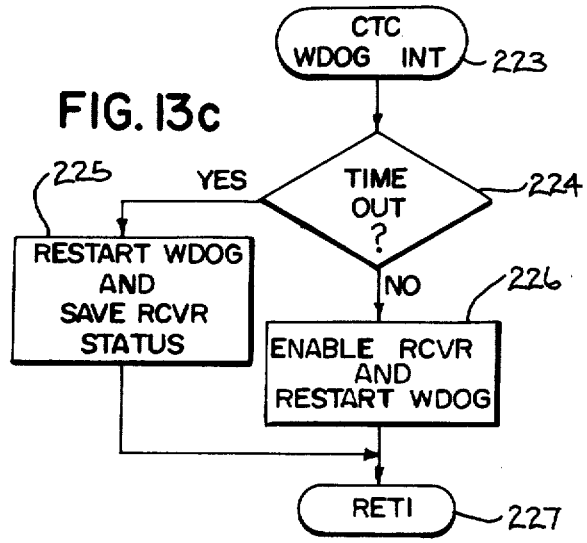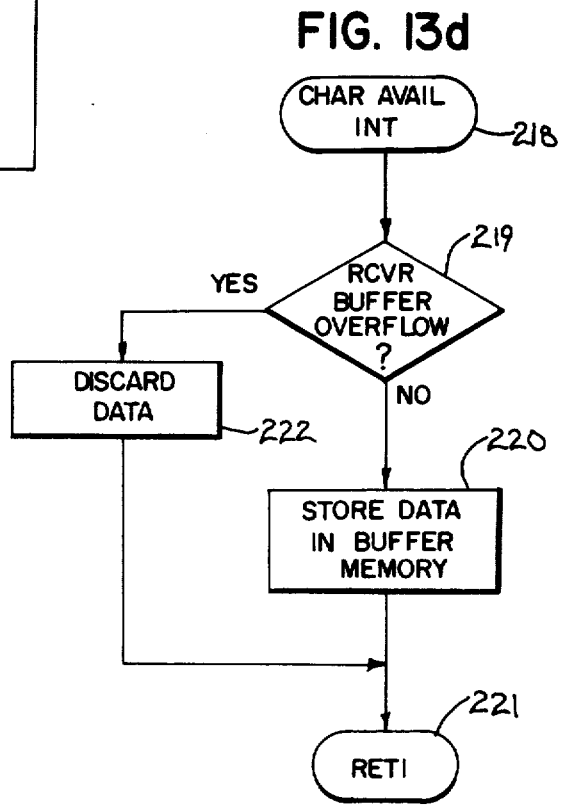

PROGRAMMABLE CONTROLLER FOR EXECUTING BLOCK TRANSFER WITH REMOTE I/O INTERFACE RACKS

The microfiche appendices are included with the file.

BACKGROUND OF THE INVENTION

The invention relates to digital controllers that are used to control industrial machines and processes.

A programmable controller typically has a main processor that is connected through one or more I/O interface modules to I/O devices that control a machine or process. In early controllers the main processors and the I/O modules were housed separately, the I/O modules being placed in an I/O rack that was located near the machine or process being controlled. Several of these I/O racks could be placed at different locations and connected through cables to the main processor, however, the length of the cables between the I/O modules and the main processor was limited, because such cables were used for parallel data transmission.

Another type of programmable controller has provided a processor and I/O racks that could communicate over serial transmission lines, to permit the I/O racks to be located more remotely, at destinations up to 10,000 feet away from the main processor. Such a controller is described in Galdun et al, U.S. Pat. No. 4,254,473 issued Mar. 3, 1981, entitled "Rack Adapter for Serially Connected I/O Interface Racks," and assigned to the assignee of the present invention. This system employs a scanner circuit of an earlier period with a processor-based adapted circuit that allows serial connection of I/O racks along serial data channels. The scanner and adapted transmit words of conventional I/O status data in a synchronized, bit-oriented fashion.

The ability to interface I/O devices with a programmable controller has been recently enhanced with the invention of intelligent high density I/O modules of the type disclosed in Struger et al, U.S. Pat. No. 4,293,924, issued Oct. 6, 1981, and assigned to the assignee of the present invention. Such high density I/O modules provide the I/O capacity to up to eight conventional I/O modules and are well-suited for interfacing analog I/O devices to the main processor. Because the scanner and adapter shown in Galdun et al, U.S. Pat. No. 4,254,473 are not operable with such high density modules, block transfer of data to and from high density modules has been limited to single rack systems where the main processor is located in the same rack as the high density module, or to local systems, where the main processor is located within 50 feet of its I/O interface rack. Block transfer has also been limited to a single I/O rack per channel in local systems that have multiple communication channels connected in parallel.

SUMMARY OF THE INVENTION

The invention is incorporated in a digital controller in which a multiword block of I/O status data is coupled through a serial data link between a main processor unit and an individual destination address within a remotely located I/O interface rack in response to a block request signal from a module at that address. The invention is partly embodied in a scanner circuit, which is provided to couple the multiword block of I/O status data between the main processor and one end of the serial data link. The invention is also partly embodied in an adapter circuit, which is provided in each I/O interface rack to couple blocks of I/O status data between the serial data link and one or more intelligent high density I/O modules within its rack.

The scanner circuit executes a rack-oriented I/O scan in which I/O status information for each one of a plurality of physical groups of I/O modules is coupled in a single serial data message to or from the adapter circuit associated with each group. The serial data message includes address and control information that allows the receiving circuit, which may be either the scanner circuit or the adapter circuit, to associate the I/O status information with a specific physical group of I/O modules. By coupling a series of such serial data messages, the scanner scans all of the remotely located, physical groups of I/O modules connected to a particular serial data channel. This remote I/O scanning technique differs from prior systems wherein the scanner distributed I/O status data without accompanying address data, and wherein the scanner relied on the adapter circuits to recognize the I/O status data based on the time interval in which the I/O status data was received relative to a synchronizing signal.

The scanner circuit and adapter circuit of the present invention are thus different from the prior art in a first respect in the technique they use for coupling I/O status data to and from the typical eight-bit and sixteen-bit capacity I/O modules of the prior art. The scanner circuit and adapter circuit are also distinguishable in a second respect in coupling block transfer serial data messages, in which a multiword block of I/O status data associated with a single, high capacity or "high density" I/O module is included within a single message. Still further, the scanner circuit and adapter circuit are able to insert the block transfer messages, as needed, within a sequence of the more common messages that convey I/O status data for the lower capacity I/O modules.

The high density I/O module is an intelligent, processor directed I/O module that performs its own sequential addressing of I/O devices to distribute and collect I/O status data. The high density I/O module also communicates with the adapter circuit to signal when it is ready for transfer of a multiword block of I/O status data. This signal is referred to as a "block transfer request signal" and this signal is relayed by the adapter circuit to the scanner circuit, which initiates the block transfer messages. The scanner circuit also cooperates with the main processor, which ultimately operates on the I/O status data to provide centralized control of the I/O devices connected to the high density I/O module.

One broad aspect of the invention is to provide a programmable controller in which block transfers of data are made over a serial communication link between a main processor-scanner unit and remotely located I/O interface racks. To accomplish this, the scanner circuit couples parallel I/O status data with the main processor during a main I/O scan sequence that is interruptible to perform block transfers. The scanner circuit also couples serial I/O status data with the adapter circuit during a system I/O scan in which special messages are automatically inserted in the scanning sequence to perform block transfers of I/O status data for I/O modules that generate request signals for such transfers.

A more detailed aspect of the invention is the execution of block transfers to and from multiple I/O racks that are connected through the same serial data channel to a main processor-scanner unit. Through communication of control signals over the serial data link, the scanner circuit and the adapter circuit provide a means to service a plurality of randomly distributed high density I/O modules at a reasonable scan rate.

Another detailed aspect of the invention involves the adapter circuit which performs module I/O scanning of the type performed by a main processor in a local I/O system. Together, the adapter circuit and the high density I/O module provide a two-tier peripheral scan of I/O devices at a remote location. The adapter scanner is well-suited for coupling normally sized words of I/O status data to non-intelligent I/O modules that do not have scanning capability, however, it is found to be advantageous for the adapter circuit to treat block transfers in a different manner. Therefore, the adapter circuit senses the type of I/O transfer and couples block transfer data "on the fly" to high density I/O modules, rather than coupling such data in the adapter I/O scan, for which the data must be stored temporarily in a buffer memory.

Another detailed aspect of the scanner circuit is the provision of the serial processor to scan the rack adapter circuits through multi-drop serial communication channels and a parallel processor for cooperating with the main processor to perform block transfers during the main I/O scan. The serial processor and the parallel processor share access to the first scanner memory to couple block transfer data. The serial processor uses a second scanner memory as a buffer when coupling data between the first scanner memory and the serial communication channels. The serial processor also shares access to third scanner memory with the main processor to handle conventional I/O data.

In the following description reference is made to the accompanying drawings, which form a part hereof, and in which there is shown by way of illustration a preferred embodiment of the invention. Such embodiment does not necessarily represent the scope of the invention, however, and reference is therefore made to the claims herein for the various aspects of the invention and for interpreting the scope of the invention.

BRIEF DESCRIPTION OF THE DRAWINGS

FIGS. 12a–12f are flow charts of a main program routine and subroutines which are executed by the serial processor of FIG. 3;

FIGS. 13a–13d are flow charts of interrupt service routines executed by the serial processor of FIG. 3.

DETAILED DESCRIPTION OF THE PREFERRED EMBODIMENT

Figure 1:
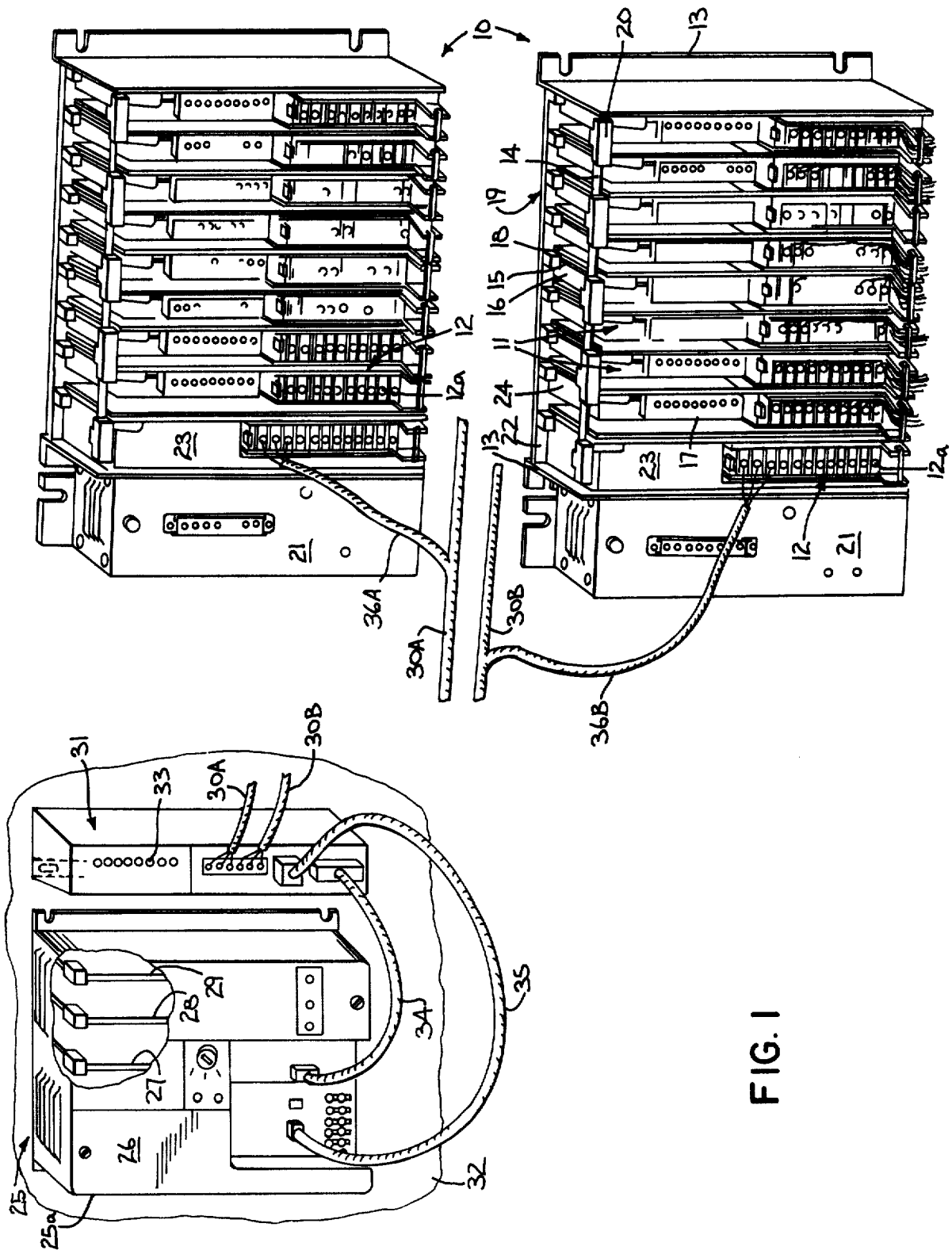
FIG. 1 is a perspective view of a main processor unit and two remote I/O interface racks which embody the present invention and which are part of a programmable controller.

In FIG. 1, a programmable controller illustrates the preferred embodiment of the invention. The controller includes a group of I/O interface racks 10, two of which are seen in FIG. 1. These two I/O interface racks 10 each house eight I/O modules 11 which are connected through terminals 12a on the front of swing-arm, electrical connectors 12 to input and output devices (not shown) on a controlled system, which may be one of many industrial machines or processes that can be controlled with programmable controllers. Typical input devices are photocells, limit switches, selector switches and push buttons, while typical output devices include solenoid-operated hydraulic valves, motor starters, pump drives and pattern switches.

Each I/O interface rack 10 has a pair of upright, spaced apart sidewalls 13 that are connected by rods 14 (not shown) extending laterally therebetween. The rods provide support for guiderails (not shown) that extend from front to back and are paired to support circuit boards 15 included in the I/O modules 11. Besides a circuit board 15 each I/O module 11 has a cover 16 and a group of LED status indicators 17 disposed vertically along the upper front side of the cover 16. The I/O modules 11 slide into upright slots 22 that are separated by substantially parallel, spaced apart, upright barriers 18. The back edge of the circuit board 15 in each I/O module 11 plugs into a back edge connector (not shown) supported by a backplane motherboard 19 that extends across the back of each rack 10 and provides electrical interconnection between the modules 11. The swing-arm connectors 12 pivot around their lower ends to move forward, downward and away from their operating position along the lower front edge of each I/O module 11 so that modules 11 can be removed and replaced in the slots of the I/O interface rack 10. The upper front rod 14 in each I/O interface rack provides support for a group of circuit board latches 20, which hold the I/O modules 11 in place so that the swing-arm connectors 12 can be disconnected when necessary. Further details concerning the frame are disclosed in Struger et al., U.S. Pat. No. 4,151,580, issued Apr. 24, 1979.

The circuit boards 15 in the conventional I/O modules 11 includes either a set of eight input circuits or a set of eight output circuits giving each I/O rack an I/O capacity of sixty-four bits. The I/O modules 11 directly monitor and control the I/O devices on the controlled system. Input circuits which are suitable for this purpose are disclosed in Kiffmeyer, U.S. Pat. No. 3,643,115, issued Feb. 15, 1972, and Kiffmeyer, U.S. Pat. No. 3,992,636, issued Nov. 16, 1976, and output circuits which are suitable for this purpose are disclosed in Struger, U.S. Pat. No. 3,745,546, issued July 10, 1973.

Power for the I/O modules 11 is provided by an auxiliary power supply 21 mounted on the left side wall of each rack 10.

The I/O interface racks 11 each have a lead slot 22, which is the left-most slot in each rack 10. The lead slot 22a is similar to the other slots 22 in the rack 10 except for the connections available on the backplane motherboard 19, which are adapted so that a special adapter module 23 can be received therein as seen in FIG. 1. The conventional I/O modules 11 in the other slots 22 may be replaced with special high density I/O modules of the type described in Struger et al, U.S. Pat. No. 4,293,924, issued Oct. 6, 1981, entitled "Programmable Controller with High Density I/O Interface," and assigned to the assignee of the present invention. Such high density modules are particularly well-suited for connection to analog I/O devices such as position transducers and position controls. One high density module 24 with the bit transfer capacity of eight conventional modules is positioned in I/O slot "0" of the lower rack 10 in FIG. 1.

A main processor unit 25 in FIG. 1 has a main processor enclosure 25a that houses a main power supply 26 in its left one-third portion and a plurality of upright, closely spaced and substantially parallel circuit modules 27–29 in its right two-thirds portion. These modules 27–29 include a processor interface module 27, a main processor module 28 and a memory module 29. The circuit which they form is disclosed in Struger U.S. Pat. No. 4,250,563, issued Feb. 10, 1981. There, a local I/O system is described, wherein the main processor unit is connected through relatively short cables to I/O interface racks at a common location in an industrial environment. The present invention is concerned with a programmable controller having remote I/O interfere racks, which can each be located up to 10,000 feet from the main processor unit. Communication over such distances is performed by transmission of serial data through communication cables 30A and 30B seen in FIG. 1 which form a two-channel serial data link. At one end, the cables 30A and 30B connect to a scanner module 31 that converts between parallel data used for internal processing within the main processor unit 25 and serial data used for communication with the I/O interface racks 10.

The main processor enclosure 25a and the scanner module 31 have apertured flanges for mounting them on a wall of a larger enclosure 32 of which a fragment is seen in FIG. 1. The scanner module 31 has eight LED-operated status indicators 33 on its upper front side and a terminal strip and two sockets along its lower front side. An I/O interface cable 34 plugs into one socket on the scanner module 31 and a corresponding socket on the main processor 25. Similarly, a power cable 35 connects the main processor 25 to the scanner module 31.

A pair of the transmission cables 30A and 30B that form a serial channel "A" and a serial channel "B", respectively, are connected to the terminal strip on the scanner module 31. Along serial channels A and B, drops are made through shorter cables 36A and 36B, which are connected to the upper three terminals 12a on swing-arm connectors 12 that engage the front edge of circuit boards within the remote I/O adapter modules 23. As will be described in more detail below, these adapter modules 23 cooperate with the scanner module 31 to transfer blocks of data through the serial data channels 30A and 30B. These adapter modules 23 are physically interchangeable with the local adapter modules described in the copending application, Ser. No. 65,119, cited above.

Figure 2:
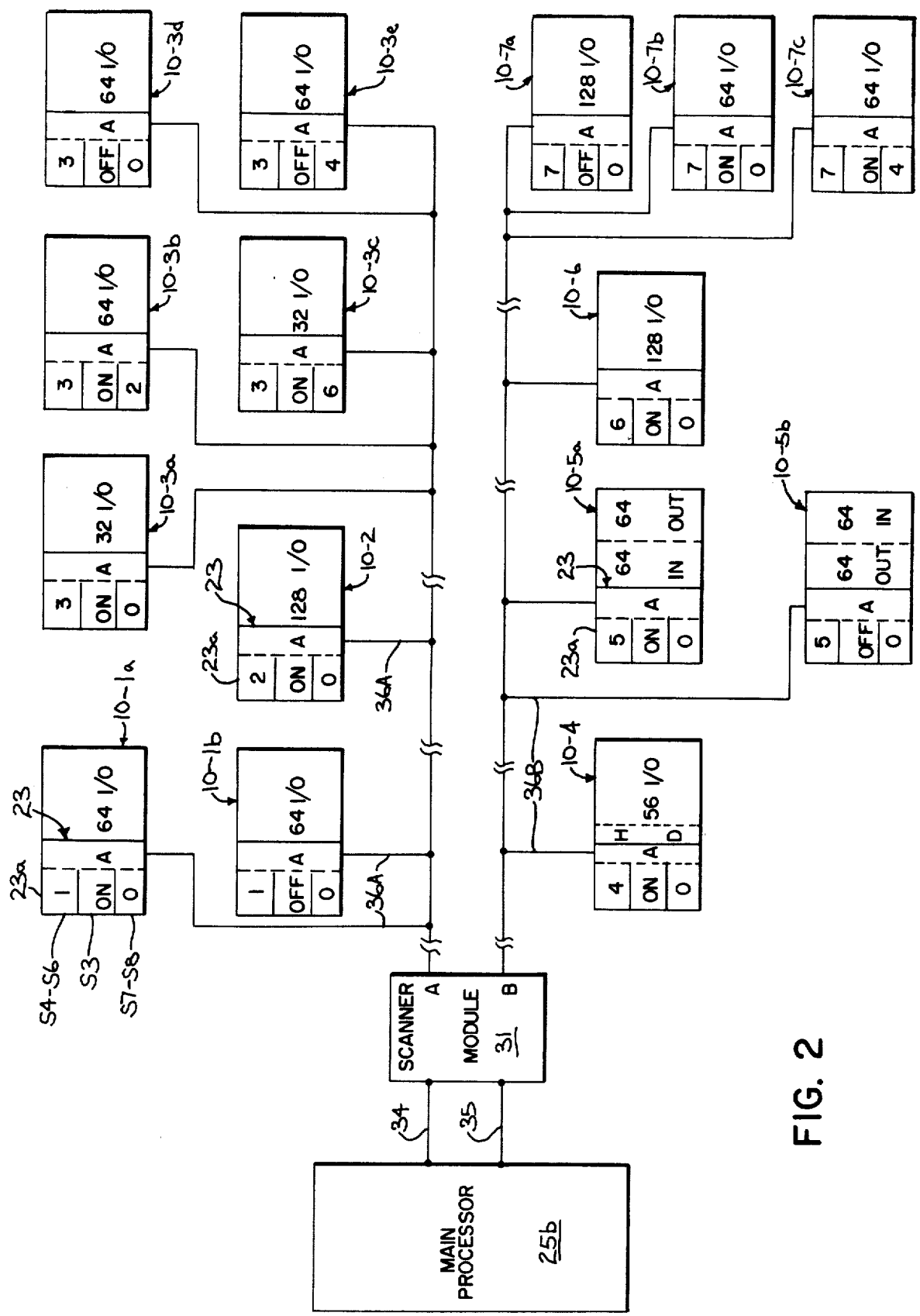
FIG. 2 is a block diagram of the programmable controller of FIG. 1, showing the distribution of its I/O interface racks.
Figure 3:
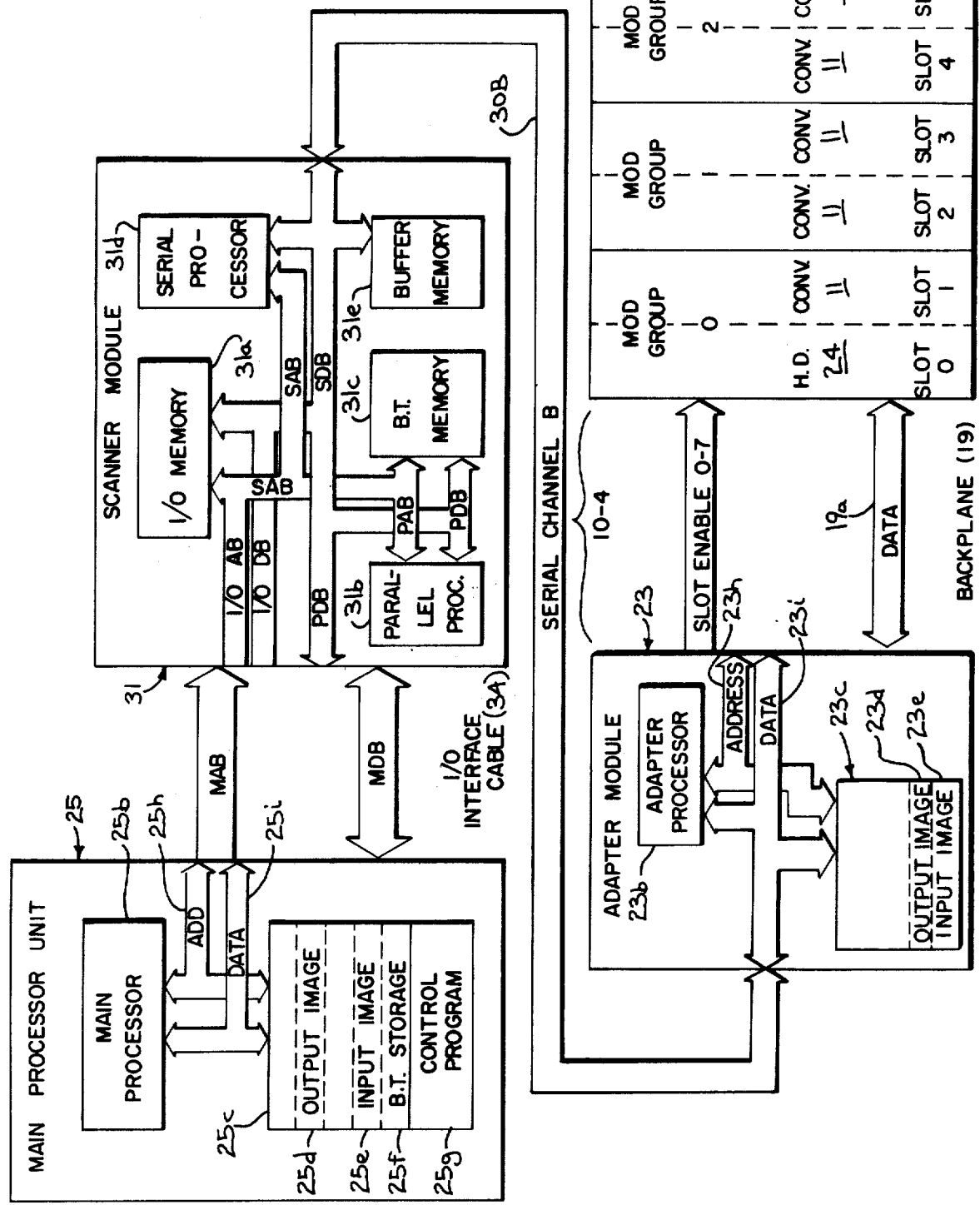
FIG. 3 is a block diagram showing the major circuit components of the main processor unit in FIG. 2 and one of the remote I/O interface racks connected to it through serial channel B.

The number, size and distribution of I/O interface racks 10 is flexible and varied. As seen in FIG. 2, up to seven "rack groups" can be connected through rack adapters 23 and drop lines 36A and 36B to serial channels A and B. The adapter module 23 in each I/O rack 10 includes switches which determine the rack group number, an extended I/O address, and the first module group of the rack. The addressing pattern is seen in FIG. 3, where rack 10-4 includes module groups 0–3. Module groups 0–3 provide an eight module or 64-bit I/O interface 10, whereas a full rack with module groups 0–7 would include slots for sixteen I/O modules 11.

Referring again to FIG. 2, the rack number selection is assigned to each rack 10 by setting three switches in an eight-station DIP switch 23a on the adapter 23. Table 1 below gives the various switch settings for the respective racks.

TABLE 1

| Switches Assigned | | | |
|---|---|---|---|
| S4 | S5 | S6 | Rack Number |
| On | On | On | 1 |
| On | On | Off | 2 |
| On | Off | On | 3 |
| On | Off | Off | 4 |
| Off | On | On | 5 |
| Off | On | Off | 6 |
| Off | Off | On | 7 |

The S3 station in DIP switch 23a preserves an extended I/O address, which effectively adds an octal number "10" to the number assigned through switches S4–S6. By setting this extended I/O address switch, a second I/O rack 10 can be related to a first I/O rack for a complementary mode of operation. Two other switches S7 and S8 in the DIP switch 23a are set to select a module group starting address in each rack 10 as follows:

TABLE 2

| Switches | | |
|---|---|---|
| S7 | S8 | First Module Group |
| On | On | 0 |
| Off | On | 2 |
| On | Off | 4 |
| Off | Off | 6 |

Thus, in FIG. 2, two racks 10-1a and 10-1b are included in "rack group 1." Both have their S4–S6 switches set to select "rack 1," however, rack 10-1b has an extended I/O address "10" by virtue of its S3 switch being "OFF," signifying that it is being used as a complementary I/O rack. Both the primary rack 10-1a and the complementary rack 10-1b have only 64 I/O and thus terminate with module group 3.

The basic I/O capacity for a rack such as rack 10-2, while being used in the "single I/O mode" is 128 bits of I/O capacity. This capacity can be doubled in the complementary mode exemplified by rack group 10-3 to provide 256 bits of I/O capacity. And, while fractional racks usually include multiples of 32 bits of I/O capacity, a special case is presented in rack group 10-4. There the first I/O module is a high density I/O module 24 of the type described in U.S. Pat. No. 4,293,924 cited above. As seen in FIG. 3, a high density module 24 requires only a single rack slot, yet is capable of interfacing 64 bits of data from I/O devices, so rack 10-4 provides 120 bits of I/O capacity.

Rack group 5 shows a further aspect of the complementary I/O mode. There 64 bits of input data are coupled through module groups 0-3 of a primary I/O rack 10-4a; and 64 bits of output data are coupled through module groups 0-3 of a complementary I/O rack 10-5b. Output modules in module groups 4-7 of the primary rack are also complemented by input modules in module group 4-7 of the complementary I/O rack. This complementary positioning of I/O modules and the capabilities of the scanner 31 and adapter 23 allow a doubling of I/O interface capacity in each rack group without the addition of memory in the main processor unit 25.

As seen in FIG. 3, the main processor unit 25 includes a main processor 25b, and a main memory 25c with an output image table 25d, with an input image table 25e and with a block transfer storage area 25f. As explained in U.S. Pat. No. 4,293,924 cited above, block transfer data is coupled to and from the storage area 25f through the image tables 25d and 25e. The main memory 25c also stores a control program 25g, which is executed by the main processor 25b to examine input bits in the input image table 25e and to set output bits in the output image table 25d according to the logic in the instructions making up the control program 25g. After each execution cycle of the control program 25g an I/O scan routine is executed in which I/O status data is coupled between the main I/O image tables 25d and 25e and an I/O image table in a scanner I/O memory 31a. The scanner I/O memory 31a stores conventional I/O data of the type used in conventional I/O modules 11, as well as module status words (MSW's) when such words have been substituted for I/O data in main memory 25c through application programming by a user.

When high density I/O transfers are made, the main processor 25b cooperates with a parallel processor 31b in the scanner 31. These transfers are made using the high density transfer technique described in U.S. Pat. No. 4,293,924 cited above, with data blocks being coupled between the main memory 25c and a block transfer memory 31c within the scanner 31. Thus, for both conventional I/O transfers and block transfers, the scanner 31 serves as a buffer between the main processor unit 25 and the serial data link, including channel B seen in FIG. 3. Although FIG. 1 shows that the main processor modules 27-29 and the scanner module 31 are separately housed, it should be apparent to those skilled in the art that these modules 27-29 and 31 could be housed in a single enclosure without departing from the principles of the invention.

Referring again to FIG. 3, the scanner module 31 includes a serial processor 31d which couples serial data between channel B and a buffer memory 31e. The serial processor 31d then supervises data transfer between either the I/O memory 31a and the buffer memory 31e or between the block transfer memory 31c and the buffer memory 31e according to the type of I/O transfer involved. In the preferred embodiment, the I/O memory 31a, the block transfer memory 31c and the buffer memory 31e are all read/write random-access memories. The specific chips constituting these memories are given in Appendix D, which lists manufacturers' chip descriptions for the components referred to in the following narration. The serial processor 31d and the parallel processor 31b are both Z80A-CPU microprocessor chips manufactured by Zilog, Inc. Besides the description herein, information concerning the architecture, operation and instruction set for these microprocessor chips is avaiable in a Z80-CPU Technical Manual, copyright 1976 by Zilog, Inc.

Normally, the serial processor 31d has access to the I/O memory 31a, with the main processor 25b being allowed to steal a cycle from the serial processor 31b to gain access to the I/O memory 31a. The main processor 25b and main memory 25c are coupled to the scanner circuitry through associated address and data buses 25h and 25i, through main address and data buses (MAB) and (MDB) in the I/O interface cable 34, and finally through I/O address and data buses (I/O AB and I/O DB) on the scanner module 31. The main data bus (MDB) provided by the I/O interface cable 34 also connects to a parallel data bus (PDB) to couple the parallel processor 31b and the block transfer memory 31c to the main processor 25a. The parallel processor 31b is also connected through a parallel address bus (PAB) to the block transfer memory 31c. On the serial processor side, serial address and data buses (SAB and SDB) couple the three scanner memories 31a, 31c and 31e to the serial processor 31d. The manner in which data is coupled from the serial processor 31d to the serial channel B will be explained in more detail below.

At the other end of serial channel B the adapter module 23 for rack 10-4 is seen. The connection of the internal data path 23i to serial channel B and the adapter processor 23b will be apparent from the more detailed description of the adapter circuitry relative to FIG. 9. The adapter processor 23b is coupled through adapter address and data buses 23h and 23i to an adapter memory 23c. This memory 23c has an output image table 23d, an input image table 23e and a block transfer storage area 23f that are similar to those in the main memory 25b. The adapter processor 23b generates slot address signals on the adapter address bus 23h, and these address signals are decoded to generate signals on the SLOT ENABLE lines 0-7, which connect through the backplane to I/O modules in respective slots 22 of the rack 10-4. The backplane 19 forms part of a bidirectional data bus 19a for coupling data between the adapter processor 23b and the I/O modules 11. It will be noticed that the I/O modules 24 and 11 in slots "0" and "1" form "module group 0," and that the I/O modules 11 in slots "2" and "3" form "module group 1." Thus, for user addressing purposes in generating a control program 25g, each I/O module 11 provides the high or low word in a particular module group. The exception is the high density module 24 in slot 0 which provides a multiword block of I/O status data instead of the normal word, but it is addressed at a single I/O slot location.

Figure 4:
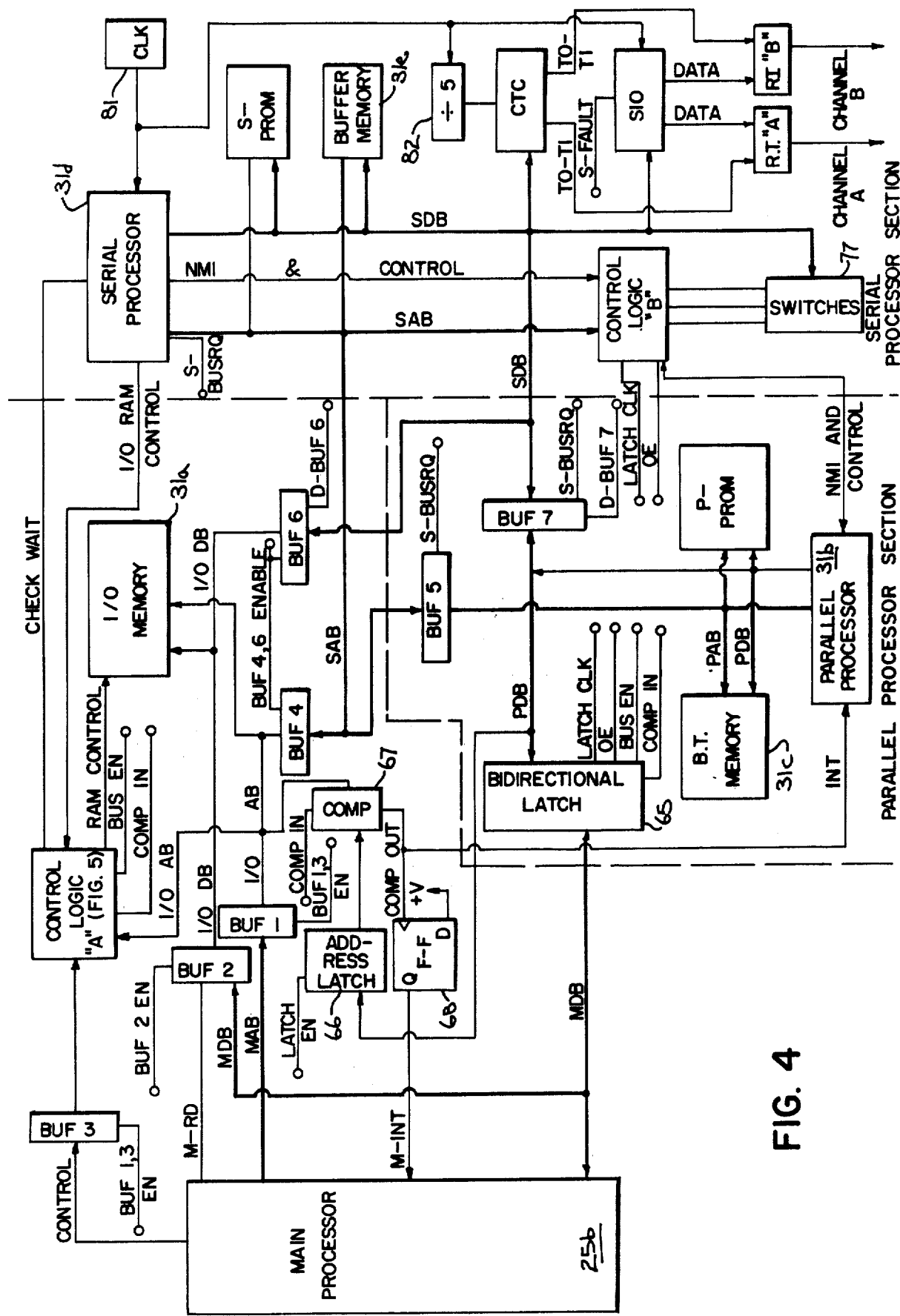
FIG. 4 is a more detailed block diagram of the circuit in the scanner module of FIG. 3.

The supporting hardware in the scanner module 31 had been reserved for presentation in FIG. 4. The scanner processors 31b and 31d utilize such supporting hardware when communicating with the main processor and with one another and to alternate control of their interconnecting buses. As seen in FIG. 4, one portion of this hardware is represented by a CONTROL LOGIC A circuit, which receives control signals from the main processor unit 25 through lines of a CONTROL bus and a BUF 3 set of buffers. The CONTROL LOGIC A circuit also receives control signals coming through I/O RAM control lines from the serial processor 31d. The CONTROL LOGIC A circuit provides output signals on RAM CONTROL lines that are responsive to control signals from either the main processor unit 25 or the serial processor 31d to enable the I/O memory 31a when a respective processor has signalled for access to it.

When the main processor unit 25 has access to the I/O memory 31a, the memory 31a is addressed through the main address bus (MAB), a BUF 1 set of buffers and the I/O address bus (I/O AB). Data is coupled between the main processor unit 25 and the memory 31a through the main data bus (MDB), a BUF 2 set of buffers and the I/O address data bus (I/O DB). Certain lines in the I/O address bus (I/O AB) are used as control lines which connect to the CONTROL LOGIC A circuit.

Figure 5:
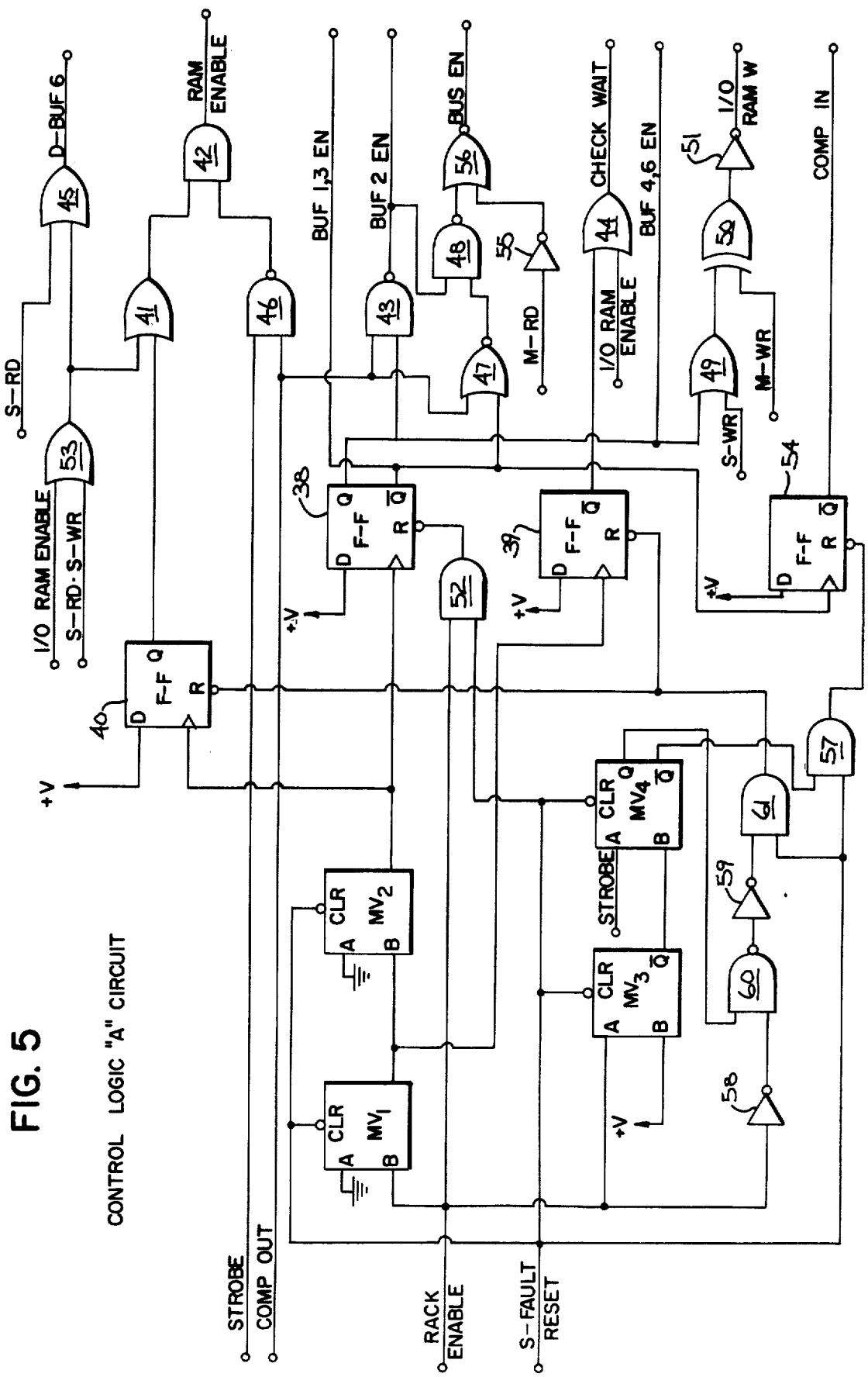
FIG. 5 is an electrical schematic diagram of the CONTROL LOGIC A circuit seen in FIG. 4.

Control of the conventional I/O memory 31a by the serial processor 31d is interrupted through the CONTROL LOGIC A circuit in a manner best understood by considering FIGS. 1–6 together. In FIG. 5 one of the control lines coming from the main processor unit is the RACK ENABLE line, which is connected to a B input on a first multivibrator MV$_1$, to an A input on a third multivibrator MV$_3$ and through an AND gate 52 to a reset (R) input on a BUF ENABLE flip-flop 38. A low true signal on the RACK ENABLE line (one of the CONTROL lines in FIG. 4) is inverted by the BUF 3 buffers (FIG. 4) to generate a logic high signal at the B input at MV$_1$ in FIG. 5. As seen in the timing diagram, FIG. 6, the Q output of MV$_1$ goes low with the RACK ENABLE signal, and when the multivibrator times out in 3.54 microseconds, a logic high is generated at the B input on a second multivibrator MV$_2$, causing the Q output on MV$_2$ to go low for a period of 1.54 microseconds. The output signal from the MV$_1$ multivibrator also generates a clock pulse to the CHECK WAIT flip-flop 39. Referring again to FIG. 5, the trailing edge of the pulse from the MV$_2$ multivibrator provides clock pulses to an I/O ENABLE flip-flop 40 and to the BUF ENABLE flip-flop 38, respectively. Logic high signals are generated at the Q outputs of these flip-flops 38 and 40 to disable the BUF 4, 6 ENABLE line and the gates 41 and 42 controlling the RAM ENABLE line. This interrupts serial processor control of the buses that provide access to the I/O memory 31a.

When serial processor control is interrupted by the preceding sequence of signals, access to the I/O memory 31a by the main processor 25b is established. Referring again to FIGS. 4, 5 and 6, the Q output on the BUF ENABLE flip-flop 38 is high, thereby enabling the BUF 2 set of buffers through NAND gate 43 and the BUF 2 ENABLE line. The BUF 2 buffers couple data between the main processor unit 25 and the I/O memory 31a. The Q output of the BUF ENABLE flip-flop is now low, and so therefore, is the BUF 1,3 line that carries an enabling signal to the BUF 1 and BUF 3 buffers in FIG. 4. The signal on the BUF 1,3 enable line is also used to clock a comparator enable (COMP EN) flip-flop 54, which has a Q output coupled through the COMP in line to enable the comparator (COMP) 67 and the bidirectional latch 65. The significance of this will be seen below in relation to generating an interrupt signal to the main processor 25b. The BUF 1 buffers couple addresses from the main processor unit 25 to the I/O memory 31a and to the comparator 67. The I/O memory 31a is enabled through the RAM ENABLE line (FIG. 5) which is one of the RAM CONTROL lines in FIG. 4. As seen in FIG. 5, the main processor 25b controls this enabling signal when it sets the I/O ENABLE flip-flop 40, the latter having its Q output coupled through gates 41 and 42 to the RAM ENABLE line. The main processor write (M-WR) line is coupled through an XOR gate 50 and an inverter 51 to control an I/O memory write (I/O RAMW) line connecting to the I/O memory 31a. The M-RD line is also coupled through an inverter 55 and NOR gate 56 to control a main bus enable (BUS EN) line going to the bidirectional latch 65 in FIG. 4. This line controls the state of the MDB and allows the main processor 25b to couple latched data from the bidirectional latch 65. The main processor read (M-RD) line seen in FIG. 4 is employed to control the direction in which the BUF 2 set of buffers are enabled. Whether the main processor 25b couples data through the BUF 2 buffers or the bidirectional latch 65 depends upon the state of the COMP OUT line which is coupled through gates 43, 47, 48 and 56 to both the BUF 2 enable lines and the BUS EN line. Assuming the COMP OUT line is not active, the main processor 25b will enable the BUF 2 set of buffers.

Figure 6:
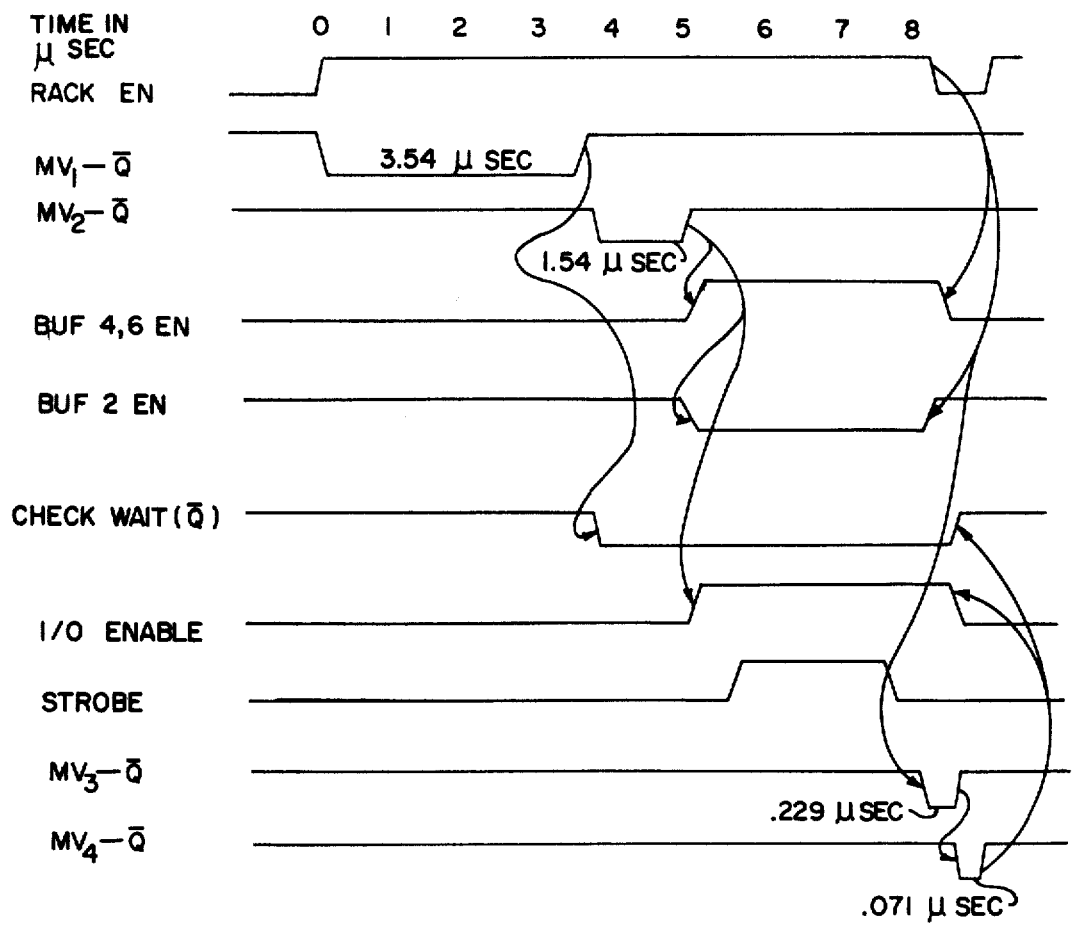
FIG. 6 is a timing diagram illustrating the operation of the circuit of FIG. 5.

When the main processor 25b has access to the I/O memory 31a, access is denied to the serial processor 31b. As seen in FIG. 5, the Q output of the CHECK WAIT flip-flop 39 is connected through an OR gate 44 to a CHECK WAIT line, which is seen in FIG. 4 connecting the CONTROL LOGIC A circuit to the serial processor 31d. If the serial processor 31d couples a logic low signal on the I/O RAM ENABLE line while the main processor 25b has access to the I/O memory 31a, a signal is generated to the serial processor 31d on the CHECK WAIT line to keep it in a "wait" state. When such a signal is generated on the CHECK WAIT line, the operation of the serial processor 31d is suspended for approximately 4.5 microseconds. This suspension is ended when, as seen in FIG. 6, the RACK ENABLE signal is removed by the main processor 25b, and pulses are generated first by the MV$_3$ multivibrator and then by the MV$_4$ multivibrator. As seen in FIG. 5, such logic low pulses at the Q outputs of the multivibrators will reset the CHECK WAIT, I/O ENABLE and COMP EN flip-flops 39, 40 and 54, the latter being coupled to the Q output on the MV$_4$ multivibrator through AND gate 57. It should be noted, however, that the reset pulse for the CHECK WAIT and I/O ENABLE flip-flops 39 and 40 actually originates at the Q output of the MV$_4$ multivibrator which is coupled with the RACK ENABLE and SYSTEM RESET lines through inverters 58 and 59 and gates 60 and 61 to the reset (R) inputs on these flip-flops 39 and 40. The BUF ENABLE flip-flop 38 is reset in response to a signal on the SYSTEM RESET line that is coupled through AND gate 52. This signal also clears the multivibrators MV$_3$ and MV$_4$ and controls the reset signal to the COMP EN flip-flop 54 through AND gate 52.

Still referring to FIG. 5, when the BUF ENABLE flip-flop 38 is reset in response to the trailing edge of the positive RACK ENABLE pulse, and when the I/O ENABLE flip-flop 40 is reset, the serial processor 31d has access to the I/O memory 31a. The serial processor 31d controls the RAM ENABLE line through an I/O RAM ENABLE line coupled through the OR gate 53, the OR gate 41 and the AND gate 42. The serial processor 31d controls the direction of data flow through the D-BUF 6 line, which is controlled through the I/O RAM ENABLE line and the serial processor read (S-RD) line and write line (S-WR), that are coupled through OR gate 53 and a NOR gate 45. The BUF 4 and BUF 6 buffers are enabled, through a BUF 4, 6 ENABLE line which is in a normally low, enabled state unless the BUF ENABLE flip-flop 38 is set during a RACK ENABLE pulse as explained above. Referring to FIG. 5, the signal on the BUF 4, 6 ENABLE line is also coupled through a NOR gate 49 with the signal on a serial processor write (S-WR) line to provide serial processor control of the I/O RAMW line. From this description it should now be apparent how the necessary buffers and control lines are enabled by the main processor 25b and the serial microprocessor 31d to gain access to the I/O memory 31a.

Besides providing bus control circuitry, the CONTROL LOGIC A circuit in FIG. 5 also generates a signal that causes the interruption of the normal I/O scan routine of the main processor 25b when a block transfer between the main processor unit 25 and the scanner 31 is to be executed.

Referring to FIG. 4, the main processor unit 25 receives interrupt signals on an M-INT line and these signals tell the main processor 25b that the scanner 31 is ready for a block transfer. When a block transfer is to be performed between the scanner 31 and the main processor unit 25, the parallel processor 31b loads a module status word (MSW) into the bidirectional latch 65 and it loads the address of the high density module 24 into an address latch 66, so that the address appears on one side of a comparator (COMP) 67. Referring again to FIG. 5, when the BUF ENABLE flip-flop 38 is set as a result of a RACK ENABLE pulse, the COMP IN line goes low to enable the comparator 67 and the BUF 1 buffers. This allows the address generated by the main processor 25b to appear on the other side of the comparator 67. When there is an address match, a logic low signal is generated on the COMP OUT line to set flip-flop 68. The Q output of this flip-flop is connected through the M-INT line to a maskable interrupt (INT) input on the main processor 25b.

Referring now to FIG. 5, also, it can be seen that a logic low signal on the COMP OUT line affects gates 43, 46, 47 and 48 which control the RAM ENABLE line, the BUF 2 ENABLE line and the BUS EN line. The NAND gates 43 and 46 are disabled, because an address match at the comparator 67 means that the main processor 25b will be switching from communication with the I/O memory 31a to communication with the bidirectional latch 65 and with the block transfer memory 31c. Gates 43 and 46 are re-enabled after the address latch 65 and comparator 67 are cleared, and then the STROBE line will control the RAM ENABLE line during the period when the I/O ENABLE flip-flop 40 is set. On the other hand, NOR gate 47 and NAND gate 48 will be enabled to enable the bidirectional latch 65 outputs to the parallel processor 31b through the output enable (OE) line.

Referring to FIG. 4, the scanner 31 has two processing sections that are interconnected. The serial processor buses (SAB and SDB) are coupled through BUF 5 and BUF 7 sets of buffers, respectively, to a parallel processor address bus (PAB) and a parallel processor data bus (PDB). Through these buses the serial processor 31d has access to the block transfer memory 31c. The PAB and PDB buses also connect the parallel processor 31b to the block transfer memory 31c and to a parallel processor program memory (P-PROM) that stores firmware instructions for the parallel processor 31b.

Figure 7:
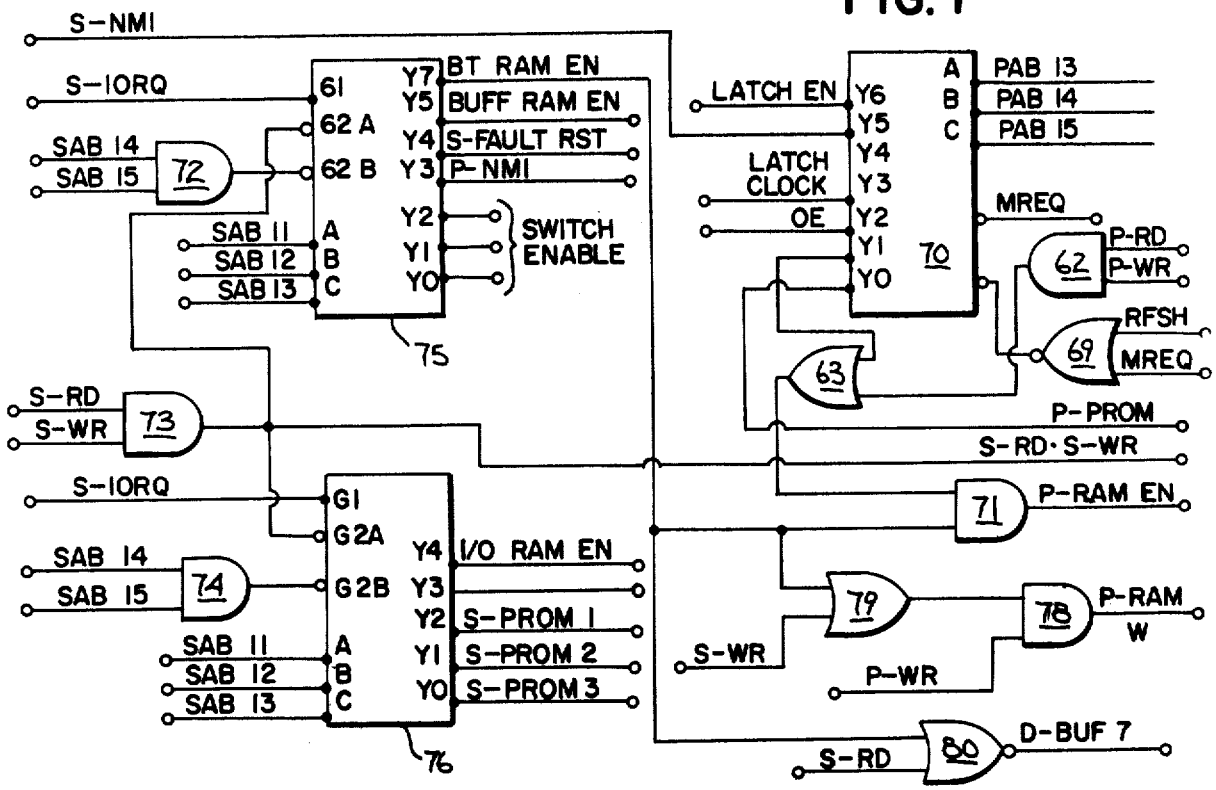
FIG. 7 is an electrical schematic diagram of the CONTROL LOGIC B circuit of FIG. 4.

The parallel processor 31b and the serial processor 31d generate interrupt signals to one another through the CONTROL LOGIC B circuit to take control of the PAB and PDB buses and the block transfer memory 31c. From the Y5 output of a decoder 70 seen in FIG. 7, a nonmaskable interrupt (S-NMI) line carries an interrupt signal to the serial processor 31d. Lines PAB 13-PAB 15 of the parallel address bus and the read, write, memory request and refresh (P-RD, P-WR, MREQ and RFSH) lines from the parallel processor 31b are coupled to inputs on the three-line-to-eight-line decoder 70. The parallel processor read and write control lines (P-RD and P-WR) are coupled through an AN gate 62. The Y1 output on decoder 70 is coupled with the output of this AND gate 62 through an OR gate 63 to another AND gate 71 that controls the block transfer memory enable (P-RAM EN) line. The MREQ line is coupled directly to one output enable terminal on the decoder 70, and is coupled with the refresh (RFSH) line through a NOR gate 69 to the other output enable terminal on the decoder 70.

The other outputs of the decoder 70 control the parallel processor program memory (P-PROM), the bidirectional latch 65 and the address latch 66. The Y0 output is coupled through a P-PROM ENABLE line to the P-PROM. The Y3 output is coupled through a LATCH CLOCK line to the bidirectional latch 65 in FIG. 4 to clock data into the bidirectional latch 65 for transmission to the main processor 25b. The Y2 output is coupled through the output enable (OE) line to the bidirectional latch 65 to control the coupling of data from the bidirectional latch onto the parallel data bus (PDB). The other control lines to the bidirectional latch 65 have been described above in connection with the CONTROL LOGIC A circuit. The Y6 output on the decoder 70 is coupled through a latch enable (LATCH EN) line to the address latch 66.

Similarly, the serial processor 31d is coupled through the A11–A15 lines of the SAB, through its S-IORQ line, its S-RD and S-WR lines and three gates 72–74 to a pair of three-line-to-eight-line decoders 75 and 76. Nonmaskable interrupt (NMI) signals are generated from a Y3 output on the first decoder 75 and through a P-NMI line to the parallel processor 31b. In addition, system fault status is reset through an S-FAULT RESET line connected to the Y4 output, and a group of switches 77 in FIG. 4 are enabled through the Y2-Y0 outputs on the first decoder 75, so that these switches 77 can be read. The B.T. ENABLE line from output Y7 is significant because it is coupled with various control lines seen in FIG. 7 through AND gates 71 and 78, and through an OR gate 79 and a NOR gate 80, to control the parallel RAM enable and write lines (P-RAM ENABLE and P-RAMW) and the directional control line (D-BUF7) for the BUF 7 buffers. Through these lines the serial processor 31d has access to the block transfer memory 31c. The buffer memory 31e is enabled through the BUFF RAM EN line coupled from the Y5 output of decoder 75. The serial processor 31d also controls the enabling of a serial processor program memory (S-PROM) and the scanner I/O memory 31a through lines coupling the Y0-Y5 outputs on the second decoder 76 to these respective memories.

Referring again to FIG. 4, to communicate through the serial data channels A and B, the serial processor 31d reads and executes firmware instructions from its program memory (S-PROM) to initialize a programmable SIO (serial input/output) circuit. A clock circuit 81 for the serial processor 31d has an output connected to both the serial processor 31d and to the SIO circuit to provide timing signals. The SIO circuit converts between parallel data received through the SDB bus and serial data which is coupled to and from the SIO circuit through receive and transmit (R.T.) circuits A and B. The receive-transmit circuits A and B are coupled to serial channels A and B, respectively. The output of the clock circuit 81 is also coupled through a divide-by-five counter 82 to an input on a CTC (counter/timer circuit). Two timing outputs on the CTC are connected to the receive-transmit circuits A and B, respectively. The CTC is a programmable timing circuit which receives command data through the SDB bus and generates certain timing signals for the receive-transmit circuits A and B from the basic timing signals generated by the clock circuit 81.

In the preferred embodiment the SIO circuit is a Z80A-SIO and information on this circuit is available in a Z80-SIO Technical Manual, copyright 1977 by Zilog, Inc. The CTC circuit is a Z80A-CTC circuit and further information concerning it is available in a Z80A-CTC Technical Manual, copyright 1977 by Zilog, Inc.

Figure 8:
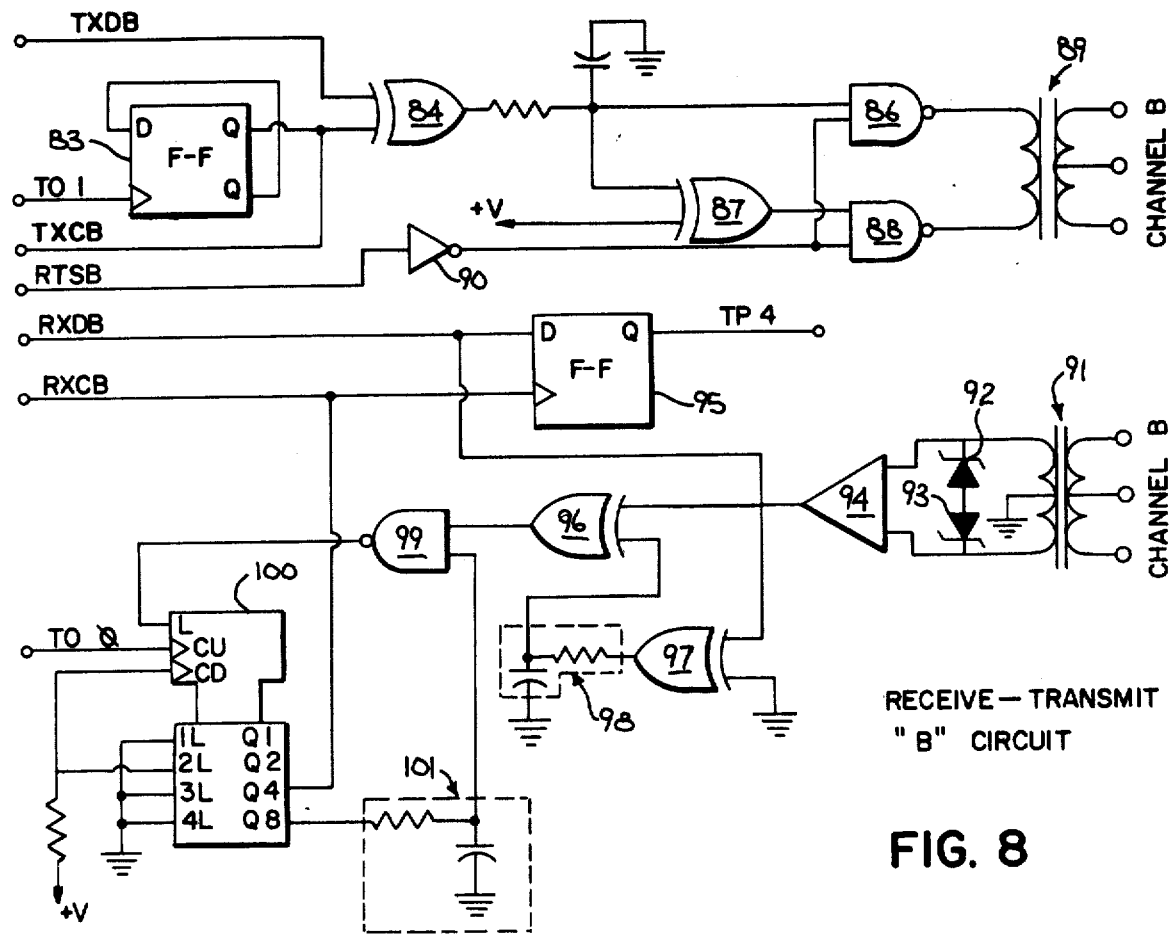
FIG. 8 is an electrical schematic diagram of one of the receive-transmit circuits of FIG. 4.

The receive-transmit circuit B is seen in more detail in FIG. 8. The receive-transmit circuit A is the same except for an additional flip-flop 83 in the B circuit which is clocked by a signal on the T01 line. This flip-flop 83 provides a signal at one-half the T01 frequency to one input of an XOR gate 84 and to a transmit clock (TxCB) input on the SIO circuit. A second input on the XOR gate 84 receives a signal on a line from the transmit data output (TxDB) on the SIO. This XOR gate 84 provides a Manchester-coded transmission signal which is coupled through a resistor 85 to a first NAND gate driver 86. This coded signal is also coupled through an XOR gate 87, which is used as an inverter to an input on a second NAND gate driver 88. A primary winding of a transformer 89 is coupled across the outputs of the two NAND gate drivers 86 and 88. A secondary winding of this transformer 89 is coupled to the long transmission lines in Channel B of the serial data link. A data terminal ready to send (RTSB) line is coupled through an inverter 90 to a second input on the two NAND gate drivers 86 and 88 to enable or disable these gates.

The receiving portion of this circuit includes a transformer 91 with a primary winding that couples receiving lines in Channel B to a secondary winding. A pair of Zener diodes 92 and 93 are coupled across a secondary winding to protect a line receiver 94 that has its own input terminals coupled across the secondary winding. The output of the line receiver 94 is connected to the receive data (RxDB) input on the SIO circuit. This line is also coupled to the D input on a test flip-flop 95, which has a line from the receive clock (RxCB) output on the SIO circuit connected to a clock input to provide a test point (TP4) for checking whether data is being received. The output of the line receiver 94 is coupled to one input of an XOR gate 96 that decodes signals from transmission lines and this output is also coupled to one input of a second XOR gate 97. The output of the second XOR gate 97 is coupled through an RC coupling circuit 98 to the second input on the decoding XOR gate 96 to provide pulses for the decoding operation. The output of the first XOR gate 96 is coupled through a Schmitt-trigger NAND gate 99 to a latch (L) input in a binary up/down counter 100. This counter 100 receives a timing signal from the CTC circuit on the T00 line, which is connected to its count up (CU) input. The frequency of this signal may be one of two user-selectable band rates which are divided by eight to produce a signal at the Q3 output of this counter. This signal serves as the receive clock frequency at the RxCB input of the SIO circuit. The Q4 output on the counter 100 is coupled through an RC circuit to the second input on the NAND gate 99 so that incoming pulses are sampled during 75% of their duty cycle as part of the decoding of the received transmission signals. This completes the description of the receive-transmit circuits A and B, which have been the last circuits on the scanner module 31 to be described.

Figure 9:
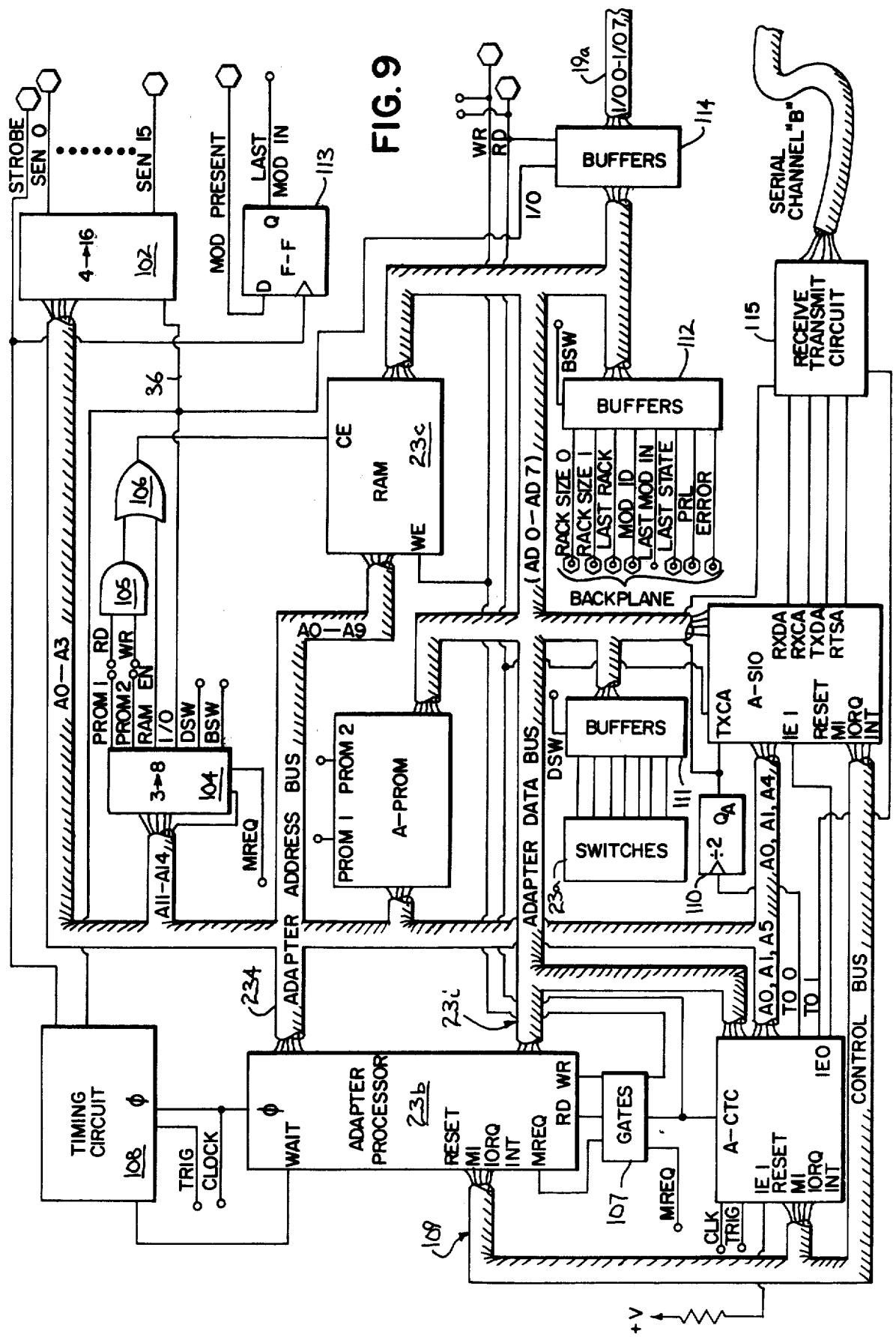
FIG. 9 is a block diagram of the circuit in the adapter module of FIG. 3.

The adapter module circuit described generally in FIG. 3 is seen in more detail in FIG. 9. The adapter processor 23b is a Z80A-CPU microprocessor manufactured by Zilog, Inc. It is coupled through lines A0–A3 of the adapter address bus 23h to a four-line-to-sixteen-line decoder 102 to decode slot enable signals that are generated on slot enable lines (SEN0–SEN15). The adapter processor 23b is also connected through lines A0–A10 of the address bus to an adapter processor program memory (A-PROM) which stores the adapter firmware instructions, and through line A0–A9 to a read/write random access memory (RAM) 23c which stores the I/O status data described earlier with reference to FIG. 3. The processor 23b is also connected through the adapter address bus 23h to a three-line-to-eight-line decoder 104 which decodes signals on address lines A11–A14 to generate chip select signals on the adapter module 23. Portions of the A-PROM are enabled through the PROM 1 and PROM 2 control lines coming from the three-line-to-eight-line decoder 104 so that program instructions can be read from the A-PROM through lines AD0–AD7 of the adapter data bus 231. The RAM 23c is enabled at a chip enable (CE) input, to which the read (RD), write (WR) and RAM enable (RAM EN) control lines are coupled through an AND gate 105 and an OR gate 106. The WR line is also connected to a write enable (WE) input on the RAM 23c. The RD, WR and memory request (MREQ) lines are processor control lines which originate at the adapter processor 23b and which are coupled through three OR gate drivers 107. The MREQ line connects to an enable input on the three-line-to-eight-line decoder 104.

A timing circuit 108 provides timing signals to the processor 23b through a CLOCK line. The basic timing signals on the CLOCK line are generated at a frequency of 3.684 megahertz. The timing circuit 108 also generates a 1.8432 megahertz signal on a trigger (TRIG) line and couples signals to the processor 23b through a WAIT line to coordinate processor outputs to the backplane.

The adapter processor 23b is also connected through several lines in a control bus 109 to an adapter CTC (A-CTC) circuit and an adapter SIO (A-SIO) circuit, which employ the same circuit chips as the circuits described previously for the scanner module 31. The A-SIO circuit is coupled to serial channel B through its Channel A receive and transmit terminals and a receive-transmit circuit 115 similar to the one in FIG. 8. The A-SIO and A-CTC circuits are programmable circuits, which are programmed by data coupled to them through the adapter data bus 23i. Control signals are provided through the control bus 109 that includes a RESET line, an M1 line, an IORQ line and an interrupt (INT) line. The processor read (RD) line is also connected to the A-SIO. The A-SIO circuit can generate a range of interrupt signals to the processor 23b using the INT line, and using the adapter data bus 23i to convey an interrupt address. Other control signals are coupled to the A-SIO and A-CTC circuits through lines A0, A1, A4 and A5 of the address bus 23h to control which chip and which register within that chip is being selected.

The CTC circuit receives basic timing signals through the CLOCK line and the trigger (TRIG) line coming from the timing circuit 108 and generates timing signals from outputs T00, T01, and T02. The frequency of signals on the T00 line are divided by two by a counter 110, which has its $Q_A$ output connected to the channel A transmit clock (TxCA) input on the SIO circuit. The T01 output is connected to the receive-transmit circuit 115.

The A-CTC circuit and the A-SIO circuit are connected in an interrupt priority chain through interrupt enable inputs and outputs. The interrupt enable input (IEI) on the CTC circuit is pulled high while the interrupt enable output (IEO) is connected to the interrupt enable input on the SIO circuit. This gives the A-CTC circuit priority over the A-SIO circuit in generating interrupts to the processor 23b. For a more detailed explanation of the working of this interrupt priority chain, reference should be made to the technical manuals which are cited above for the SIO and CTC circuits.

Also seen in FIG. 9 is the DIP switch 23a that is used to select the rack number and starting address of the rack 10 in which the adapter 23 is used. These switches can be read through the adapter data bus 23a when the buffers 111 are enabled through a DSW line coming from the three-line-to-eight-line decoder 104. The adapter processor 23b can also read the status of certain lines, some of which are connected to the backplane. The status of these lines is read through the adapter data bus 23i and a second set of buffers 112 which are enabled through a BSW line coming from the three-line-to-eight-line decoder 104. These lines include a LAST MOD IN coming from the Q output of the flip-flop 113 and a MOD ID line on the backplane that is active when the high density module 24 has been addressed.

The adapter module 23 is connected to the I/O backplane (as symbolized by the hexagonal connectors in FIG. 9) through a standard set of lines which include the STROBE line, the SLOT ENABLE lines SEN 0-SEN 15) a module present (MOD PRESENT) line, an I/O RESET line (not shown), a WR line, an RD line, and lines I/00-1/07 of the I/O data bus 19a. The MOD PRESENT line connects to a D input on the flip-flop 113 that generates the LAST MODE IN signal. The I/O data bus 19a is coupled through a set of buffers 114 to the adapter data bus, these buffers being enabled through the READ line and an I/O control line coming from the three-line-to-eight-line decoder 104. This completes the description of the circuitry on the adapter module 23.

Figure 10:
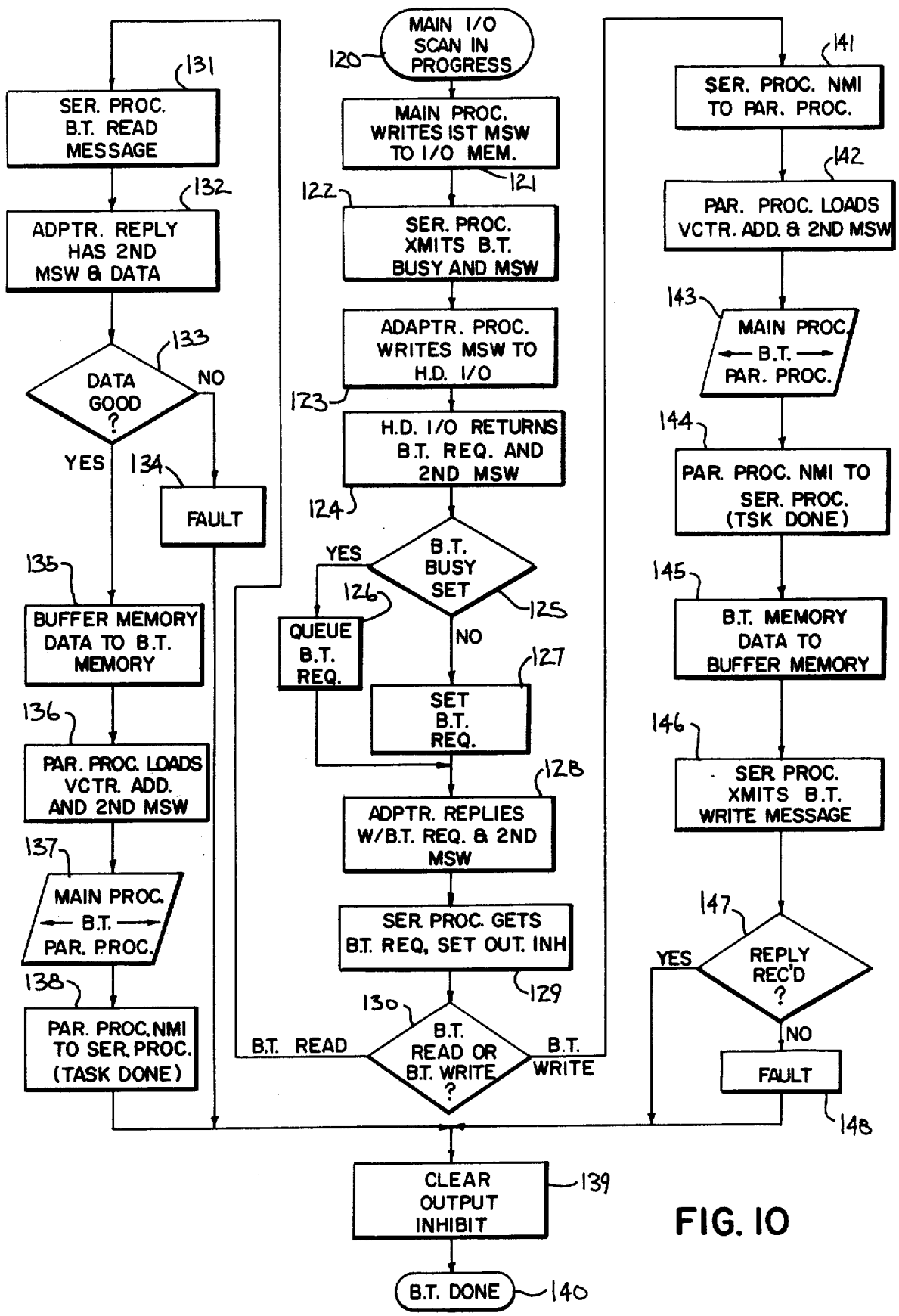
FIG. 10 is a flow chart representing the steps in initiating and executing either a READ or a WRITE block transfer.

Referring to FIGS. 3 and 10, a first module status word (MSW) is coupled from the main processor 25b to the scanner I/O memory 31a as the I/O scan routine is executed, as represented by start block 120 and process block 121 in FIG. 10. The MSW is a control word which occupies the location of I/O status data in the output image table 25d in the main memory 25c. As represented by process block 122, the serial processor 31d transmits the first MSW with a block transfer "busy" or "not busy" bit to the adapter 23 in a command message. In sending messages over the serial data channels A and B, the serial processor 31d employs a serial protocol with a basic unit of information referred to as a frame. The basic frame is organized as follows:

FLAG/DESTINATION ADDRESS/COMMAND/STATUS/-DATA/CRC/FLAG

The beginning and end of the frame are marked by flag segments. A 16-bit cyclic redundancy code (CRC) segment is generated to protect against communication errors in the other segments. The command segment provides commands identified as Command 1, Command 2, Command 3 and Command 4. When the first MSW is transmitted in a command message it is included in the data segment, but when a serial MSW is received in a reply message it occupies the "status" segment. In the following description these segments will be examined in more detail, and while most of the segments except the data segment constitute a byte or eight bits of data, the more generalized term "word" shall be used. A word of data may be four, eight or sixteen bits long and words of different length could be employed in practicing the invention. For purposes of serial data transmission, however, messages are most easily broken down into byte-sized words, which may be packed together, or subdivided, if necessary for further processing in other embodiments.

A Command 2 message is used by the serial processor 31d for conventional I/O data transfer and the frame for Command 2 is organized as follows:

FLAG/RACK ADDRESS/BUSY BIT & CMDO2 (H)/MASK/OUTPUTS/CRC/FLAG

In particular, the rack address word is defined in Table 3 as follows:

TABLE 3

| Bit | Description | |
|---|---|---|
| 7 | Reserved for Scanner Address | |
| 6 | Rack Identifier | |
| 5 | Rack Identifier | |
| 4 | Rack Identifier | |
| 3 | Rack Identifer | |
| 2 | Rack Identifier | |
| 1 | ¼ Rack Identifier | 00 = Slot 0 |
|   | (Starting Slot) | 01 = Slot 2 |
| 0 |   | 10 = Slot 4 |
|   |   | 11 = 6 |

Up to 32 I/O rack groups can be identified with a five-digit rack identifier, although in the present embodiment the maximum number is seven rack groups with a possibility of complementary racks to effectively provide fourteen rack groups. The command word for the Command 2 message is defined as seen in Table 4 with bit 7 being a block transfer "busy" bit or a block transfer "not busy" bit depending on its logic state. When a high density module 24 anywhere in the system has previously requested service, the block transfer busy bit is issued to the adapters 23 to inhibit any further block transfer requests from high density modules 24.

TABLE 4

| Bit | 7 | 6 | 5 | 4 | 3 | 2 | 1 | 0 |
|---|---|---|---|---|---|---|---|---|
| State | B.T. Busy Bit | 0 | 0 | 0 | 0 | 0 | 1 | 0 |

A Command 2 message from the scanner will also include one or more words of output data and a mask word. The mask word includes one bit for each module group of two I/O modules so that if a particular bit is set the data will be sent for that module group. This mask is more fully explained in a patent application of Grudowski, Ser. No. 242,048, filed Mar. 9, 1981, assigned to the assignee herein and entitled "Programmable Controller Using Coded I/O Data Technique." The disclosure in that application relating to the masking concept is incorporated herein by reference.

A Command 1 message is an input/output/reset command message that is the first command sent from the scanner 31 to an I/O rack 10 when starting or restarting communication to that rack 10. The message frame is organized as follows:

FLAG/RACK/ADDRESS/BUSY BIT &
CMD01(H)/MASK/OUTPUTS/CRC/FLAG

The command word for Command 1 is further defined in Table 5 below with "X" representing special function bits not involved in the invention.

TABLE 5

| Bit | 7 | 6 | 5 | 4 | 3 | 2 | 1 | 0 |
|---|---|---|---|---|---|---|---|---|
| State | B.T. Busy Bit | X | 0 | X | 0 | 0 | 0 | 1 |

An important difference between a Command 1 message and a Command 2 message is that while masked output data is sent in Command 1 message, it is never seen at the I/O devices on the controlled system due to the active state of the I/O RESET line during the time a Command 1 message is sent.

In response to a Command 1 and Command 2 message, the adapters 23 send a Reply 1 and Reply 2 message, respectively to the scanner 31. The message frame for both Reply 1 and Reply 2 is defined generally as follows:

FLAG/SCANNER ADRESS 80(H)/REPLY
WORD/MASK/INPUTS/B.T. SLOT
ADDRESS & MSW/CRC/FLAG

The Reply 1 and Reply 2 messages both include input data. Thus, although Command 1 message is not effective to couple output data to the I/O devices, a Repy 1 message is effective to couple input data to the scanner 31 and ultimately to the main processor 25b. Therefore, when starting or restarting communication to a rack, communication is established by the receipt of input data. A Command 2 message, which is used after communication has been established, also results in a Reply 2 message which couples input data to the scanner 31.

An important aspect of the Command 1 and 2 and Reply 1 and 2 messages is the handling of block transfer requests represented in process block 122 of FIG. 10. Assuming that no block transfer requests have been received from the adapters 23, the serial processor 31d rotates an inactive or "not busy" bit through the I/O address range to give each rack adapter 23 an opportunity to request service. As represented by process block 123, each adapter 23 is scanning the I/O modules 11 in its rack 10 for block transfer request signals, and as seen in process block 124, such requests are coupled to the adapter 23. As represented by the decision block 125 and process block 126, if such a request has been received and the busy bit is set the adapter 23 saves the block transfer request and the address of the request by high density module 24 in a queue in the adapter RAM 23c. If the busy bit is not set in Command 1 or 2, however, the adapter 23 can set a block transfer request bit, as represented by process block 127, and send it back to the scanner in Reply 1 or 2, as represented by process block 128.

The command word for Replies 1 and 2, which includes the block transfer request bit, is defined in Table 6.

TABLE 6

| Bit | Description | |
|---|---|---|
| 7 | Extended I/O | |
| 6 | Not Used | |
| 5 | B.T. Request | |
| 4 | Not Used | |
| 3 | Not Used | |
| 2 | Not Used | |
| 1 | Last | 00 = 32 |
| 0 | Rack | 01 = 64 |
| | Size | 10 = 96 |
| | | 11 = 128 |

The block transfer (B.T.) request bit will be set if a block transfer module has requested service and the received block transfer busy bit is reset or "not busy". Also seen in Table 4 is the extended I/O bit, which signals the presence of a complementary I/O rack associated with this I/O rack address. The last rack and rack size bits provide the data that the scanner 31 needs to maintain an image of the configuration of all of the I/O racks 10 used in the controller.

The block transfer slot address word in Replies 1 and 2 is defined in Table 7 below, as follows:

TABLE 7

| Bit / | 7 | /6 5 4/ | 3 2 1 0 |
|---|---|---|---|
| Function/ | Not Used | Rack Number | B.T. Slot Address |

The block transfer module status word (MSW) in Replies 1 and 2 is defined in Table 8 below, as follows:

TABLE 8

| Bit | / 7 | / 6 / | 5 | 4 | 3 | 2 | 1 | 0 |
|---|---|---|---|---|---|---|---|---|
| Function | Read Flag | Write Flag | | | Block Size | | | |

Referring again to FIG. 10, process block 129, after Reply 1 or 2 is received by the serial processor 31d, it sets an output inhibit mask bit in the buffer memory 31e to prevent further outputs to the slot address associated with a pending block transfer request. As represented in decision block 130, the serial processor 31d next examines the flag in the MSW sent back from the adapter 23 to determine whether the block transfer request is a READ or WRITE request. Although not shown in FIG. 10, the invention also contemplates "special case" high density modules, which are discussed in the copending application, Ser. No. 43,886, cited above, and which are signalled when both READ and WRITE flags are set.

For the high density module 24 seen in FIG. 1, the next step would be represented by process block 131, where the scanner 31 (serial processor 31d) issues a block transfer READ command message, which includes a Command 4, to the adapter 23. The message frame for a Command 4 message is organized generally as follows:

FLAG/RACK ADDRESS/COMMAND
04(H)/CRC/FLAG

As seen in the next process block 132, the adapter 23 would issue a Reply 4 message organized as follows:

FLAG/SCANNER ADDRESS 80 (H)/REPLY 04(H)/B.T. DATA/CRC/FLAG

As seen in the decision block 133, the serial processor 31d receives the block of data in Reply 4 and checks the CRC to see whether the data is valid. If there is an error in the data, the serial processor 31d records the error. The serial processor 31d will then attempt a second Command 4-Reply 4 sequence and if this is unsuccessful, the processor 31d declares a fault as represented by process block 134, and skips to the end of the sequence represented by the terminal block 140 labeled "B.T. Done." When valid block transfer data is received from the adapter 23 it comes into the buffer memory 31e, and as seen in process block 135, is then loaded into the block transfer memory 31c. After any necessary status data is loaded into the block transfer memory 31c, the serial processor 31d generates an NMI signal to the parallel processor 31b. As shown by process block 136, the parallel processor 31b then executes an NMI interrupt routine to load the slot address of the requesting block transfer module into the vector address latch 66 and to load the second MSW into the bidirectional data latch 65.

I/O block 137 represents that the READ block transfer is executed when a matching address is generated by the main processor 25b in FIG. 4 to the inputs on the side of the comparator 67 opposite the address latch 66. The main processor 25b takes the second MSW and compares it to the first MSW in the I/O image table 25d. If there is a match, the main processor 25b continues the execution of an interrupt sequence to couple the number of words of data defined in the two module status words through the bidirectional latch 65. As represented by process block 138, in FIG. 10 when the number of words indicated by the MSW's have been transferred, the parallel processor 31b clears the latches 65 and 66, stores a task result word in the block transfer memory 31c and sends a "task done" NMI signal to the serial processor 31d. As shown by process block 139, the output inhibit for the the I/O address of the block transfer module, which had been set in block 129, is cleared and the terminal block 140 represents the end of the block transfer sequence.

Returning to decision block 130, a block transfer from the main processor 25b to the parallel processor 31b is executed before a block transfer WRITE message is sent to the adapter 23. When the scanner 31 receives a block transfer WRITE request from the adapter in a Reply 1 or Reply 2 message, the serial processor 31d generates an NMI signal to parallel processor 31b, as represented by process block 141. Next, as shown by process block 142, the parallel processor 31b prepares for a block transfer from the main processor 25b by loading the block transfer address and the second MSW in the latches 66 and 65, respectively. When an address match is made at the comparator, the block transfer WRITE sequence, shown by I/O block 143, is triggered by the INT signals to the two processors 25b and 31b. The second MSW is taken from the bidirectional latch 65 and compared to the first MSW from the address of the block transfer module in the main I/O image table 25d. The main processor 25b then repeatedly writes out data to the bidirectional latch 65 with the I/O address being coupled to the comparator 67 to generate repeated INT signals to the parallel processor 31b. When the number of words indicated in the MSW have been transferred, the parallel processor 144 clears the latches 65 and 66 and generates an NMI signal to the serial processor 31b.

The serial processor 31d must then oversee the transfer through the serial data link 30. As represented by process block 146, it couples a block transfer WRITE message with Command 3 to the rack adapter 23. A Command 3 message is organized as follows:

FLAG/RACK ADDRESS/CMND 03(H)/B.T. DATA/CRC/FLAG

The block transfer data is sent with Command 3 to the adapter 23 at the rack address in the message. The adapter processor 23b then checks the CRC and if the data is valid, it issues a Reply 3 message to acknowledge the receipt of valid data. The Reply 3 message is organized as follows:

FLAG/SCANNER ADDRESS 80(H)/CMND 03(H)/CRC/FLAG

The scanner 31 waits for the acknowledgement as shown by decision block 147. If acknowledgement is not received after two attempts to transmit Command 3 message a fault is declared as shown by process block 148. The output inhibit mask is then cleared, and the sequence is terminated as shown by blocks 139 and 140. If no acknowledgement is received, a fault is recorded, as represented by process block 148, and the sequence is terminated, as represented by terminal block 140.

The parallel processor 31b is operated through execution of firmware instructions stored in its program memory (P-PROM) in FIG. 4 and listed in Appendix E. These instructions are grouped in three major sequences, a main sequence, an NMI sequence and an INT sequence. It will be seen that the main sequence is executed to perform various diagnostic checks and to provide a background program which is interrupted, either to prepare for a block transfer, or to execute a block transfer. During the NMI sequence, the parallel processor 31b senses the type of block transfer request and sets up the appropriate latches to generate an interrupt signal on an address match. By executing the INT sequence, the actual block transfer is accomplished, with data going to or from the block transfer memory 31c, which in the preferred embodiment is a 256-byte random-access memory. Each word (in this case a byte) of data is stored in a discrete line or location in the memory 31c. As seen in Appendix A, the first one hundred twenty-nine lines are used to store block transfer data. The first line stores the data checksum and lines 20C8-20CF are used to store other status data.

Before issuing an NMI signal to the parallel processor 31b, the serial processor 31d stores an interprocessor (S-P) status word, referrred to as a TASK REQUEST word, in the block transfer memory 31c. Through this word, the serial processor 31d requests the parallel processor 31b to perform a block transfer operation. The parallel processor 31b communicates its status to the serial processor 31d through an interprocessor (P-S) status word, referred to as a RESULT word, in which flags are provided for task "success" and for diagnostic test results that would preclude task "success."

As an aid in explaining the operation of the parallel processor 31b, the firmware instructions in Appendix D have been summarized in the flow charts seen in FIGS.

Figure 11A:
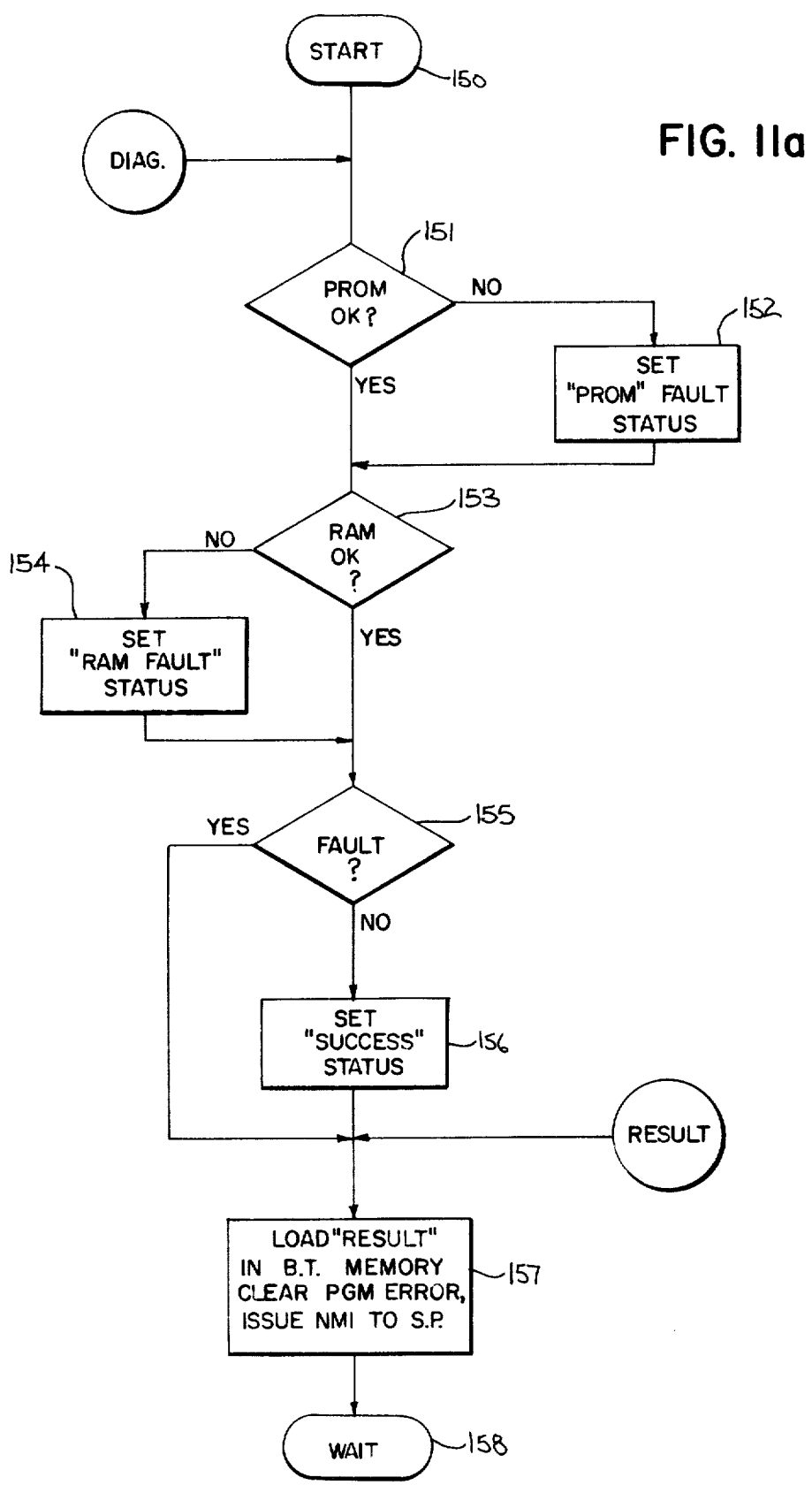
FIGS. 11a–11d are flow charts of the filmware routines executed by the parallel processor of FIG. 3.

11a–11d. The firmware instructions are represented by blocks and organized in a main program routine in FIG. 11a, an NMI interrupt routine in FIG. 11b and an INT interrupt routine in FIGS. 11c and 11d. Referring to FIG. 11a, which shows the main program routine, after start-up represented by start block 150, a DIAGNOSTIC sequence is executed to check for faults in the memories associated with the parallel processor 31b. The execution of the first diagnostic check instructions is represented by decision block 151, where the P-PROM is checked by accumulating its contents and comparing the result to a pre-stored checksum. If this check fails, a "PROM fault" status bit is set in the RESULT word as represented by process block 152; otherwise, the parallel processor 31b proceeds to check the block transfer memory 31c. The execution of this sequence is represented by decision block 153, and is accomplished by writing test codes to each line in the memory, and then reading them back for verification. If this test fails, a "RAM fault" status bit is set in the RESULT word as represented by process block 154. After these tests the fault status is examined as represented by a decision block 155. If no fault was found in either test, a task "success" status bit is set in the RESULT word as represented by the process block 156. After these diagnostics, a RESULT sequence is performed as represented by the next process block 157. There, the RESULT word is stored in the block transfer memory 31c as the interprocessor status word to be read by the serial processor 31d. A program error (PGM ERR) flag is cleared, and then an NMI interrupt signal is sent to the serial processor 31d. As explained before, the NMI signal to the serial processor 31d signals the completion of a task by the parallel processor 31b. The parallel processor 31b then executes a loop instruction, and waits as shown by terminal block 158 until it receives an NMI interrupt signal from the serial processor 31d for further operation. It should be noticed that the main program routine has two return points, DIAGNOSTICS and RESULT, to which the parallel processor 31b returns after execution of an NMI interrupt routine seen in FIG. 11b.

Figure 11B:
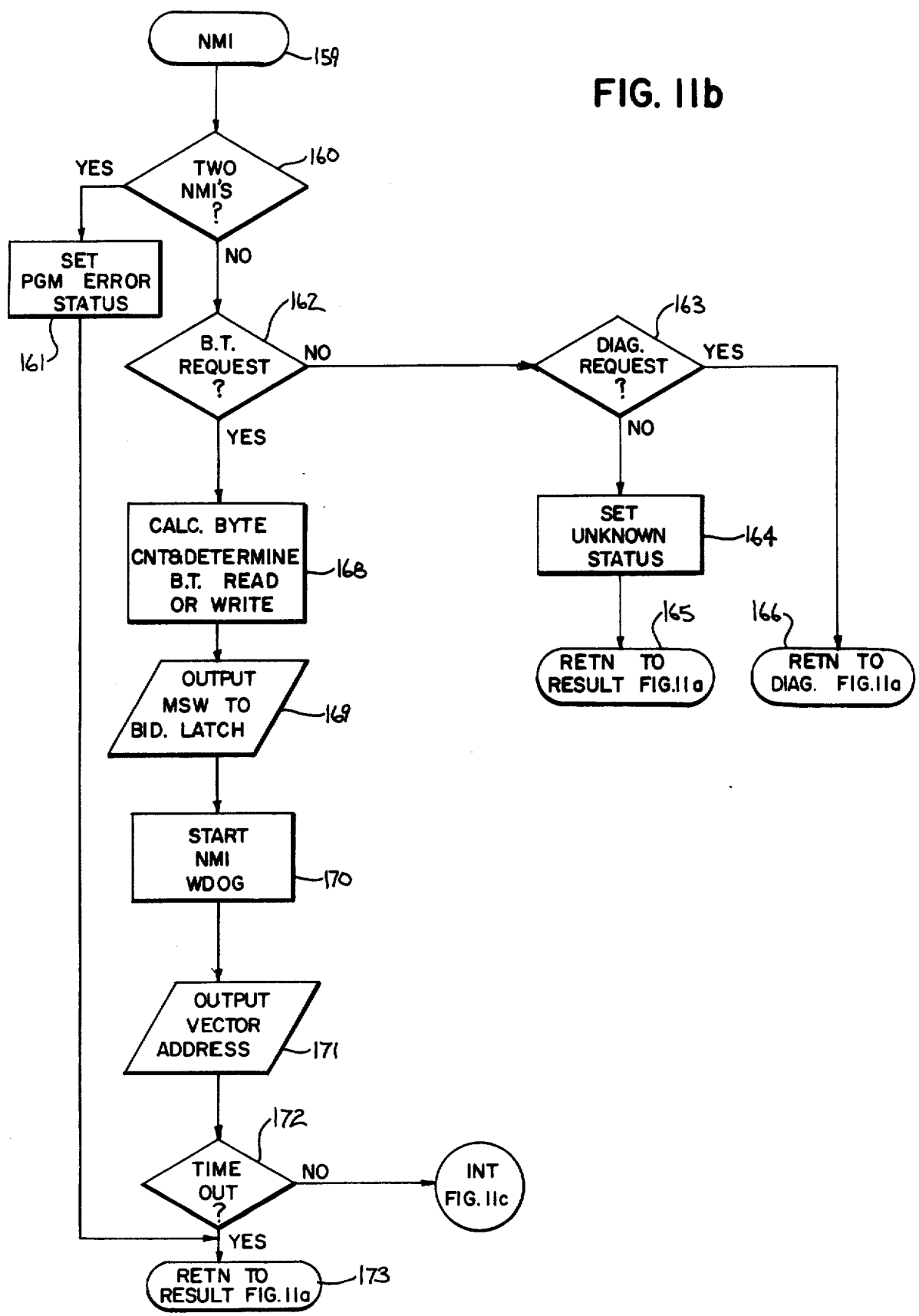

The receipt of an NMI signal to begin the NMI interrupt sequence is represented by start block 159 in FIG. 11b. Each time an NMI signal is received, a program error flag is set, and as represented by decision block 160, this flag is checked to determine whether two successive NMI signals have been received prior to a task completion. If so, a program error status code is loaded into the RESULT word, as represented by process block 161 and parallel processor 31b returns through the RESULT return point to the main program routine in FIG. 11a, as represented by terminal block 173. Assuming the error flag has been properly cleared at the end of a prior task, the parallel processor 31b checks the TASK REQUEST word for a block transfer flag, as represented by decision block 162. Where the flag bit is reset, the processor 31b executes instructions represented by decision block 163 to determine whether memory diagnostics should be performed when returning to the main program. If the diagnostics flag is set in the TASK REQUEST word, the parallel processor 31b returns through the DIAGNOSTIC return point of the main program, as represented by return block 166. If the diagnostics flag is not set, an unknown flag is set, as represented by process block 164, and the parallel processor returns the RESULT sequence in FIG. 11a, as represented by return block 165.

Referring to process block 168 in FIG. 11b, where a block transfer request is pending, the parallel processor 31b calculates the byte count to be transferred and determines whether the transfer is a WRITE block transfer or a READ block transfer. A READ block transfer bit is set when appropriate, for later examination during the INT sequence. For a WRITE block transfer, data will be received from the main processor 25b, while for a READ block transfer, data will be coupled to the main processor 25b. As represented by I/O block 169, a block transfer module status word (MSW) received from the selected rack adapter 23 in a reply message is loaded into the bidirectional data latch 65. Before the vector address of the high density I/O module 24 is set up in the vector address latch 66, as represented by process block 171, an NMI watchdog timer is initialized and started, as represented by process block 170. This timer will allow 250 milliseconds for the main processor 25a to generate the matching address to the comparator 67 that in turn generates an INT signal to the parallel processor 31b. As represented by decision block 172, the parallel processor 31b waits in a loop for either a time out at the end of the 250-millisecond period or for the INT signal. The INT routine also has a 2.2-millisecond watchdog timer for insuring that following INT signals are received at proper intervals until the block transfer is completed. If a time out occurs during the NMI routine, the processor 31b returns to the RESULT portion of the main program routine in FIG. 11a. Otherwise, it proceeds to the INT routine in FIGS. 11c and 11d.

Figure 11C:
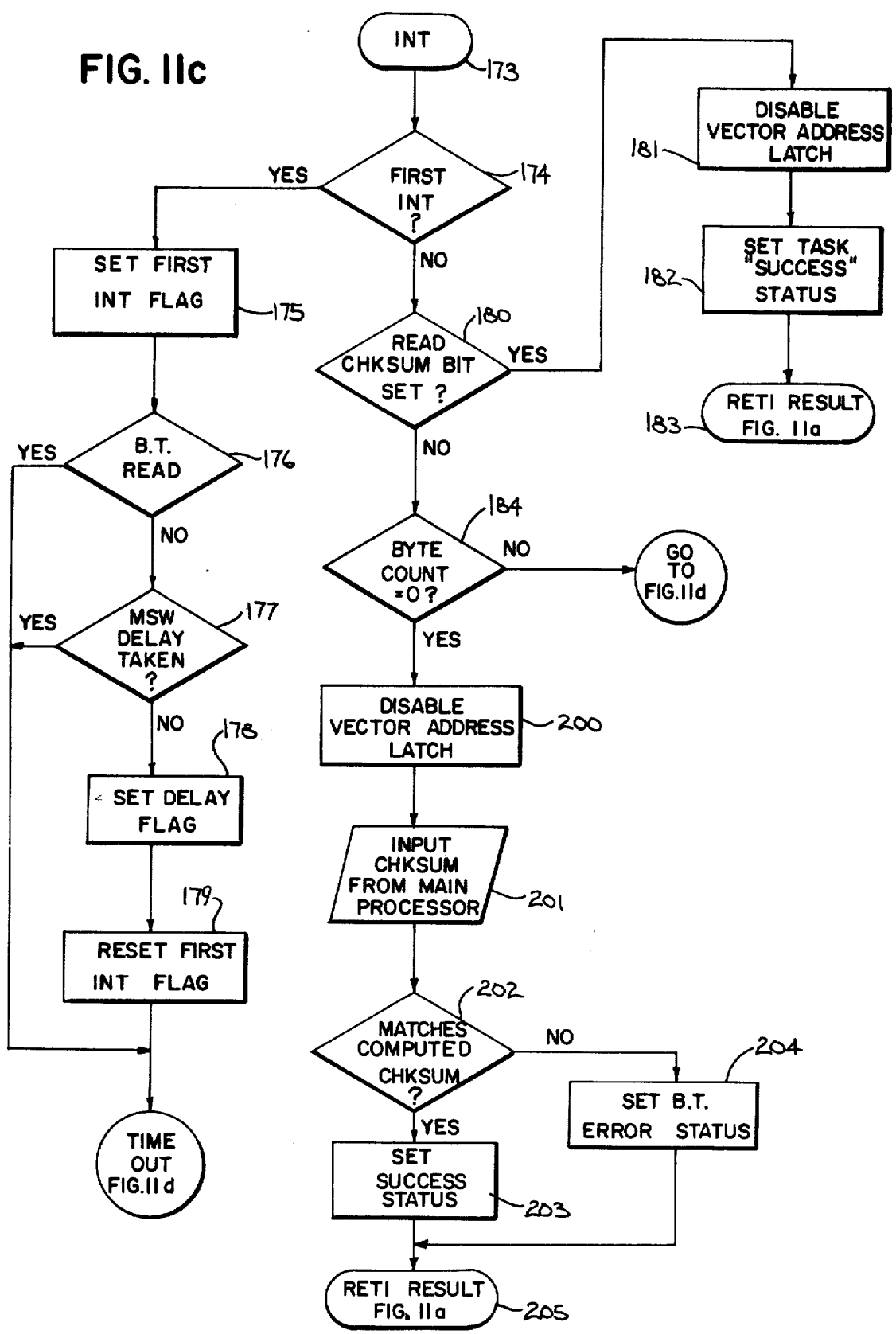
Figure 11D:
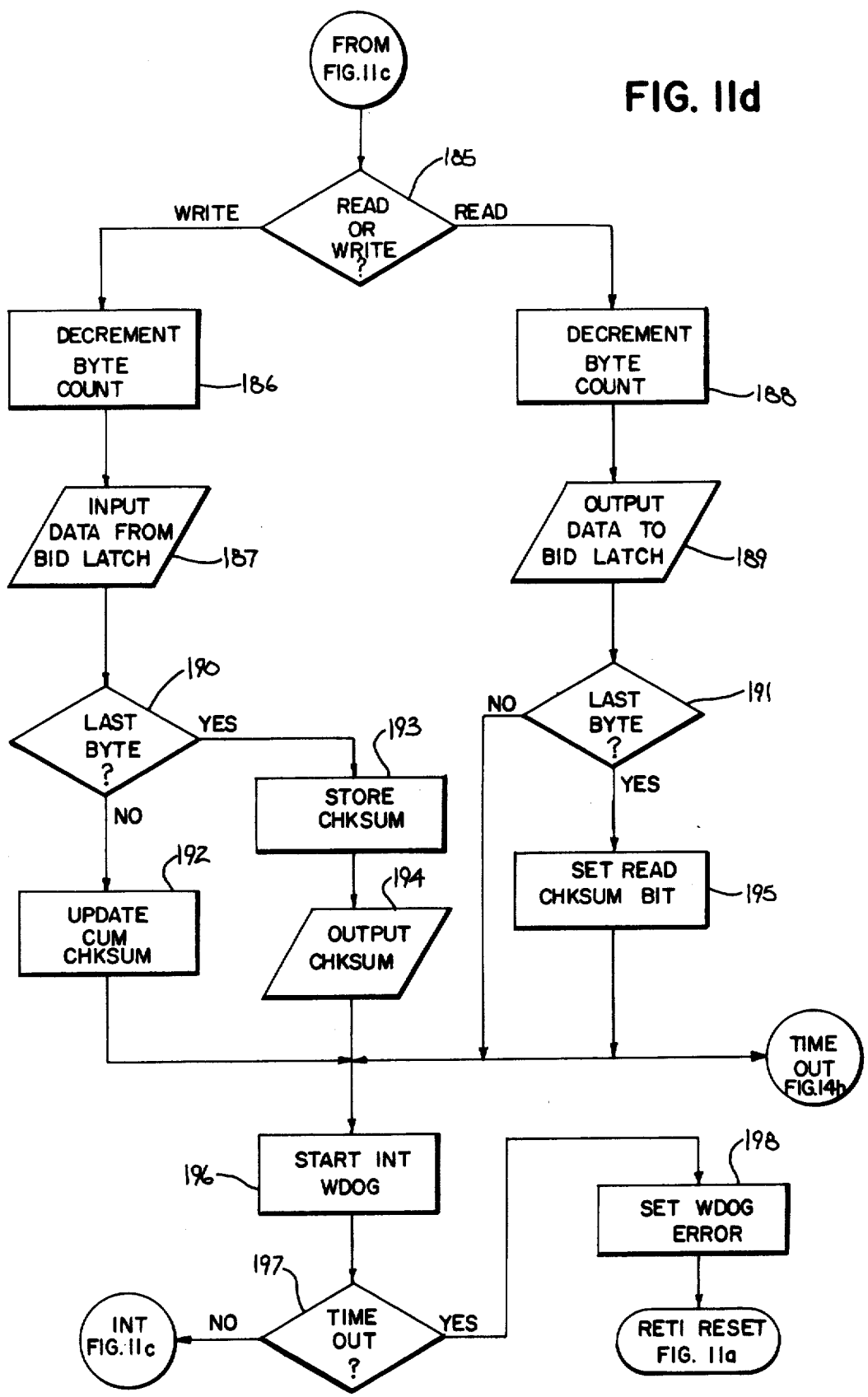

Referring to FIGS. 11c and 11d, an address match at the comparator 67 produces an INT signal to the parallel processor 31b, which is represented by start block 173. The parallel processor 31b then executes instructions, as represented by decision block 174, to see whether this is the first interrupt signal received from the comparator 67 for this particular block transfer sequence. Where a block transfer WRITE operation is to be executed by the main processor 25b, the main processor 25b reads the module status word (MSW) from the bidirectional data latch 65 and interprets that word before the first word of I/O status data is output to the latch 65. Therefore, a delay is introduced through the sequence of instructions represented by blocks 175–179 in FIG. 11c. On the first maskable interrupt (FIRST INT) a flag is set as represented by process block 175. When a "block transfer read" flag resulting from the processing in block 168 in FIG. 11b is examined to see whether the block transfer operation is a READ or a WRITE operation, as represented by decision block 176. Where a READ block transfer is being requested, there is no need for a delay and the parallel processor 31b will proceed to a time out sequence in FIG. 11d. As shown by decision block 177, where the delay has already been taken, the processor 31b will also jump forward to the time out sequence. Where the delay is, in fact, being taken during this cycle of the INT sequence, a delay flag will be set as represented by process block 179 and the FIRST INT flag will be reset as represented by process block 179, before proceeding to the time out sequence.

Referring again to decision block 174, when a FIRST INT flag has been set, a status bit signalling that a checksum should be transferred for a READ operation is examined as represented by decision block 180. This occurs at the end of a READ block transfer operation and results in the disabling of the vector address latch 66 as represented by process block 181 and the setting of a "success" status bit as represented by process block 182. From here, the processor 31b returns to the main program routine in FIG. 11a, and particularly the RESULT sequence, as represented by return block 183.

When a block transfer operation is in progress, the READ CHECKSUM bit mentioned in decision block 180 will not be set, and it will be necessary to execute instructions to examine the byte count, as represented by decision block 184. Block transfers are counted in bytes as the main data bus (MDB) is eight bits wide, and this convention may be used in other embodiments, even where four bits or sixteen bits of data are coupled to or from each I/O module. Where bytes of I/O status data are remaining to be transferred, the processor 31b rechecks the type of transfer, as represented by decision block 185 in FIG. 11d. If a WRITE block transfer is detected, the byte count is decremented, as represented by process block 186, and the next input byte of data is received from the main processor through the latch 65, as represented by I/O block 187. Where a READ transfer is detected in decision block 185, a parallel sequence is executed, wherein the byte count is decremented, as shown by process block 188, and an output byte of data is coupled to the main processor 25b through the latch 65, as represented by I/O block 189. After a byte has been transferred for either the READ or WRITE operation, a check is made as to whether the checksum, the last byte of data, has been received or sent, as represented by decision blocks 190 and 191, respectively. Where I/O status data is still being received, an accumulating checksum is updated as shown by process block 192. In a WRITE block transfer operation, the parallel processor 31b must tally the checksum and compare it with an incoming checksum that is received in block 187 and stored as shown by process block 193. The calculated checksum is then output to the data latch 65 as represented by I/O block 194, so that the main processor 25b can verify a successful communication. In the READ block transfer, a checksum is available in the block transfer memory 31c to be output to the data latch 65 in block 189 and the last byte is detected in decision block 191. A READ CHECKSUM bit is then set, as represented by process block 195, and this bit is examined in block 180 of FIG. 11c. The occurrence of the next INT sequence effectively signals that the checksum has been taken by the main processor 25b.

As mentioned previously, the INT sequence has a 2.2 millisecond watchdog which is started in a TIME OUT portion of the INT routine beginning with process block 196. The parallel processor 31b waits for either a time out or the next INT signal as represented by decision block 197. When a time out occurs, a watchdog error status bit is set as represented by process block 198 and the parallel processor 31b returns to the RESULT sequence in FIG. 11a as represented by terminal block 199. If an INT signal is received prior to the time out, the parallel processor 31b executes another cycle of the INT sequence in FIGS. 11c and 11d.

Referring again to FIG. 11c, where the byte count is zero and the READ checksum bit is not set in decision blocks 180 and 184, it is time to receive a checksum at the end of a WRITE block transfer operation. The vector address latch is disabled as shown by process block 200 and the checksum from the main processor 25b is input as represented by I/O block 201. This checksum is compared with the checksum that has been accumulated by the parallel processor 31b. If a match is found, the "success" status bit is set as represented by process block 203. Otherwise, a block transfer error status bit is set as represented by process block 204. The parallel processor then returns from the INT routine to the RESULT portion of the main program routine, as represented by terminal block 205.

Referring to FIG. 4, the firmware instructions for the serial processor 31d are stored in its program memory (S-PROM) and are listed in Appendix F. The instructions are grouped in a main loop routine and associated subroutines and a set of interrupt routines associated with the SIO and CTC. The interrupt routines are initiated by signals from the SIO which are received at the INT input of the serial processor 31b. These signals are accompanied by data on the serial data bus (SDB) signifying the type of interrupt. An NMI interrupt routine is executed in response to a nonmaskable interrupt (NMI) signal at an NMI terminal on the serial processor 31b.

The main types of SIO-generated interrupts are transmit interrupts, character available interrupts and special receive condition interrupts. The CTC also generates interrupts upon expiration of one or more watchdog timing cycles. Channels A and B are separately responsive to channel-designated interrupts with Channel A having a higher priority than Channel B. Within the interrupt subset for a single channel, the character available, transmit and special condition interrupts have a priority in the order they have been mentioned. When the transmit interrupt is enabled, the serial processor 31d is interrupted by the SIO transmit buffer becoming empty. (This implies that the SIO transmitter must have had a data character written into it so that it can become empty). When enabled, the SIO receiver can interrupt the serial processor 31 either on receiving a character or on detecting a special receive condition, such as a flag segment. The "receiver" and "transmitter" are internal circuits of the SIO which are described in more detail in the Z80-SIO Technical Manual cited above.

For each of the above mentioned SIO and CTC interrupts, the serial processor 31d executes a corresponding interrupt routine of instructions listed in Appendix F. These interrupt routines have been summarized in the form of flow charts 13a-13d. The serial processor 31d also executes a main program sequence represented in the flow charts in FIGS. 12a-12f, which is interrupted to execute the interrupt routines just mentioned.

Referring to FIG. 13a, a transmit buffer empty interrupt routine is executed in response to the interrupt signal, and its beginning is represented by start block 206. As represented by decision block 207, a block of instructions is executed to see whether the last data has been transmitted. If so, another block of instructions is executed to check a reset transmitter pending (RTP) program flag, as represented by decision block 208. Whatever the result, the transmit interrupt pending flag in the SIO is reset as represented by process blocks 209 and 210, however, where the RTP flag is set and an XMIT BUFF EMPTY interrupt occurs, the serial processor 31d will read and execute a group of instructions to initialize the watchdog timer, as represented by process block 211, which introduces a time delay before turning off the transmitter after a message transmission. Returning to decision block 207, where further data is ready for transmission, the data is loaded into the SIO from the buffer memory 31e, as represented by process block 212, and the message byte counter is decremented as represented by process block 213. After proceeding through one of the three alternative paths charted in FIG. 13a, the serial processor returns from the interrupt as represented by return block 295.

When a special receive condition interrupt (SPEC REC INT) signal is received at the INT input on the serial processor 31b, as represented by start block 214 in FIG. 13b, the serial processor 31b reads a receiver status word, as represented by process block 215. The special receive condition interrupt normally results at the end of a message and the receiver status word will then have an active end of message flag. The serial processor 31d then sets a receiver done flag, as represented by process block 216, and returns from the interrupt as represented by return block 217.

Referring to FIG. 13d, the reception of a character generally results in a receive character available interrupt represented by start block 218 in FIG. 13d. The serial processor 31d executes instructions as represented by decision block 219 to check for overflow of the receiver buffer area in the buffer memory 31e. Assuming overflow has not occurred, the incoming character is stored in the buffer memory 31e as represented by process block 220 and the serial processor return from the interrupt as represented by return block 221. Where overflow has occurred, the incoming data is discarded as represented by process block 222.

It should be remembered that there are two sets of sequences such as described in relation to FIGS. 13a, 13b and 13d, one set for each channel. Referring to FIG. 13c, there is a CTC watchdog interrupt routine for each of the channels A and B. The start of the routine at reception of an interrupt signal is represented by start block 223. As represented by decision block 224 and process block 225, the serial processor 31d detects any watchdog time outs and saves the receiver status for processing during a fault diagnostics routine of a type commonly employed by those skilled in the art. The serial processor 31d also executes instructions to restart the watchdog timer. Where a time out has not occurred, the SIO receiver is enabled and the watchdog timer is restarted as represented by process block 226. The serial processor 31d then returns from the watchdog interrupt as represented by terminal block 227.

The hardware interrupt service routines just described are continuously interrupting a main program sequence represented in FIGS. 12a-12f. As discussed above, the serial processor 31d communicates through the scanner SIO, the serial data link 30, and the adapter SIO and adapter processor 23b at the other end of the serial data link 30. As explained previously, this communication is carried out through Command messages 1 through 4 and their Reply messages which must be interpreted.

The manner of operation of the serial processor 31d is better understood by reference to a map of the buffer memory 31e which is contained in Appendix B. As seen there, the first 256 lines of the memory 31e are reserved for a "LAST STATE" table. This table maintains an image of the last reported status of all of the I/O modules in the remote system. The first 128 lines of the table accommodate output data while the second 128 lines are provided to store input data.

Following the "LAST STATE" table is a RACK STATUS table of 64 lines with each line storing a rack status word for a quarter rack of two module groups. The rack status word is defined as seen in Table 9.

TABLE 9

| Bit | Description |
| --- | --- |
| 7 | B.T. Read Pending |
| 6 | B.T. Issued |
| 5 | B.T. Pending |
| 4 | All data sent |
| 3 | B.T. Turn |
| 2 | Faulted Rack |
| 1 | First pass error |
| 0 | Rack Up |

Following the RACK STATUS table is a RACK SIZE/POSITION table of 64 bytes, which shows which I/O slot positions are used, and which are unused and how the slots are grouped by I/O racks. Next, a group of miscellaneous counter, pointer and status words are stored, including a group of hardward interrupt vectors. Then follows a rack table, and the transmit and receive buffers for channel A and channel B, respectively. The rack tables store three words for each rack. The first of these holds the rack address; the second holds the corresponding address in the I/O memory 31a and the third holds the I/O update mask which indicates where I/O data has changed in the I/O memory 31a from the LAST STATE IMAGE table. The receive and transmit buffers for each channel occupy areas for storing 192 words of data and this area may be apportioned in different ways between the receive and transmit buffers. Following the buffer storage for channel B are more miscellaneous pointer, counter and status words.

Figure 12A:
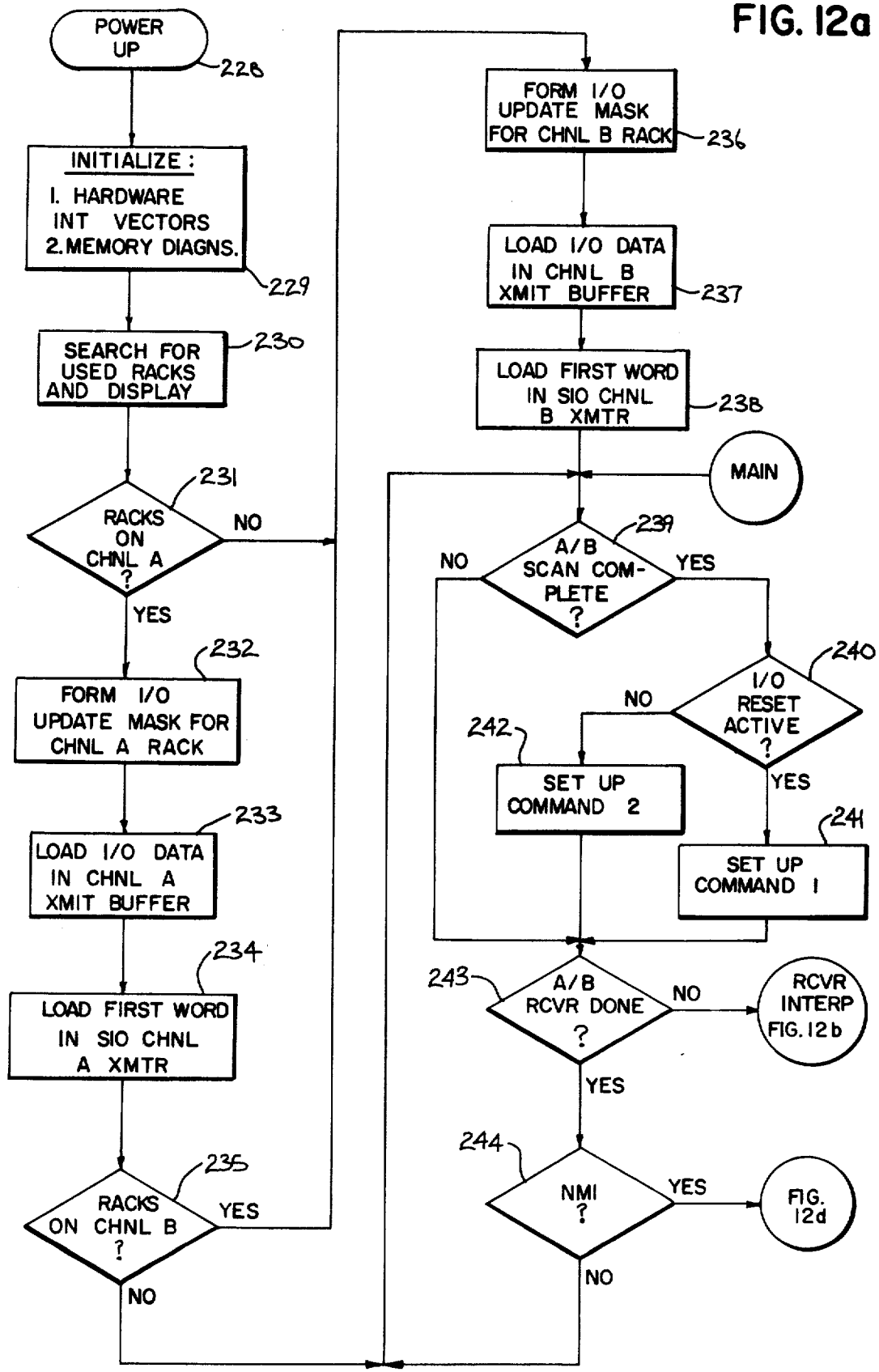

Referring now to FIG. 12a, after the serial processor 31d is powered up as represented by start block 228, instructions in its associated program memory (S-PROM) are executed to set up the table of hardware interrupt vectors mentioned above to communicate with the SIO and the CTC, and to perform memory diagnostics on the buffer memory 31e and the S-PROM. Execution of this initialization routine is represented by process block 229. Next, the serial processor 31d executes a block of instructions represented by process block 230 to search for I/O racks being used. For each rack 1-7 being used in a system, one of the LED status indicators 33 on the forward portion of the scanner module 31 seen in FIG. 1 is illuminated. Next, as represented by decision block 231, it is determined whether these racks are connected through channel A to the scanner 31.

The serial processor 31d then begins an I/O scan in which communication is initiated with the first rack on each channel. The serial processor 31d alternately scans a rack in each channel executing the blocks of instructions 231-238. As represented by process block 232, the I/O data which is stored in the I/O memory 31a for the first rack on channel A is compared with the I/O data which is stored in the LAST STATE IMAGE table in the buffer memory 31e for the same rack, to see whether "changed I/O status data" is present in the I/O memory 31a. If so, a bit is set in an update mask word for each module group for which changed data is detected. As represented by process block 233, data is then loaded into a channel A transmit buffer area in the buffer memory 31e.

This sequence is seen in more detail in FIG. 12c, where the call to the subroutine is represented by start block 275. Next, as represented by process block 276, the rack address word and a command word for a message are stored in the channel A transmit buffer area in the buffer memory 31e. If there is a pending block transfer request, the block transfer busy bit is set in the command word and the B.T. issued bit is set in the rack status word as represented by process block 277. A refresh mask and the update mask are combined, and based on the bits that are set in the resulting mask word, data for corresponding I/O module groups is moved from the I/O memory 31a to the buffer memory 31e as represented by process block 278. If a block transfer is pending at a particular address, however, the mask bit for that address is reset until the block transfer module has been serviced. The command word for either Command 1 or Command 2, and all of the message data necessary to generate a Command 1 or Command 2 message are loaded into the buffer memory 31e, as represented by process block 279. The serial processor 31d then returns to the sequence in FIG. 12a, as represented by return block 280, and loads the first word of the message into the SIO channel A transmitter, as represented by process block 234. A similar sequence of blocks 235-238 is then executed for a rack 10 connected to the scanner 31 through channel B. This effectively establishes communication with the first rack on each of the serial channels A and B.

After establishing communication, the serial processor 31d enters a MAIN program loop to scan each of the other racks connected through serial channels A and B until scanning of all of the racks 10 is completed. "Scanning" in this instance involves the transmission and receipt of serial data messages to and from the respective racks 10, as contrasted with localized scanning, which involves sequential addressing and coupling of data through a backplane or parallel data bus. As represented by decision block 239, the serial processor 31d begins this loop by checking several status bits to determine whether the scan of the channel A and B racks has been completed. When a scan is completed, the status bits are reset and the I/O reset line is checked as represented by decision block 240 to see whether it is active. Where the I/O reset line is active, a command word for a Command 1 is set up (stored) in a command word register as represented by process block 241. Where the I/O reset line is not active, a command word for Command 2 is set up (stored) in the command register, as represented by process block 242. The next time a message transfer for conventional I/O status data is made over the serial data link, the contents of the command word register will be assembled as part of that message. As mentioned above, when the I/O reset line is active, the outputs are reset and only inputs are coupled in the reply message to the scanner 31. Besides transmitting messages, the serial processor 31d must also determine what message data has been received, and this is represented by decision block 243. After all data has been received from the I/O racks 10, the serial processor 31d checks to see whether it has received an NMI interrupt signal from the parallel processor 31b, as represented by decision block 244. If no such signal has been received, the serial processor 31d loops back to the beginning of the MAIN program loop.

Figure 12B:
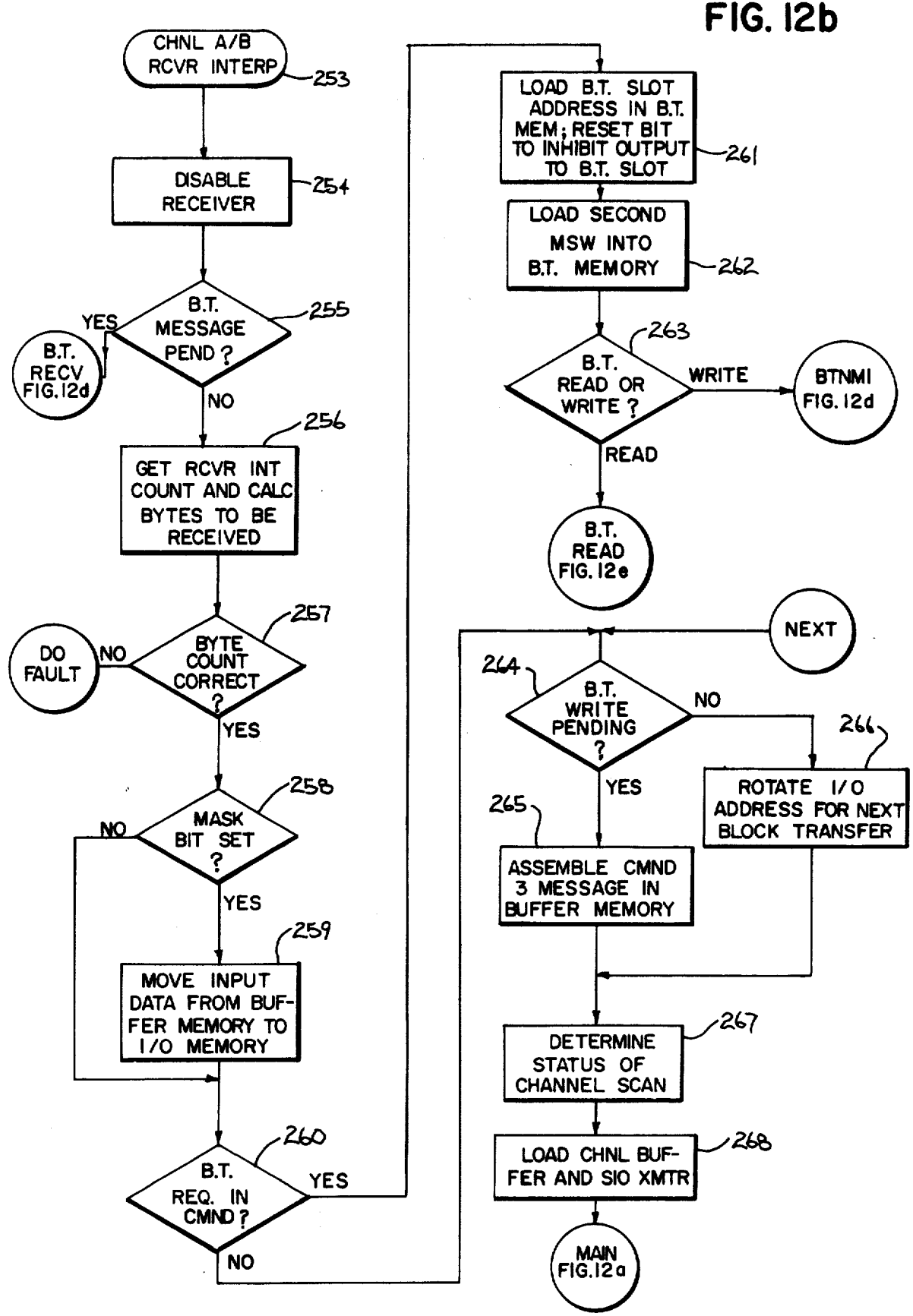
Figures 12E, 12F:
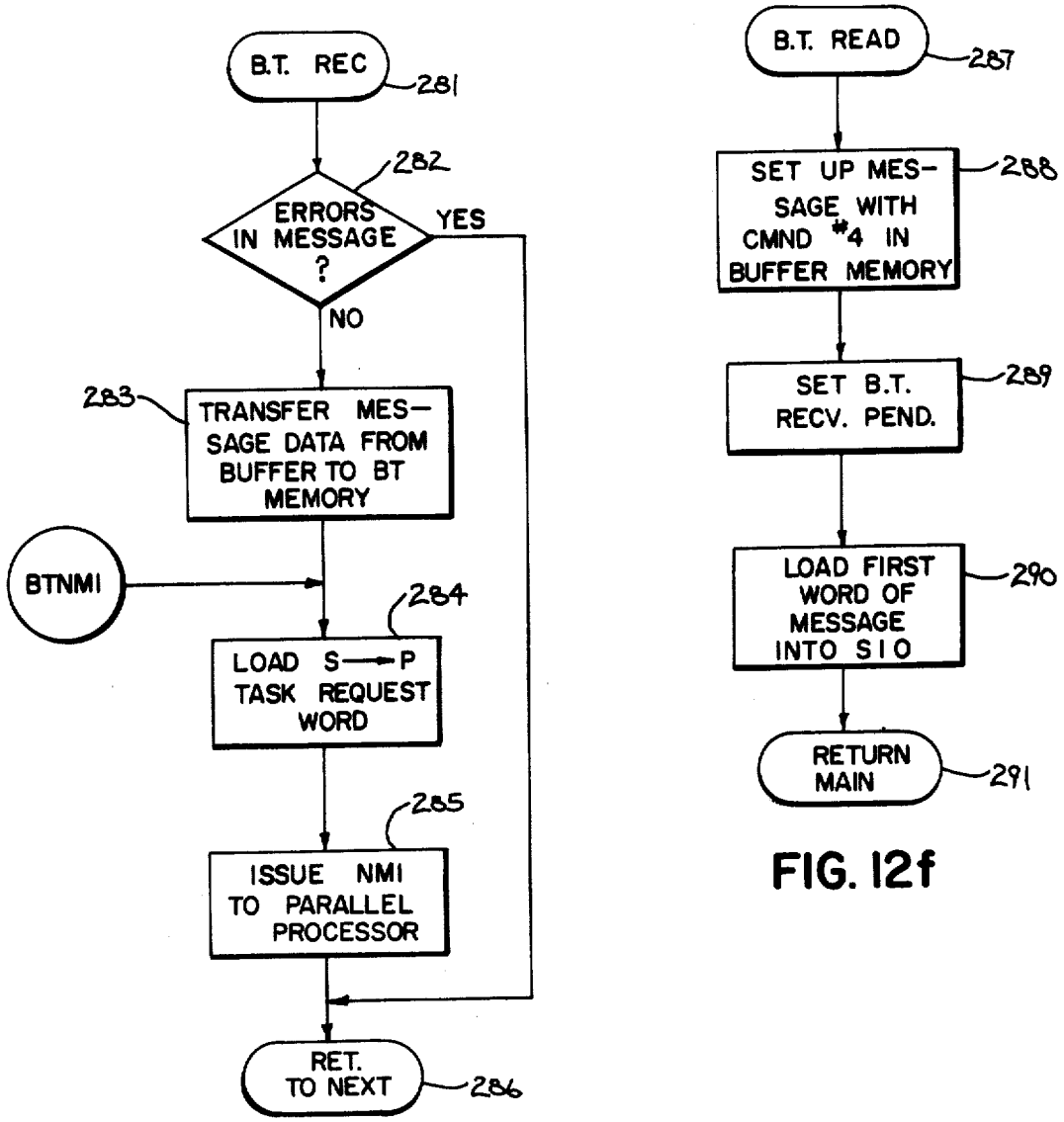

The NMI interrupt processing routine for the serial processor 31d is seen in FIG. 12f. The serial processor 31d executes a block of instructions represented by decision block 245 to determine whether the first phase of a WRITE transfer operation or the second phase of a READ transfer operation has just been completed by the parallel processor 31b. Therefore, it checks the TASK REQUEST (TASKRQ) word to determine whether there is a pending block transfer request. Where such a request is detected, the serial processor 31d executes instructions represented by process block 246 to clear a block transfer inhibit mask bit in the miscellaneous area of the buffer memory 31e and to load zeroes into the block transfer slot addresses (BTSLOT) location in the block transfer memory 31c. The block transfer inhibit flag and slot address have served their purpose. The serial processor 31b then executes an instruction to determine which of the two types of block transfer operations has in fact occurred, as represented by decision block 247. If a block transfer READ operation is in progress, it has been completed with the transfer between the parallel processor 31b and the main processor 25b, and therefore, the block transfer pending bit is reset as represented by process block 248. Where a block transfer WRITE operation is in progress, a block transfer WRITE pending flag is set as represented by process block 249. The serial processor 31d then loops back to the beginning of the MAIN program loop. When no block transfer is detected in decision block 247 after an NMI interrupt, the RESULT word is checked for diagnostic success as represented by decision block 250. Where no errors were detected during operation of the parallel processor 31b, the serial processor returns to the MAIN program loop. Where an error has occurred, and cannot be corrected, the error signal is represented by process block 251 and the operation of the serial processor 31d is halted as represented by terminal block 252.

Referring to FIG. 12b, a receiver interpreter subroutine (CHNL A/B RCVR INTRP) is charted, and there is one of these subroutines corresponding to each of the serial channels A and B. A call to the subroutine is represented by start block 253 and is executed when the decision in block 243 in FIG. 12a is negative. The processor 31d first executes a block of instructions represented by process block 254 to disable the SIO receiver. The serial processor 31d then looks for a message with a block I/O status data that has been received and temporarily held in the buffer memory 31e. It does this by executing a block of instructions represented by decision block 255, wherein the receipt of a message with a block of I/O status data results in a block transfer receiver pending flag being set. When this condition is detected, the serial processor 31d jumps to a block transfer receiver (BTREC) routine beginning with start block 281 in FIG. 12e. There, the serial processor 31d first examines the message for errors, as represented by decision block 282 and returns to a NEXT position of CHNL A/B RCVR INTRP routine if any any such errors are found. Assuming the message is without error, the block of I/O status data in the message is transferred from the buffer memory 31e to the block transfer memory 31c, by executing a block of instructions represented by process block 283. The serial processor 31d then enters a BTNMI sequence to signal the parallel processor 31b to initialize for a block transfer with the main processor 25b. To accomplish this, the serial processor 31d loads the TASK REQUEST word into the block transfer memory 31c through execution of instructions represented by process block 284, and then issues an NMI signal to the parallel processor through execution of instructions represented by process block 285. The serial processor 31d would return from the BTREC subroutine to execute decision block 264 in FIG. 12b, thereby skipping blocks 256-263.

When a block transfer message is not pending, the serial processor 31d executes a block of instructions represented by process block 256 to calculate the number of bytes in the previous incoming message, and to calculate the number of bytes that would be expected according to the information provided in the control words, including the mask work, of the message. These two byte counts are compared by executing a block of instructions represented by decision block 257. If the byte count is not correct, a fault sequence is executed before returning to the MAIN program loop in FIG. 12a. Assuming the byte count is correct, instructions represented by decision block 258 are executed to examine the appropriate bit in the mask word and determine whether refreshed or updated conventional I/O status data has been received with the message. If so, instructions represented by process block 259 are executed to move this data from the buffer memory 31e to the I/O memory 31a. Where the mask bit indicates that no refreshed or updated I/O status data is applicable to this particular I/O address, block 259 is skipped. Next, a message command word is input from a temporary storage location, and as represented by decision block 260, is examined for a block transfer request. It will be remembered that Reply 1 and Reply 2 messages from the adapter contain both the conventional I/O status data for an I/O rack and additional information for initializing a block transfer. Therefore, if a block transfer request is found in the command/reply word of the message, a block of instructions represented by process block 261 is executed to load the block transfer slot address into the BTSLOT location in the block transfer memory 31c and to reset a bit in a block transfer inhibit mask in the miscellaneous area in the buffer memory 31e. This last action prevents the writing of data to the high density module 24 at that address, until the block transfer request has been serviced. Next, as represented by process block 262, a module status word (MSW) in the reply message is loaded into the block transfer memory 31c for later access by the parallel processor 31b. As represented by decision block 263, the READ and WRITE flags of the module status word (MSW) are also examined to determine whether the serial processor 31d should next communicate with a rack adapter 23 or the parallel processor 31b. Where the module status word contains a WRITE flag, the serial processor 31d branches to the BTNMI portion of the routine seen in FIG. 12e. For a block transfer WRITE operation, the serial processor 31d must inform the parallel processor 31b that a block of I/O status data is to be obtained from the main processor 25b. The serial processor 31d does this through the TASK REQUEST word and NMI interrupt involved in execution of blocks 284 and 285.

Referring again to decision block 263 in FIG. 12b, where a block of I/O status data is to be read from a rack adapter 23, the serial processor 31d jumps to a BT READ sequence seen in FIG. 12f. The beginning of this sequence is represented by start block 287 and is followed by process block 288, which represents execution of a sequence of instructions to set up a Command 4 message in the buffer memory 31e for transmission to a rack adapter 23. The BT receiver pending flag is set as represented by process block 289 so that the serial processor 31d will look for a reply from the adapter 23. Then the first word of the Command 4 message is loaded into the SIO as represented by process block 290 and the serial processor 31d returns to the MAIN program loop in FIG. 12a. The SIO will transmit the first word of the message and begin generating transmit buffer empty interrupts to repeatedly execute the sequence in FIG. 13a until the message has been completely transmitted.

Referring again to FIG. 12b where the reply message from the adapter does not contain a block transfer request, the parallel processor executes instructions represented by decision block 264 to determine whether a WRITE command message should be assembled and sent to the rack adapter. Where this operation is signalled, a Command 3 message is assembled in the buffer memory 31e, as represented by process block 265. This includes the transfer of a block of I/O status data from the block transfer memory 31c to the buffer memory 31e under the control of the serial processor 31d. This block also includes the loading of the first word of this message into the SIO. Where a block transfer WRITE is not to be performed, the miscellaneous areas in the buffer memory 31c are reconfigured to permit block transfers between the scanner 31 and the adapter 23 for the next I/O rack 10, as represented by process block 266. The serial processor 31b then determines the status of the channel scan and sets appropriate status bits to be processed after it returns to the MAIN program loop, as represented by process block 267. Finally, as represented by process block 271 and the serial processor 31d loads the first word of the next command message into the SIO and returns to the MAIN program loop in FIG. 12a.

Referring to FIG. 9, the adapter processor 23b cooperates with the A-SIO to communicate through the serial channel B similar to the serial processor 31b and the SIO at the other end. The adapter processor 23b, however, must also communicate through the control lines (terminating with the hexagon symbol in FIG. 9) and the I/O data bus 19a which connect to the I/O backplane. Firmware instructions for the processor 23b are stored in the adapter program memory (A-PROM) and are organized in routines in Appendix G that are summarized in FIGS. 14a-14h. In executing these routines, the adapter processor 23b uses the adapter RAM 23c as a scratchpad for storage of pointers, counters and intermediate results as well as for storage of I/O and block transfer data. Reference to the organization of the adapter RAM 23c seen in Appendix C is helpful in understanding the routine to be described.

Figure 14A:
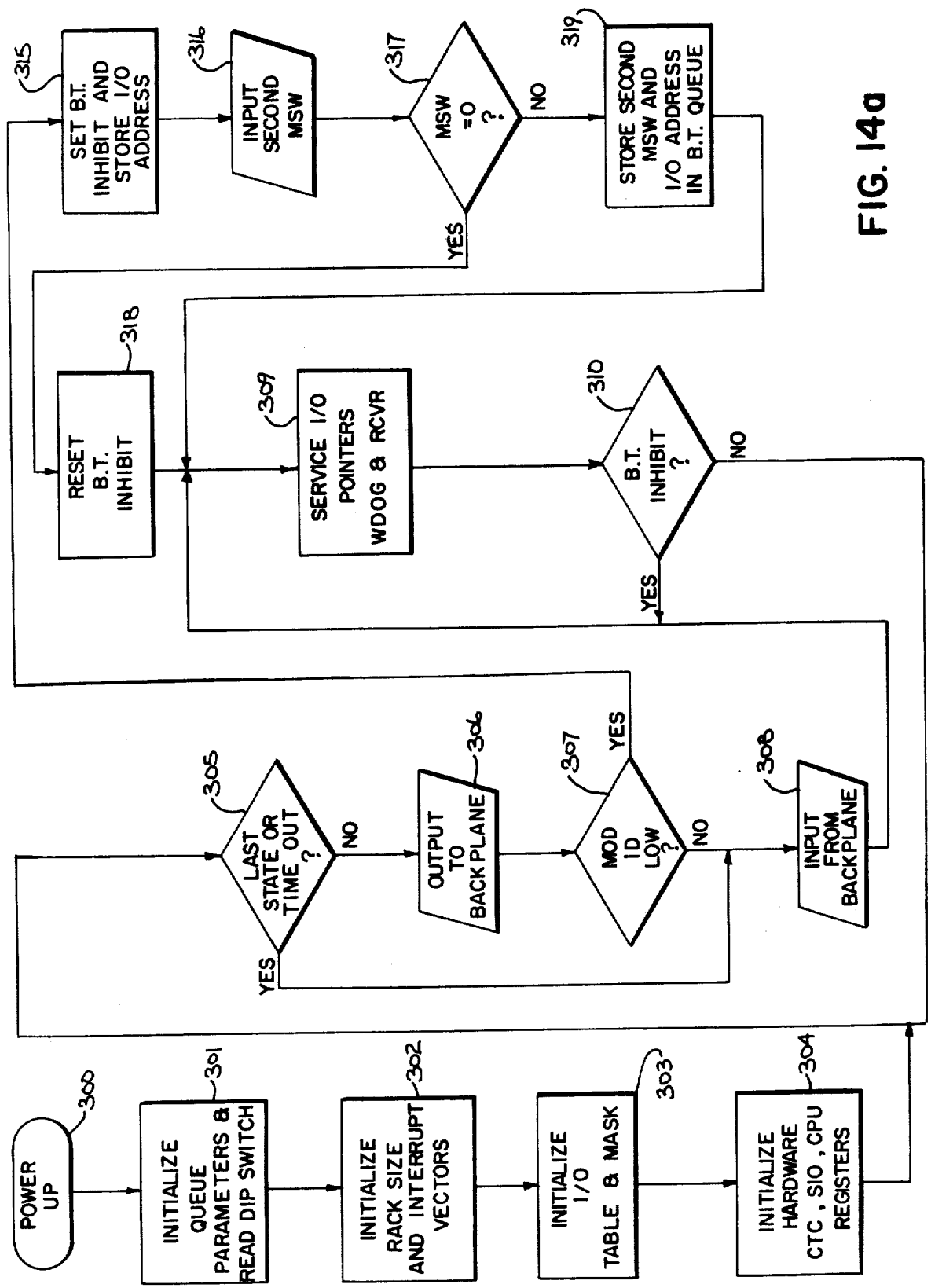
FIGS. 14a–14h are flow charts of the firmware routines executed by the adapter processor of FIG. 3.

The adapter processor 23b executes certain initialization tasks and then enters a loop as seen in FIG. 14a in which the I/O modules are sequentially scanned until the processor 23b is interrupted by the A-CTC or the A-SIO. The initialization tasks are begun after power up, which is represented by start block 300. The adapter processor 23b queues block transfer requests in a block transfer queue at addresses 139A-13BF in the adapter RAM 23c as seen in Appendix C. As shown by process block 301, queue parameters including the size of the queue are determined, and a head and tail address are loaded into selected lines in the queue area of the adapter RAM 23c. The DIP switch inputs 23a are also read and stored in the adapter RAM 23c. The data contained in the DIP switch input word is defined in Table 10 below.

TABLE 10

| Bit | Description |
|---|---|
| 7 | Backplane error |
| 6 | Processor Reset Lock-out |
| 5 | Last State |

TABLE 10-continued

| Bit | Description |
| --- | --- |
| 4 | Address flag |
| 3 | Initialization flag |
| 2 | Last Rack |
| 1 | Rack Size High |
| 0 | Rack Size Low |

As represented by process block 302, instructions are executed to determine rack size and the mask for coding inputs is sized accordingly. As shown by process block 303, interrupt vector addresses to be used by the processor 23b in responding to SIO and CTC interrupts are loaded into the area beginning at line 1192(H) in the adapter RAM 23c. Next, a block of instructions represented by process block 303 is executed to initialize parameters for the output image table 23d at 13CO(H) and the input image table 23e at 13DO(H) in the adapter RAM 23c, as seen in Appendix C. An I/O mask is also initialized according to the size of the I/O rack 10 and the number of input modules 11 included therein. As represented by process block 304, the A-CTC, the A-SIO and certain working registers in the adapter processor 23b are initialized.

The processor 23b then enters a loop where it remains until interrupted or until power is recycled. In this loop the adapter 23 continuously scans the I/O modules 11 in its rack 10 to update the input image table 23e in the adapter RAM 23c and to couple fresh output status data to the I/O modules 11. A block of instructions represented by decision block 305 is executed to see whether the I/O module 11 is in a last state or time out status. In recovering from these conditions, inputs are coupled first, so the processor would skip the following blocks 306 and 307. As represented by I/O block 306, when last state or time out status is not indicated, a byte-sized word of data is output to the backplane at the first I/O address in the rack 10. This will be a word of output status data for a conventional I/O module 11 or a first MSW for a high density I/O module 29. A control signal is coupled to the backplane with this word of output data, and if a high density I/O module 24 is present at the I/O address, a signal will be returned on the MOD ID line (FIG. 9). This return signal from the module 24 will be interpreted by the adapter processor 23b as a request for service signal. If the result of the MOD ID check represented by decision block 307 is negative, meaning probably that a conventional I/O module 11 is present, a byte-sized word of data is input from the I/O module 11 to the input image table 23e as shown by I/O block 308. Next, as shown by process block 309, the I/O backplane pointers, various counters, a processor watchdog timer and the A-SIO receiver are serviced. After this service operation, the block transfer inhibit table (Appendix C) is checked for an inhibit word at a line corresponding to the new I/O module group address, as seen in decision block 310. If so, the processor 23b loops back to rotate the I/O pointer and advance a block transfer inhibit pointer, to prevent data from being written to a module group for which a block transfer request is pending. Where no block transfer inhibit word is found, data is coupled to or from the next I/O address by re-executing blocks 305-308.

Where a new block transfer request is detected in decision block 307, the processor 23b branches to execute instructions represented by process block 315 to set all the bbits in a block transfer inhibit word and store it in a corresponding line in the block transfer inhibit table. As shown by I/O block 316, the second MSW is input from the high density I/O module 24 and is analyzed as shown by decision block 317 to determine whether zeroes are present. If so, the block transfer has been completed or is not pending, and the block transfer inhibit word is reset to zeroes as represented by process block 318. The I/O address is then rotated by re-executing the block of instructions represented by process block 309. Where a MSW is detected, it is stored with the I/O slot address of the high density module 24 in the block transfer queue as represented by process block 319 before servicing the I/O pointers, processor watchdog timer and A-SIO receiver in block 309. The sequence in FIG. 14a provides a continuous scanning operation for coupling I/O data to and from the I/O modules 11 and for detecting block transfer request signals from high density I/O modules 24.

The adapter scanning sequence is interrupted when the scanner module 31 begins communicating with the adapter 23 and provides a character or word to the A-SIO that generates a character available interrupt to the adapter processor 23b. Actually, two characters are received by the A-SIO before the interrupt is generated for the first character or word. The processor 23b then executes instructions in a character available interrupt routine represented in FIG. 14b. Following the character available interrupt represented by terminal block 320, the word is checked to see whether it is the rack address word, and an appropriate status bit is set, which is represented by decision block 321. The processor 23b then executes instructions as represented by decision block 322 to determine whether the rack address belongs to its host I/O rack 10. If so, the processor 23b returns from this particular character available interrupt as represented by terminal block 330. Where the address of another rack is received, the processor 23b in this rack 10 will initialize the A-SIO to receive data only, as represented by process block 323, but such data will not be coupled to either the adapter RAM 23c or the I/O modules 11. Where the received word is not a rack address word, the processor 23b executes instructions to determine whether the word is a Command 3 word, as represented by decision block 324.

When data is coupled to the backplane during a block transfer, it is coupled "on the flow" as opposed to being stored in the receiver buffer of the adapter RAM 23c for coupling during the main program loop of FIG. 14a. The data is briefly stored in registers of the A-SIO and the adapter processor 23b, however, because a short delay is desirable for proper timing of the transfer.

The adapter processor program memory (A-PROM) stores two subroutines, one for coupling data from the A-SIO to the backplane, and the other for coupling data from the A-SIO to the receiver buffer in the adapter RAM 23c. Depending upon the result in decision block 324, the adapter processor 23b loads the address of one of these two routine into a register in the A-SIO so that when the next character available interrupt occurs, the processor 23b will be directed to one of these routines. Where a Command 3 is detected in decision block 324, the vector for coupling data from the A-SIO to the backplane is set up as represented by process block 325. Where another command is present, the vector is set up so that data will be coupled from the A-SIO to the receiver buffer in the adapter RAM 23c, as represented by process block 326.

During each character available interrupt resulting from receipt of a Command 3 message, the processor 23b determines whether the block transfer has been completed as represented by decision block 327 and sets a pointer to the receiver buffer or to the high density module 24 accordingly, as represented by process blocks 328 and 329, before returning from the interrupt as represented by terminal block 330.

Figure 14H:
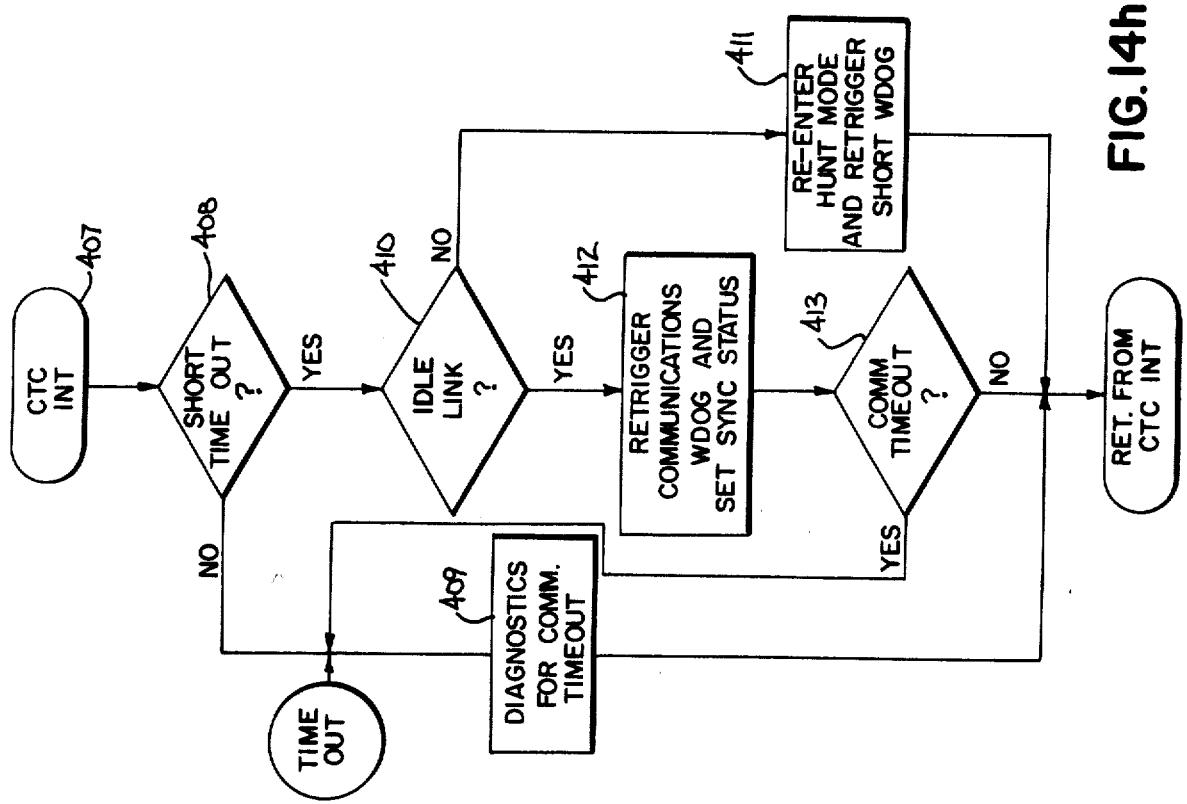
Figure 14B:
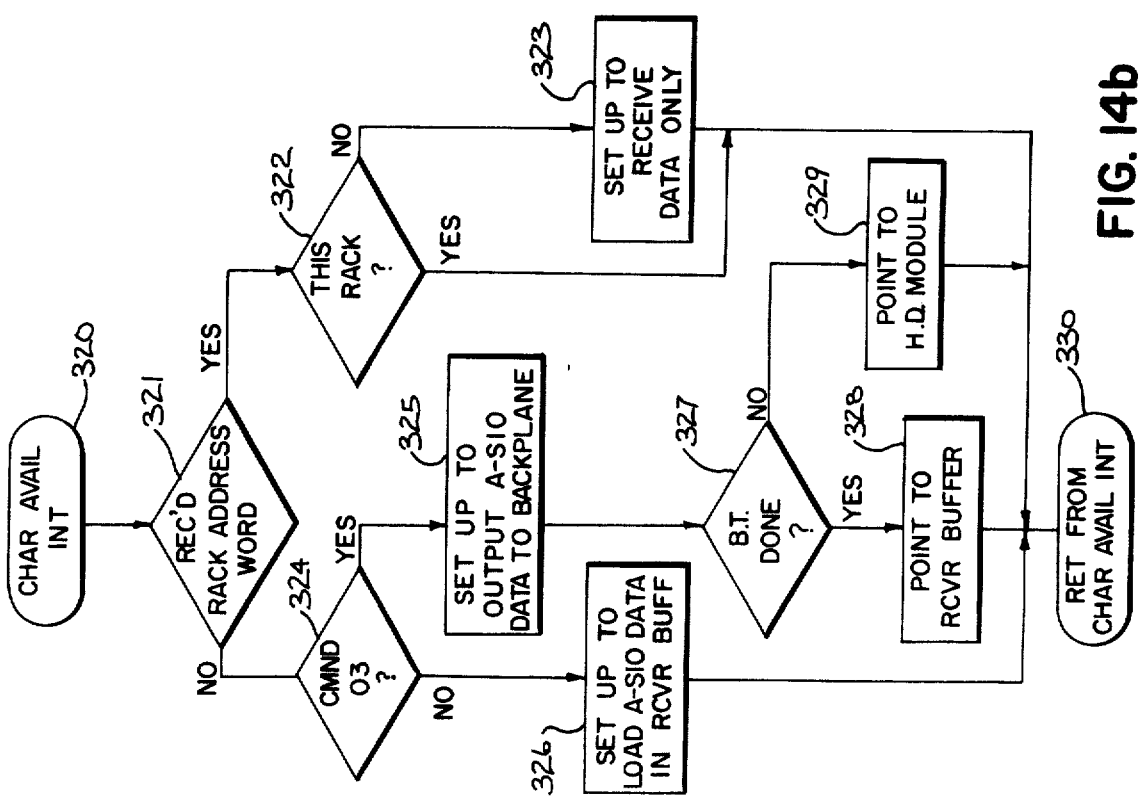
Figure 14C:
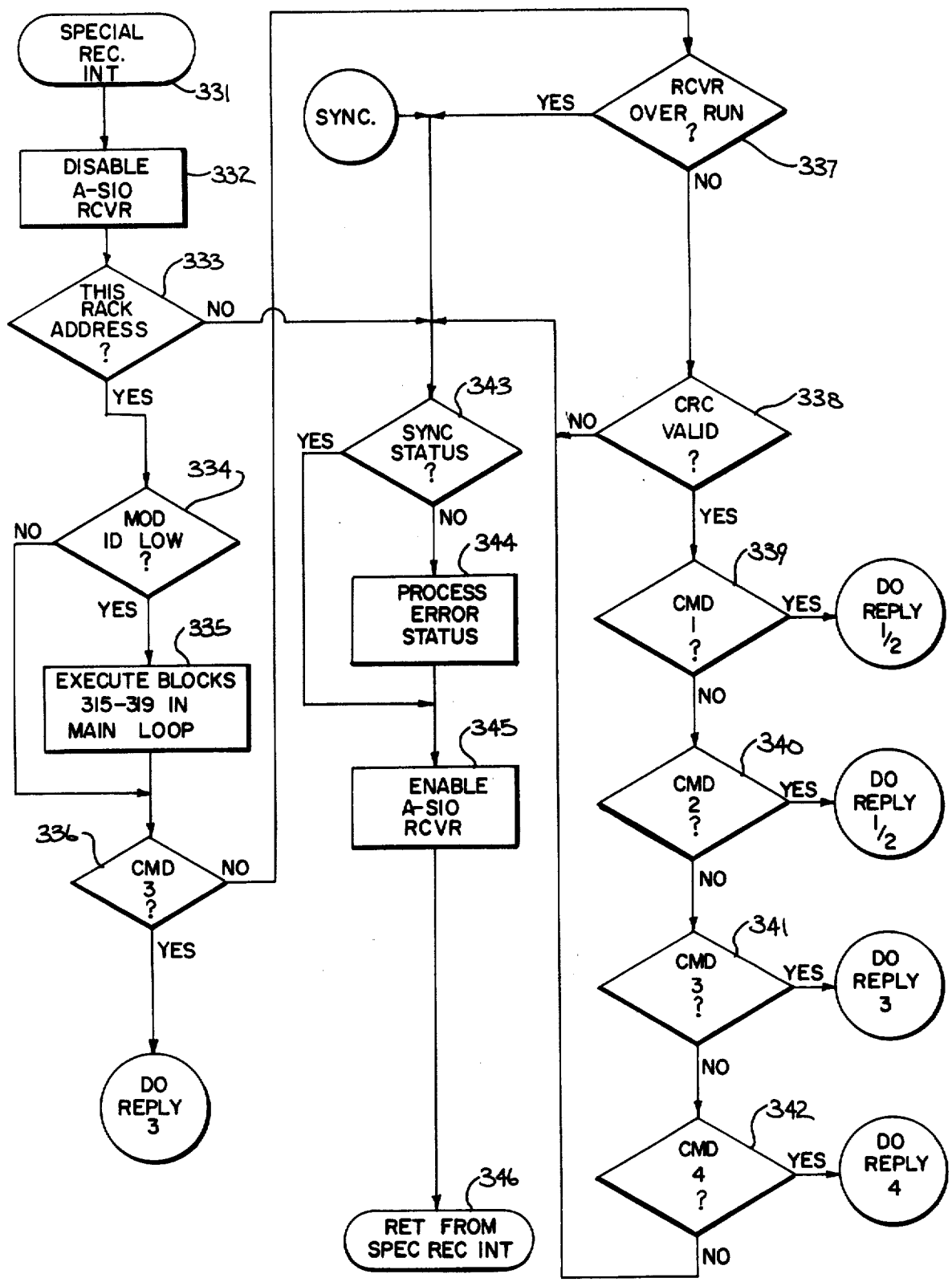

At the end of a message, the A-SIO generates a special receive interrupt signal represented by start block 331 in FIG. 14c. The adapter processor 23b responds by sending a disable signal to the A-SIO receiver as represented by process block 332. The adapter processor 23b then executes instructions represented by decision block 333 to determine whether communication is being carried on with it or another I/O rack 10 along serial channel B by checking the rack address status bit that was determined by executing of block 321 in FIG. 14b. Assuming this adapter 23 is fully communicating with the scanner 31, the processor 23b next determines whether a MOD ID signal had been detected in block 307 of FIG. 14a and this is represented by decision block 334. Timing requirements are such that the processor 23b must return to execute blocks 315–319 for high density I/O modules before continuing the special receive interrupt routine. Before exiting, the processor 23b sets an address to return to this exit point. Upon its return the processor 23b determines whether a Command 3 word has been received as part of a message as represented by decision block 335. If so, the processor jumps to a Reply 3 message sequence; otherwise, it executes an instruction represented by decision block 337 to test for receiver overrun. Assuming there has been no receiver overrun, the two received CRC words are examined by execution of instructions represented by decision block 338. If the CRC words are valid, the processor examines the received command word in decision block 339–342, and upon detecting a received command, jumps to a Reply 1 sequence, a Reply 3 sequence or a Reply 4 sequence according to the command detected in decision block 339–342.

Figure 14D:
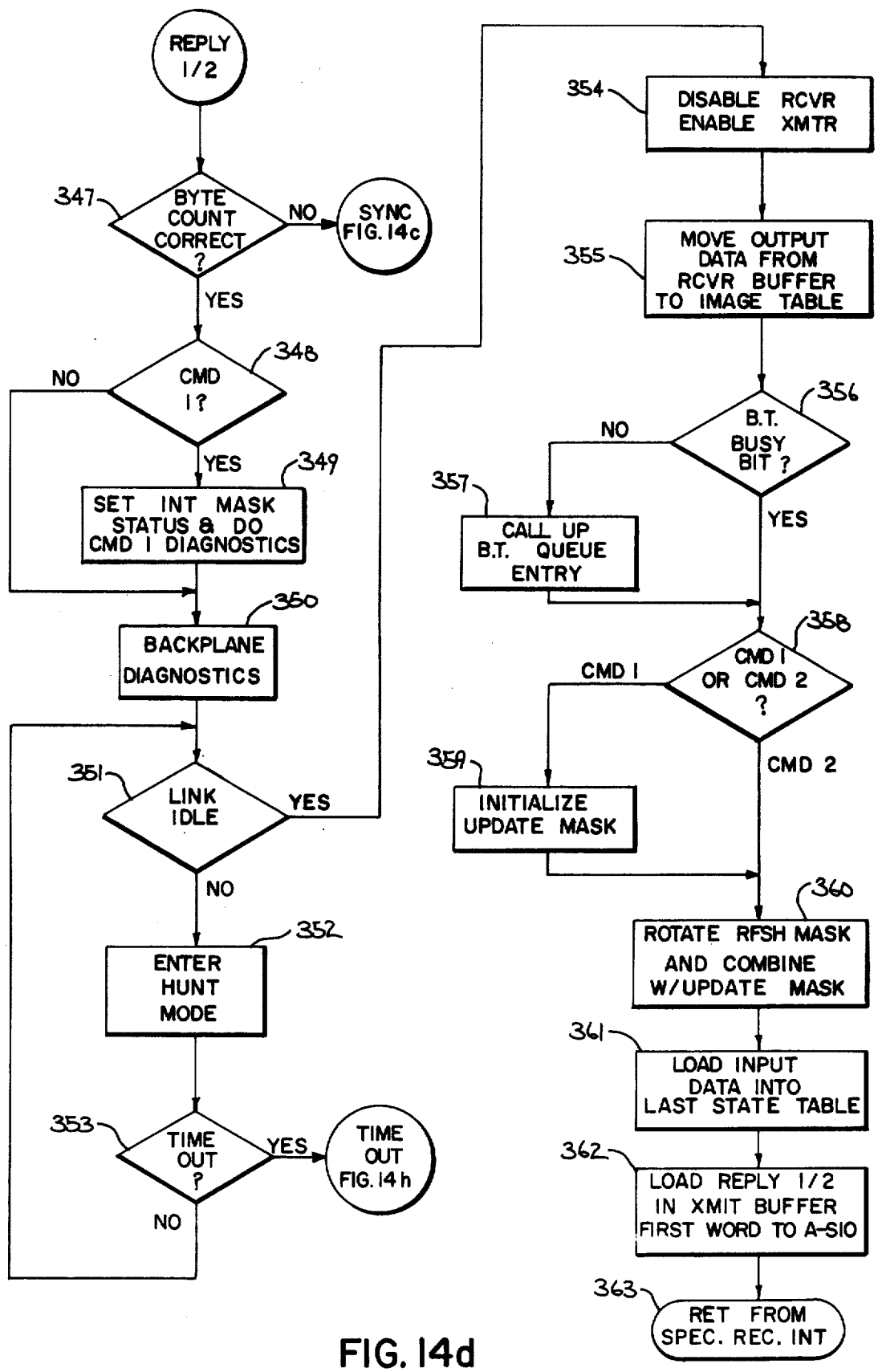

A technical problem to be considered with the hardware of the preferred embodiment is distinguishing bits in a closing flag segment of a message from bits in an opening flag segment of the next message. To obtain synchronization of the receiver to incoming messages, a watchdog timer is provided to assure that the serial data link is idle for a short period before setting a synchronization status bit. This bit is examinined by executing an instruction represented by decision block 343 in FIG. 14c to see whether a synchronization has been achieved. If not, various error status flags are examined as represented by process block 344. After checking for synchronization or various possible errors, the A-SIO receiver is re-enabled as represented by process block 345. The processor 23b then returns from the special receive interrupt as represented by terminal block 346.

Where a Command 1 or Command 2 is detected in decision blocks 339 or 340, respectively, the sequence represented in FIG. 14d is executed. The processor 23b begins by confirming that the expected number of bytes in the message have been received as represented by decision block 347. If the byte count cannot be verified, the processor 23b returns to the SYNC sequence in FIG. 14c. Where a Command 1 is detected by executing instructions represented by decision block 348, the processor initializes an input change mask and performs diagnostics, as represented by process block 349. These diagnostics are performed in response to a Command 1 message, because such a message is used in restarting communication with the adapter 23. As represented by process block 350, where the command word is a Command 1 or a Command 2 a backplane diagnostics sequence is then executed. Before assembling a reply message, the processor 23b must assure that the link has been idle for the short time period, thereby also assuring the correct interpretation of flags at the beginning and end of the incoming message frame. If the result of executing instructions represented by decision block 351 is negative, the processor 23b enters the hunt mode by executing instructions to direct the A-SIO to this mode of operation, as represented by process block 352. The processor 23b will stay in this mode until an idle communication link can be confirmed through decision block 351 or until the detection of a time out in executing decision block 353. Such a time out signal would cause the processor 23b to jump out of the hunt mode loop, and proceed to the time out sequence in FIG. 14h.

Figure 14E:
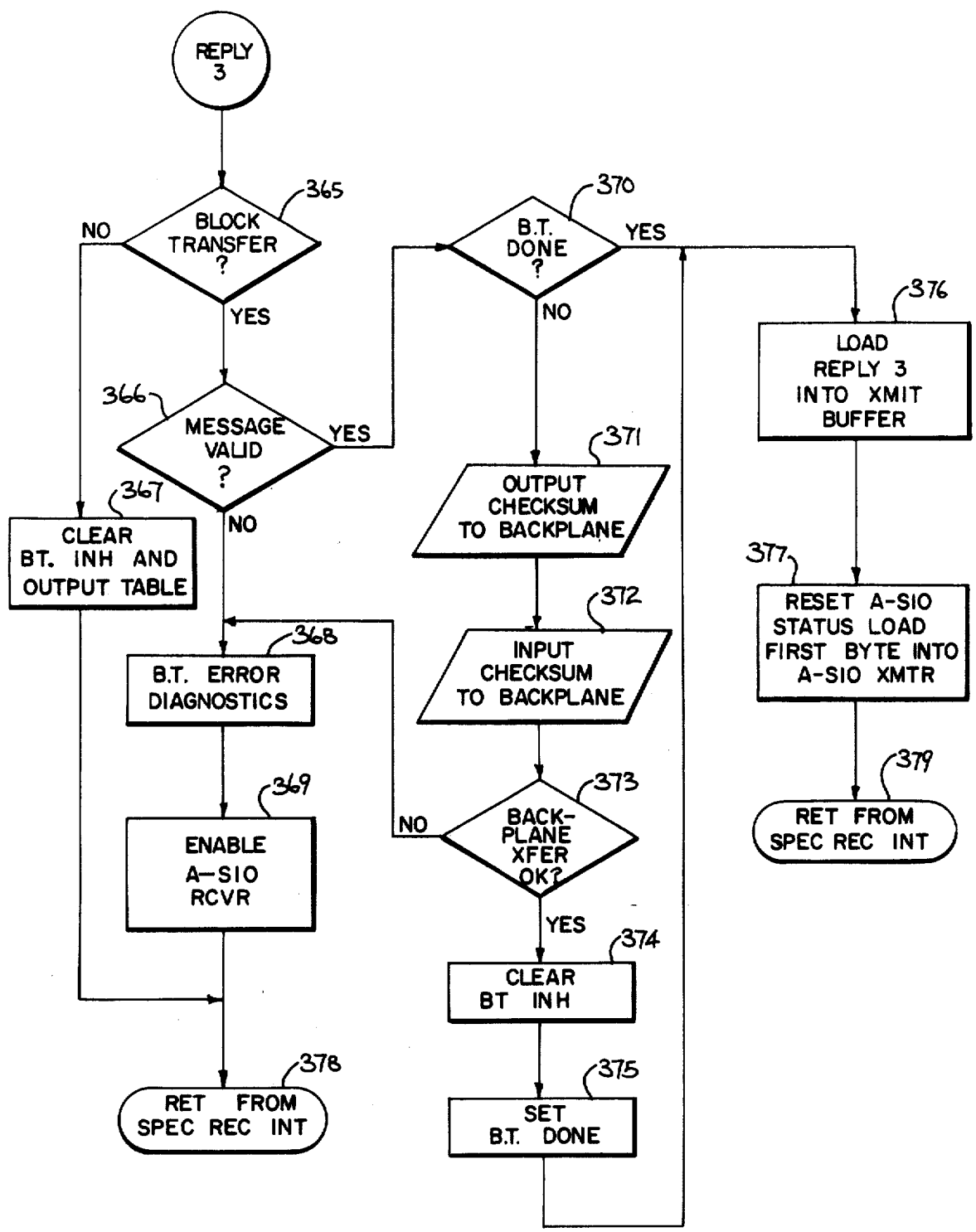

After making the diagnostic and other checks represented in blocks 347–351, the adapter processor disables the A-SIO receiver and enables the A-SIO transmitter for transmitting a reply message. The processor 23b executes instructions represented by process block 354 to send the appropriate hardware commands to the A-SIO. The adapter processor 23b then moves output status data, which was coupled to the adapter RAM 23c from the incoming message, to the output image table 23d seen in Appendix C, as represented by process block 355. Next, the processor 23b examines the command word for the block transfer "busy" bit as represented by decision block 356. If a block transfer "not busy" bit is received instead, the processor 23b calls up the entry at the head of the block transfer queue, as represented by process block 357. This entry contains the address of the next high density I/O module to be serviced as well as the second MSW which has been previously coupled to the adapter 23 from the requesting module. After this has been done, the processor again checks a status flag resulting from execution of block 344 to see whether the replay will be responding to a Command 1 meassage or a Command 2 message, and this check is represented by decision block 358. For generating a reply to a Command 1 message, the adapter processor 23b will initialize an update mask as represented by process block 359. This step is not necessary in responding to the Command 2 message as the response will have been made to a Command 1 message in an earlier cycle of the program. For either message, the adapter processor 23b adjusts a rotating bit in a refresh mask word and combines that word with the update or change mask word, as represented by process block 360. The update or change mask is formed by comparing inputs in the adapter image table 23e with status data in a last state image table beginning at line 10FO(H) of the adapter RAM 23c as seen in Appendix C. As represented by process block 361, the data in the input image table 23e is then transferred to the adapter LAST STATE IMAGE table to provide last state information for the next Reply 2 sequence. Finally, the adapter processor 23b loads the appropriate reply word, the resultant mask word and the input data into the transmitter buffer of the adapter RAM 23c, and then loads the first word of the reply message into the A-SIO transmitter, as represented by process block 362. The processor 23b than returns from the special receive interrupt sequence, of which this last described sequence is a part, as represented by terminal block 363. The message data will be transmitted from cycling through a transmit buffer empty interrupt sequence which will be described in relation to FIG. 14g. Each time a word is transmitted, an interrupt signal will be generated to the processor 23b and another word will be loaded into the A-SIO transmitter for transmission to the scanner 31.

Where a Command 3 word is detected in decision block 341, the sequence represented in FIG. 14e is executed. The processor 23b confirms block transfer status as represented by decision block 365 and then executes instructions to determine whether a valid message has been received as represented by decision block 366. Where a block transfer is not confirmed, the inhibit word in the block transfer inhibit (BTINH) table is cleared as represented by process block 367 and the interrupt routine is exited through terminal block 378. Where the processor 23b finds that the message is not valid as a result of executing decision block 366, it proceeds to execute instructions in a block transfer error diagnostics sequence represented by process block 368. Upon completion of these diagnostics, the A-SIO receiver is enabled as represented by process block 369 and the processor 23b returns from the special receive interrupt as represented by terminal block 378.

Still referring to FIG. 14e, assuming that a valid message is detected through execution of decision block 366, a further check is made, as represented by decision block 370 to see whether the block transfer data has been coupled to the high density I/O module. If all of the received block transfer data has been coupled, a received checksum is output to the high density module through the backplane as represented by I/O block 371. Next, a checksum is coupled from the module, as represented by I/O block 372, and this checksum is examined to confirm a valid checksum transfer to the high density module as represented by decision block 373. If a valid checksum transfer cannot be confirmed, the processor performs block transfer error diagnostics represented by process block 368 and proceeds to return from the interrupt. Assuming that a successful block transfer to the high density I/O module has been accomplished, the corresponding line in the block transfer inhibit table of the adapter RAM 23c is cleared as represented by process block 374 and a block transfer done flag is set as represented by process block 375. When the incoming Command 3 message data and checksum has been coupled to the high density I/O module, a Reply 3 message is loaded into the transmit buffer as represented by process block 376. As represented by process block 377, the status of the A-SIO is reset to prepare for transmission, and the first byte of the Reply 3 message is loaded into the A-SIO transmitter. The processor 23b then returns from the special receive interrupt sequence as represented by terminal block 379. The A-SIO will transmit the first byte of the Reply message and will generate a transmit buffer empty interrupt signal to the adapter processor 23b. In response to this signal, the adapter processor 23b will execute the sequence represented in FIG. 14g.

Figure 14F:
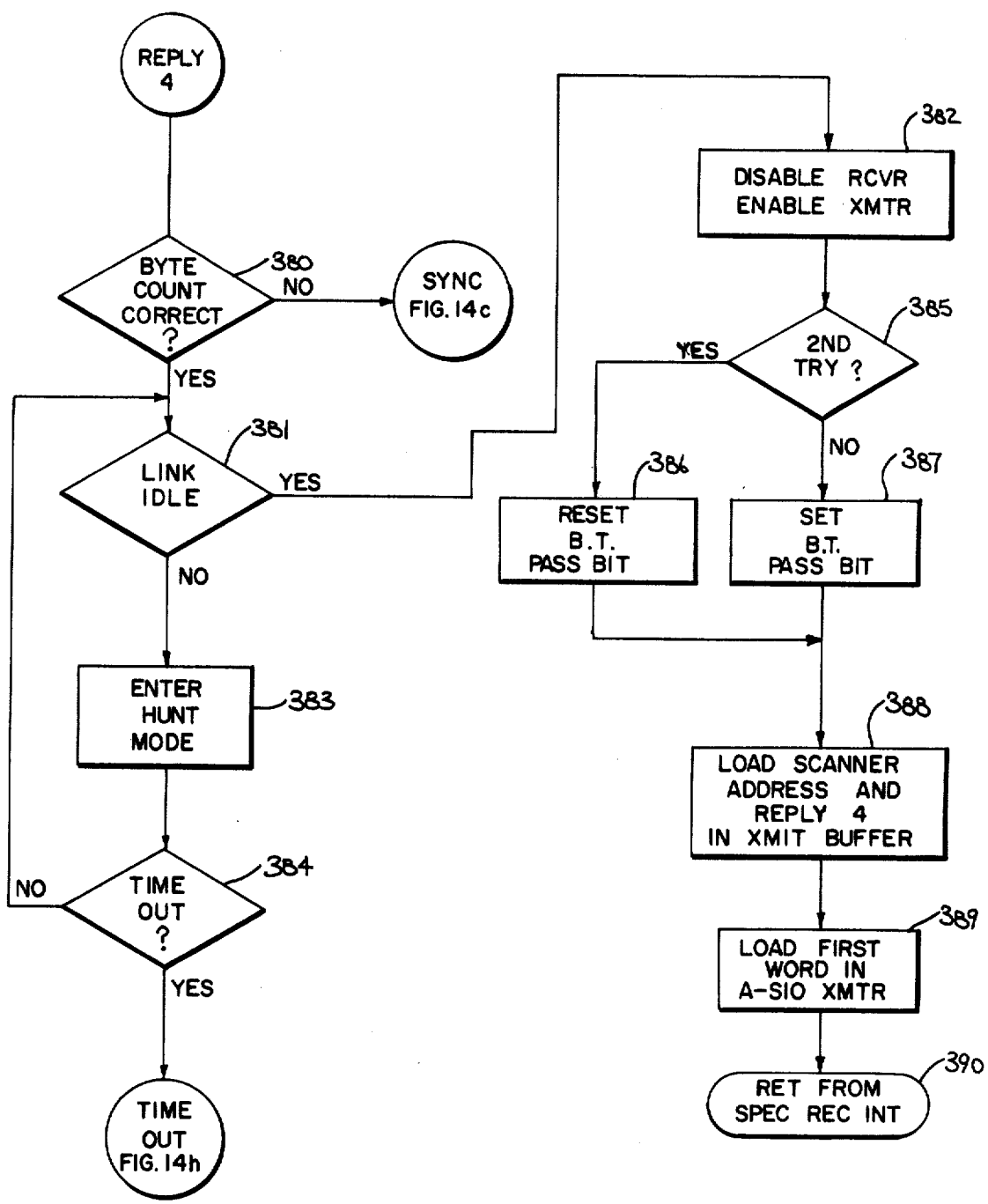

When a Command 4 message is detected in block 342 of FIG. 14c, the sequence represented in FIG. 14f is executed. First, the byte count for the incoming message is checked as represented by decision block 380 to assure that a valid Command 4 message has been received. Where this check fails, the processor returns to execute blocks 343–345 in FIG. 14c and returns from the interrupt. Next, the processor 23b examines a status flag to determine whether the serial data link 30B has been idle for a sufficient period as represented by decision block 381. If so, the receiver is disabled and the transmitter is enabled as represented by process block 382. Where the link has not been idle for requisite period, a hunt mode is entered as represented by process block 383, until a time out occurs as a result of executing instructions represented by decision block 384, or until the link is idle. Where a time out is diagnosed, the processor 23b jumps to a time out sequence in FIG. 14h. When the transmitter is enabled through execution of block 382, a block transfer pass bit is examined as represented by decision block 385. This test determines whether this is a first or second attempt to transmit a Reply 4 message. According to its status, the pass bit is toggled as represented by process blocks 386 and 387. The transmit buffer of the adapter RAM 23c is then loaded with a Reply 4 message, as represented by process block 388, and the first byte is loaded into the A-SIO transmitter as represented by process block 389. The processor 23b then returns from the special receive interrupt sequence as represented by terminal block 390, and awaits the transmit buffer empty interrupt signal to begin the sequence in FIG. 14g.

Figure 14G:
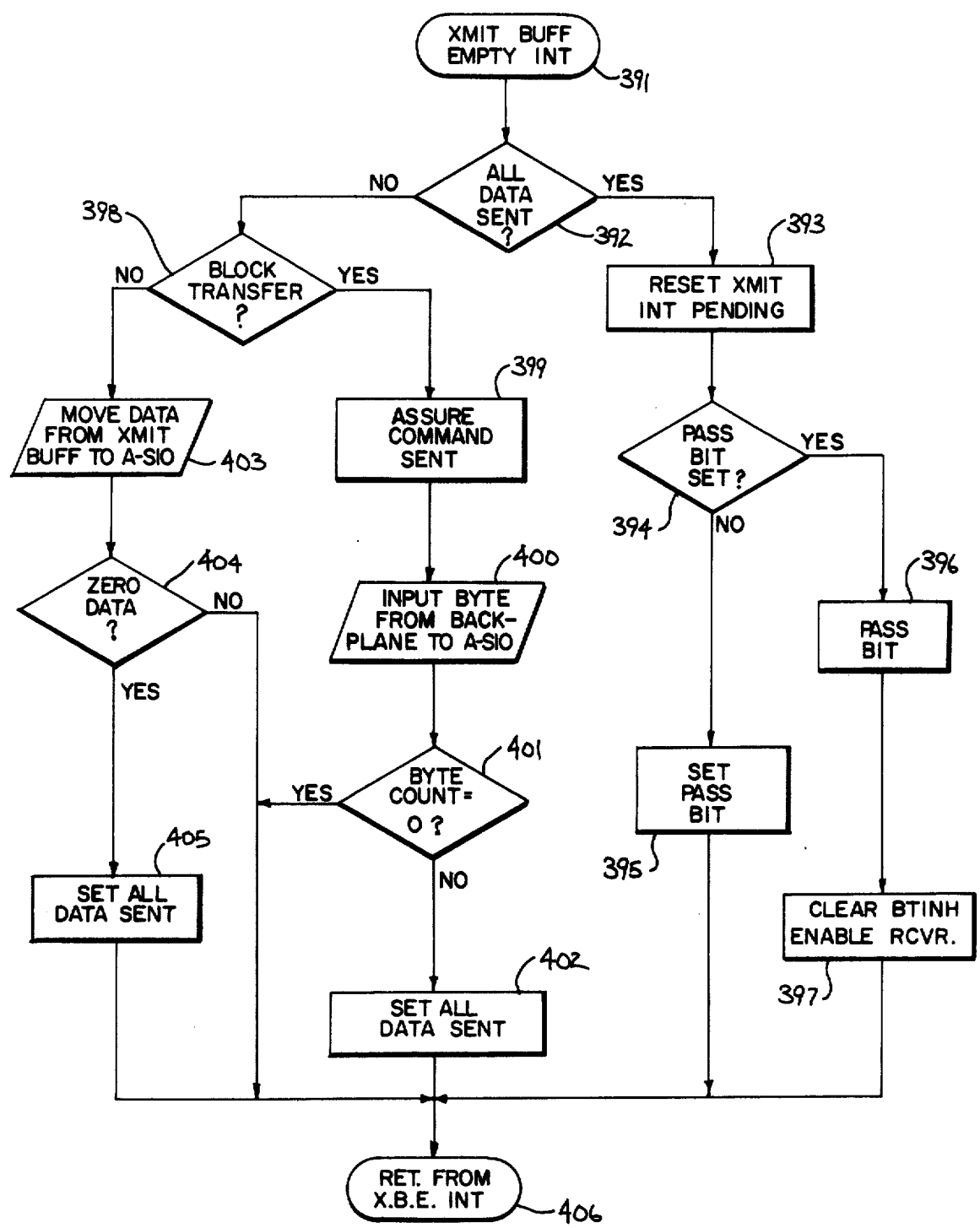

Referring to FIG. 14g, the beginning of the transmit buffer empty interrupt sequence is represented by start block 391. As represented by decision block 392, the processor 23b examines a flag to see whether all data in a reply message has been sent. If so, it issues a reset transmitter interrupt pending command which prevents further transmitter interrupts until after the next work has been loaded into the transmit buffer or until the CRC has completely sent, and this is represented by process block 393. A pass bit is then examined as seen in decision block 394. This bit is set on the first pass as represented by process block 395 and is reset on the second pass as represented by process block 396. On the second pass after a block transfer message has been sent, the block transfer inhibit table is cleared, and the A-SIO receiver is re-enabled as represented by process block 397.

Referring again to decision block 392 in FIG. 14g, where all data has not been sent, the processor 23b examines a block transfer status flag as represented by decision block 398. Where a block transfer is indicated, the processor 23b assures that the command word has been sent, as represented by process block 399. Next, as represented by I/O block 400, the processor 23b inputs a word of I/O status from the backplane to the transmit buffer of the A-SIO. The processor 23b then examines the byte (word) count as represented by decision block 401 and when the byte count reaches zero, the "all data sent" flag is set as represented by process block 402. Where a block transfer status is not indicated (i.e. conventional I/O data is being sent) as a result of executing decision block 398, the processor 23b points to the transmit buffer of the adapter RAM 23c and couples data from there to the transmitter of the A-SIO, as represented by I/O block 403. The processor 23b checks the data coupled through execution of block 403 and when a word with all zeroes has been detected, as a result of executing decision block 404, the "all data sent" flag is set as represented by process block 405 and the processor returns from the transmit buffer empty interrupt sequence as represented by terminal block 406.

Referring to FIG. 14h, communications over the serial data link 30B are monitored by the adapter processor 23b by execution of a CTC interrupt (CTC INT) sequence in response to an interrupt signal from the A-CTC. The beginning of this sequence is represented by start block 407. Thereafter, the processor 23b executes instructions represented by decision block 408 to detect a short time out. If the interrupt is not caused by a short time out, then it is a result of a communications time out and diagnostics are performed as represented by process block 409. Where the interrupt is generated by the short timeout, the processor 23b executes instructions to determine whether the link 30B is idle as represented by decision block 410. If the link 30B is not idle, the processor 23b re-enters the hunt mode and retriggers the short watchdog timer, as represented by process block 411. As represented by process block 412 where the link 30B is found to be idle, the communications watchdog timer is retriggered and the synchronization status bit is set to be read by the processor during the other interrupt routines mentioned above. Thereafter, the processor 23b executes an instruction to check for a communications watchdog timeout, as represented by decision block 413. When this occurs, the processor 23b performs diagnostics as represented by process block 409, otherwise, it returns from the CTC interrupt sequence, as represented by terminal block 414.

It will be apparent from the foregoing description that the intelligent adapter 23 cooperates with the scanner 31 to provide more powerful communication between a main processor 25b and remote I/O interfere racks 10 through block transfer of I/O status data associated with individual high density modules. The remote I/O aspects of this transfer have been provided without requiring significant added involvement of the user. The user chooses his system configuration, sets a number of rack switches accordingly and performs the minimal amount of user programming required to configure the image table and block transfer storage in the main memory, as with high density modules described in the U.S. Pat. No. 4,293,924, cited above. The hardware and firmware of the invention provide a favorable scan rate for both conventional I/O modules and high density modules. While the preferred apparatus for carrying out the invention has been described in detail it will be appreciated by those skilled in the art that modifications can be made without departing from the principles of the invention, and therefore the invention is not to be limited, except as expressed in the claims following Appendixes A–G. Appendixes A–D are reproduced herein while Appendixes E, F and G are firmware listings that have been submitted as 4 microfiche (85 pages) and thus cannot be printed. Appendix E contains the firmware listing for the parallel processor, and Appendix F contains the firmware listing for the serial processor, both of these processors being included in the scanner circuit. Appendix G contains the firmware listing for the processor in the adapter circuit.

APPENDIX A

MAP OF BLOCK TRANSFER MEMORY

| Par. Proc. Address (Hex) | Ser. Proc. Address (Hex) | Bit 7 | 6 | 5 | 4 | 3 | 2 | 1 | 0 | |
|---|---|---|---|---|---|---|---|---|---|---|
| 2000 | 7800 | $CH_7$ | $CH_6$ | $CH_5$ | $CH_4$ | $CH_3$ | $CH_2$ | $CH_1$ | $CH_0$ | Data Checksum |
| 2001 | 7801 (MAX.) (128) | $D_7$ | $D_6$ | $D_5$ | $D_4$ | $D_3$ | $D_2$ | $D_1$ | $D_0$ | Last Data Word (All B.T.) |
| 2081 | 7881 | $D_7$ | $D_6$ | $D_5$ | $D_4$ | $D_3$ | $D_2$ | $D_1$ | $D_0$ | First Data Word (Max. B.T.) |
| 20C8 | 78C8 | 0 | 0 | 0 | 0 | 0 | 0 | Diag. | B.T. | Inter-Processor Control Word S-P (TASKRQ) |
| 20C9 | 78C9 | INT W DOG | DBL NMI | NMI W DOG | UNK. | B.T. Error | PROM Fault | RAM Fault | Success | Inter-Processor Status Word P-S (RESULT) |
| 20CA | — | 0 | 0 | 0 | 0 | 0 | 0 | 0 | PGM ERR | Program Error Flag |
| 20CB | 78CB | 0 | $A_6$ | $A_5$ | $A_4$ | $A_3$ | $A_2$ | $A_1$ | $A_0$ | Interrupt Vector Address (BTSLOT) |
| 20CD | 78CD | R | W | $S_5$ | $S_4$ | $S_3$ | $S_2$ | $S_1$ | $S_0$ | Module Status Word (MSW) |
| 20CE | — | 0 | 0 | 0 | 0 | 0 | 0 | 0 | 0 | NMI Watchdog |
| 20CF | — | 0 | 1 | 0 | 1 | 1 | 0 | 1 | 0 | Counters |

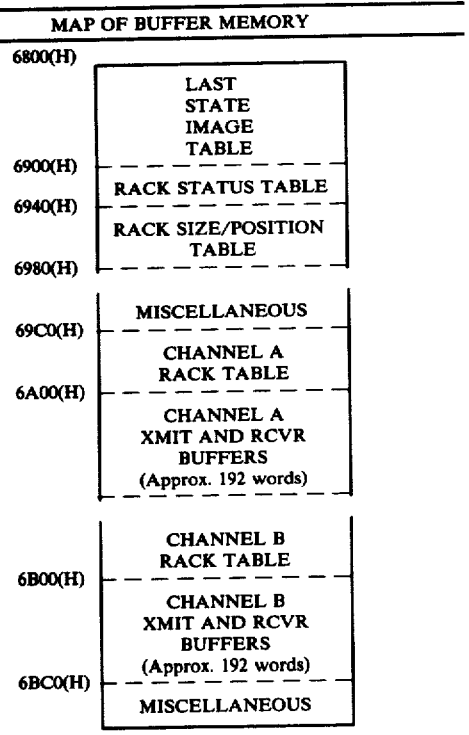

APPENDIX B
MAP OF BUFFER MEMORY

6800(H) — LAST STATE IMAGE TABLE
6900(H) — RACK STATUS TABLE
6940(H) — RACK SIZE/POSITION TABLE
6980(H) — MISCELLANEOUS
69C0(H) — CHANNEL A RACK TABLE
6A00(H) — CHANNEL A XMIT AND RCVR BUFFERS (Approx. 192 words)
6B00(H) — CHANNEL B RACK TABLE
6B00(H) — CHANNEL B XMIT AND RCVR BUFFERS (Approx. 192 words)
6BC0(H) — MISCELLANEOUS

APPENDIX B-continued
MAP OF BUFFER MEMORY

APPENDIX C
MAP OF ADAPTER RAM

```
10F0(H)
          ┌─────────────────────────────────┐
1100(H)   │     LAST STATE IMAGE TABLE      │
          ├─────────────────────────────────┤
1110(H)   │       B.T. INHIBIT TABLE        │
          │                                 │
1192(H)   ├─────────────────────────────────┤
          │   HARDWARE INTERRUPT VECTORS    │
11A0(H)   ├─────────────────────────────────┤
          │                                 │
1200(H)   │                                 │
1231(H)   ├─────────────────────────────────┤
1252(H)   │ POINTERS, COUNTERS, MASK AND STATUS │
          ├─────────────────────────────────┤
          │           RCVR BUFFER           │
          │        (Approx. 129 words)      │
12D3(H)   ├─────────────────────────────────┤
          │           XMIT BUFFER           │
1300(H)   │        (Approx. 129 words)      │
          ├─────────────────────────────────┤
          │                                 │
139A(H)   ├─────────────────────────────────┤
          │           B.T. QUEUE            │
          │              AND                │
          │            POINTERS             │
13C0(H)   ├─────────────────────────────────┤
          │       OUTPUT IMAGE TABLE 23d    │
13D0(H)   ├─────────────────────────────────┤
          │       INPUT IMAGE TABLE 23e     │
13DF(H)   └─────────────────────────────────┘
```

APPENDIX D
COMPONENT APPENDIX

| Component | Ref. Nr. | Manufacturer's Chip Description |
|---|---|---|
| serial processor | 31d | Z80A-CPU manufactured by Zilog, Inc. |
| parallel processor | 31b | Z80A-CPU manufactured by Zilog, Inc. |
| I/O memory | 31a | Two 6561 256-line × 4-bit random access memories manufactured by Harris Corp. |
| buffer memory | 31e | Two P2114A-4 1k × 4-bit random access memories manufactured by Intel Corp. |
| block transfer memory | 31c | Two 6561 256-line × 4-bit random access memories manufactured by Harris Corp. |
| serial processor program memory | S-PROM | Three 82S181 1k × 8-bit programmable read only memories manufactured by Signetics |
| parallel processor program memory | P-PROM | SN74S472 512-line × 8-bit programmable read only memory manufactured by Texas Instruments, Inc. |
| buffers | BUF1, BUF3 | Two SN74LS240 octal buffers/ line drivers/ line receivers with inverted three state outputs manufactured by Texas Instruments, Inc. |
| buffers | BUF4, BUF5, 111, 112 | Four SN74LS244 octal buffers/ line drivers/ line receivers with non-inverted three state outputs manufactured by Texas Instruments, Inc. |
| buffers | BUF2, BUF6, BUF7, 114 | Four 8304 octal bidirectional buffers/line drivers manufactured by National Semiconductor, Inc. |
| bidirectional latch | 65 | Two 2907 quad bus transceivers manufactured by Advanced Micro Devices, Inc. |
| address latch | 66 | SN74LS374 octal D-type flip-flops manufactured by Texas Instruments, Inc. |
| comparator | 67 | SN25LS2521 8-bit comparator manufactured by Texas Instruments, Inc. |
| flip-flops | 38, 39, 40, 68, 83, 95, 113 | Four SN74LS74 dual D-type positive edged triggered flip-flops manufactured by Texas Instruments, Inc. |
| divide by 5 counter | 82 | Two SN74LS290 decade counters manufactured by Texas Instruments, Inc. |
| divide by 2 counter | 110 | |
| scanner counter/ timer circuit | CTC | Z80-CTC counter/ timer circuit manufactured by Zilog, Inc. |
| scanner serial input/output circuit | SIO | Z80-SIO serial input/output circuit manufactured by Zilog, Inc. |
| multivibrators | MV$_1$, MV$_2$, MV$_3$, MV$_4$ | Two SN74LS221 dual monostable multivibrators manufactured by Texas Instruments, Inc. |
| NAND gates | 43, 44, 48, 99, 105 | Two SN74LS00 quad two-input NAND gates manufactured by Texas Instruments, Inc. |
| OR gates | 41, 44, 45, | Three SN74LS32 |

APPENDIX D-continued
COMPONENT APPENDIX

| Component | Ref. Nr. | Manufacturer's Chip Description |
|---|---|---|
| | 49, 79, 106, 107 | quad two-input OR gates manufactured by Texas Instruments, Inc. |
| NOR gates | 47, 69, 73, 80 | Two quad two-input NOR gates manufactured by Texas Instruments, Inc. |
| EX OR gates | 50, 84, 87, 96, 97 | Two SN74LS86 quad two-input exclusive OR gates manufactured by Texas Instruments, Inc. |
| inverters | 51, 90 | SN7404 hex inverters manufactured by Texas Instruments, Inc. |
| three-line to eight-line decoders | 70, 75, 76, 104 | Three SN74LS138 three-to-eight-line decoders/multiplexers manufactured by Texas Instruments, Inc. |
| NAND gates | 86, 88 | SN75452 dual two-input NAND gate drivers manufactured by Texas Instruments, Inc. |
| line receiver | 94 | AM26LS32 line receiver manufactured by Advanced Micro Devices, Inc. |
| four bit up/down counter | 100 | SN74LS193 up/down dual clock counter manufactured by Texas Instruments, Inc. |
| adapter processor | 23b | Z80A-CPU manufactured by Zilog, Inc. |
| adapter counter/ timer circuit | A-CTC | Z80-CTC counter/timer circuit manufactured by Zilog, Inc. |
| adapter serial input/output circuit | A-SIO | Z80-SIO serial input/output circuit manufactured by Zilog, Inc. |
| four-to-sixteen line decoder | 102 | SN74154 four-line to sixteen-line decoder/demultiplexer manufactured by Texas Instruments, Inc. |
| adapter program memory | A-PROM | 82S181 1k × 8-bit programmable read only memory manufactured by Signetics |
| adapter RAM | 23c | Two P2114A-4 1k × 4-bit random access memories manufactured by Intel Corp. |

We claim:

1. A remote I/O interface for a digital controller of the type having a main processor for executing a control program to examine and determine I/O status data, memory means associated with the main processor for storing a multiword block of I/O status data, and a plurality of I/O interface racks each adapted to hold a plurality of I/O modules that are responsive to I/O status data to sense and control the status of I/O devices connected to a controlled system, at least one of the I/O interface racks holding a high density I/O module operable to couple a multiword block of I/O status data to or from a group of I/O devices, wherein the remote I/O interface comprises:

a serial data link extending from a proximate end near the main processor to a plurality of remote ends at respective I/O interface racks;

an adapter circuit disposed in the I/O interface rack with the high density I/O module, the adapter circuit including first adapter means, electrically connected to the I/O modules, for detecting a block transfer request signal from the high density I/O module in response to coupling I/O module address signals and control signals to the I/O modules in a scanning sequence, second adapter means, electrically coupled to the first means and to one of the distal ends of the serial data link, for coupling the block transfer request signal to the serial data link together with adapter address signals identifying the adapter circuit, and third adapter means, coupled to the serial data link through the second adapter means, for receiving a block transfer command message and responsive thereto for transmitting a block transfer reply message, the third adapter means also being coupled to the high density I/O module for coupling the multiword block of I/O status data, which is included in one of the messages, between the high density I/O module and the serial data link; and a scanner circuit coupled between the main processor and the proximate end of the serial data link, the scanner circuit including first scanner means, electrically connected to the proximate end of the serial data link, for detecting the block transfer request signal and the address signals identifying the adapter circuit from which the block transfer request signal is coupled, the first scanner means being responsive to the block transfer request signal to transmit the block transfer command message through the serial data link to the third adapter means and to receive the block transfer reply message from the third adapter means to couple the multiword block of I/O status data through the serial data link, and second scanner means, coupled to the memory means that is associated with the main processor and coupled through the first scanner means to the proximate end of the serial data link, for cooperating in the transfer of the multiword block of I/O status data between the first scanner means and the memory means associated with the main processor, thereby providing the digital controller with the capability of executing block transfers to and from the high density I/O module in whichever one of the I/O interface racks it is disposed.

2. The remote I/O interface of claim 1, wherein the multiword block of I/O status data is a multiword block of output status data, and wherein the third adapter means couples each word in the multiword block of output status data to the high density I/O module in response to the receipt of a successive word in the multiword block of output status data.

3. The remote I/O interface of claim 1, wherein the multiword block of I/O status data is a multiword block of input status data, and wherein the third adapter means couples each word in the multiword block of input status data to the serial data link before a successive word in the multiword block of input status data is coupled from the high density I/O module.

4. The remote I/O interface of claim 1, wherein:
the second adapter means couples address signals identifying the location in which the high density I/O module is disposed within the I/O interface rack to the serial data link together with the adapter address signals to form a block transfer address; and
wherein the first scanner means includes
third scanner means for storing the multiword block of I/O status data;
fourth scanner means, electrically connected to the proximate end of the serial data link and to the third scanner means, the fourth scanner means being responsive to the block transfer request signal received through the serial data link for coupling the block transfer address and the multiword block of I/O status data between the serial data link and the third scanner means and the fourth scanner means being further responsive to the block transfer request signal for generating an interrupt signal; and
wherein the second scanner means is electrically connected to the main processor and to the third scanner means and is responsive to the interrupt signal from the first scanner means to read the block transfer address from the third scanner means, the second scanner means being further responsive to a matching address generated by the main processor to cooperate with the main processor in coupling the multiword block of I/O status data between the third scanner means and the memory means associated with the main processor.

5. The remote I/O interface of claim 1, wherein the first scanner means includes means for coupling a block transfer "not busy" signal over the serial data link to the second adapter means; and
wherein the second adapter means couples the block transfer request signal over the serial data link in response to the block transfer "not busy" signal.

6. The remote I/O interface of claim 5, wherein the response of the first scanner means to the block transfer request signal includes repeatedly coupling a block transfer busy signal to the second adapter means until the block transfer has been executed for the high density I/O module originating the block transfer request signal.

7. The remote I/O interface of claim 6, wherein:
the I/O interface rack with the high density I/O module also holds a second high density I/O module; and
wherein the second adapter means includes means for saving address signals identifying the location of the second high density I/O module within the rack in response to (i) receipt of a block transfer request signal from the second high density I/O module, and (ii) receipt of a block transfer busy signal from the first scanner means.

8. A remote I/O interface for a digital controller of the type having a main processor for executing a control program to examine and determine I/O status data, having memory means associated with the main processor for storing a first control word that defines a direction of I/O transfer and the size of a multiword block of I/O status data stored in said memory means and having a plurality of I/O interface racks each adapted to hold a plurality of I/O modules that are responsive to I/O status data to sense and control the status of I/O devices connected to a controlled system, at least one of the I/O interface racks holding a high density I/O module that stores a second control word which confirms the direction of I/O transfer and the size of the multiword block of I/O status data to be coupled to said memory means, wherein the remote I/O interface comprises:
a serial data link extending from a proximate end near the main processor to a plurality of remote ends at respective I/O interface racks;
adapter circuit means disposed in the I/O interface rack with the high density I/O module, coupled to a respective remote end of the serial data link and adapted to be coupled to other I/O modules disposed in the I/O interface rack with the high density I/O module, for executing an I/O scan sequence in which individual words of I/O status data are coupled to and from the I/O modules, except for the high density I/O module to which the first control word is coupled, and in which a block transfer request signal and the second control word are coupled from the high density I/O module to the serial data link in response to the coupling of the first control word, the adapter circuit means includes means thereafter responsive to a command message received through the serial data link for coupling a reply message to the serial data link, wherein a block of output status data is received in the command message and is coupled to the high density I/O module, or wherein a block of input status data is coupled from the high density module and incorporated in the reply message, according to the direction of I/O transfer determined by the first and second control words; and
scanner circuit means, electrically connected to the main processor and to the memory means associated with the main processor, for coupling blocks of I/O status data to and from said memory means, the scanner circuit means also being electrically to the proximate end of the serial data link, for executing an I/O scan sequence of the I/O interface racks in which I/O status data is coupled through the serial data link, the scanner circuit means being responsive to the receipt of the block transfer request signal from the adapter circuit means to couple the second control word to the main processor and to couple a multiword block of I/O status data between the memory means associated with the main processor and the serial data link, the scanner circuit means coupling the multiword block of I/O status data to the serial data link in the command message or receiving the block of I/O status data in a responsive reply message from the adapter circuit means, according to the direction of I/O transfer determined by the first and second control words.

9. The remote I/O interface of claim 8, wherein the multiword block of I/O status data is a multiword block of output status data, and wherein the adapter circuit means couples each word in the multiword block of output status data to the high density I/O module in response to receipt of a successive word in the multiword block of output status data.

10. The remote I/O interface of claim 8, wherein the multiword block of I/O status data is a multiword block of input status data, and wherein the adapter circuit means couples each word in the multiword block of input status data to the serial data link before a successive word in the multiword block of input status data is coupled from the high density I/O module.

11. The remove I/O interface of claim 8, wherein:
the main processor executes a main I/O scan sequence in which a series of multibit address signals are coupled to the scanner circuit means;
wherein the adapter circuit means couples address signals to the scanner circuit means identifying a location in which the high density I/O module is disposed within the I/O interface rack, the address signals being coupled in response to the coupling of the first control word to the high density I/O module; and
wherein the scanner circuit means includes a comparator means and means for coupling the address signals identifying the location of the high density I/O module to the comparator means, the comparator means being electrically connected to the main processor to receive matching address signals generated by the main processor during execution of the main I/O scan sequence, and the comparator means generating interrupt signals to the scanner means and to the main processor to initiate the coupling of the multiword block of I/O status data therebetween.

12. The remote I/O interface of claim 8, wherein the scanner circuit means includes means for coupling a block transfer "not busy" signal over the serial data link to the adapter circuit means in the I/O interface rack with the high density I/O module; and
wherein the adapter circuit means generates the block transfer request signal in response to the block transfer "not busy" signal.

13. The remote I/O interface of claim 8, wherein the response of the scanner circuit means to the block transfer request signal includes coupling block transfer busy signals to the adapter circuit means until the block transfer has been executed for the high density I/O module originating the block transfer request signal.

14. The remote I/O interface of claim 8, wherein:
two of the I/O modules in the I/O interface rack are high density I/O modules; and
wherein the adapter circuit means includes means for saving address signals identifying a location in which one of the high density I/O modules is disposed, such address signals being saved in response to receipt of a block transfer request signal from the high density I/O module disposed in that location and receipt of a block transfer busy signal from the scanner circuit means.

15. A remote I/O interface for a digital controller of the type having a main processor and having memory means associated with the main processor for storing a first control word and a multiword block of I/O status data, the controller also having a plurality at I/O interface racks each adapted to hold a plurality of I/O modules that are responsive to I/O status data to sense and control the status of I/O devices connected to a controlled system, at least one of the I/O interface racks holding a high density I/O module which stores a second control word to acknowledge the first control word and which is operable to couple the multiword block of I/O status data to or from a group of I/O devices, wherein the remote I/O interface comprises:
a serial data link extending from a proximate end near the main processor to a plurality of remote ends at respective I/O interface racks;
a scanner circuit having a scanner data link interface circuit electrically connected to the proximate end of the serial data link and having scanner processor means electrically connected to the scanner data link interface circuit and cooperable therewith for periodically coupling the first control word from the memory means associated with the main processor to the serial data link together with a block transfer "not busy" signal and for receiving in response a block transfer request signal, the second control word and address signals associated with the high density I/O module;
the scanner processor means also includes means cooperable with the scanner data link interface circuit and responsive to the block transfer request signal for transmitting a block transfer command message over the serial data link and for receiving in response a block transfer reply message; and
the scanner processor means also includes means coupled to the memory means that stores the multiword block of I/O status data and being cooperable with the scanner data link interface circuit for coupling the multiword block of I/O status data in an output direction from the memory means to the serial data link as part of the block transfer command message or for coupling the multiword block of I/O status data received as part of the block transfer reply message in an input direction to the memory means, according to the output direction or input direction of the I/O status data coupling; and
an adapter circuit having processor means electrically connected to the high density I/O module for periodically coupling address signals to the high density I/O module and detecting a responsive block transfer request signal that is then associated with such address signals,
the adapter circuit also having an adapter data link interface circuit electrically connected between the adapter processor means and the serial data link, the adapter processor means and the adapter serial data link interface circuit being cooperable for coupling the block transfer request signal, the address signals associated therewith and the second control word to the serial data link in response to the block transfer "not busy" signal received through the serial data link,
the adapter processor means and the adapter data link interface circuit being further responsive to the block transfer command message received through the serial data link to transmit the block transfer reply message and couple the multiword block of I/O status data to or from the high density I/O module, according to the output or input direction of I/O status data coupling.

16. The remote I/O interface of claim 15, wherein the multiword block of I/O status data is a multiword block of output status data and wherein the adapter processor means couples each word in the multiword of output status data to the high density I/O module in response to the receipt of a successive word in the multiword block of output status data.

17. The remote I/O interface of claim 15, wherein the multiword block of I/O status data is a multiword block of input status data, and wherein the adapter processor means couples each word in the multiword block of input status data to the serial data link before a successive word in the multiword block of input status data is coupled from the high density I/O module.

18. The remote I/O interface of claim 15, wherein the scanner processor means is responsive to the detection of a block transfer request signal from the adapter processor means to couple block transfer busy signals to the adapter processor means until the multiword block of I/O status has been coupled between the high density I/O module and the scanner processor means.

19. A remote I/O interface for interconnection between a main processor and a plurality of I/O modules that includes a plurality of single-word capacity I/O modules and a multiword capacity I/O module, the I/O modules being responsive to I/O status data to sense and control the status of I/O devices connected to a controlled machine, the main processor executing a control program to examine and determine I/O status data, the main processor also being operable to execute a local I/O scan sequence to sequentially couple words of I/O status data to or from the single-word capacity I/O modules, and the main processor also being operable to modify the local I/O scan to couple a multiword block of I/O status data to or from the multiword capacity I/O module, the remote I/O interface comprising:

a scanner circuit having first memory means adapted to be connected to the main processor for storing the words of I/O status data coupled during the local I/O scan sequence, the scanner circuit having second memory means adapted to be connected to the main processor for storing the multiword block of I/O status data that is coupled when the main processor modifies the local I/O scan sequence, the scanner circuit also having a serial data link interface circuit and the scanner circuit having scanner processor means for coupling first and second pairs of serial data messages through the serial data link interface circuit, one of the first pair of serial data messages including words of I/O status data associated with the single-word capacity I/O modules, and one of the second pair of serial data messages including a multiword block of I/O status data associated with the multiword capacity I/O module;

an adapter circuit having adapter memory means for storing words of I/O status data associated with the single word capacity I/O modules, having an adapter data link interface circuit, and having adapter processor means coupled to the adapter data link interface circuit to receive the first and second pairs of serial data messages, the adapter processor means being connected to the adapter memory means and being adapted to be connected to the single-word capacity I/O modules and to the multiword capacity I/O module, the adapter processor means being operable to execute an adapter I/O scan sequence to sequentially couple words of I/O status data between the adapter memory means and respective single-word capacity I/O modules, and the adapter processor means being operable to modify its local I/O scan sequence to sequentially couple words of I/O status between the adapter data link interface circuit and the multiword capacity I/O module; and a serial data link for connecting the scanner data link interface circuit to the adapter data link interface circuit to carry the first and second pairs of serial data messages.

* * * * *

UNITED STATES PATENT AND TRADEMARK OFFICE
CERTIFICATE OF CORRECTION

PATENT NO. : 4,413,319

DATED : November 1, 1983

INVENTOR(S) : Ronald E. Schultz et al

It is certified that error appears in the above—identified patent and that said Letters Patent is hereby corrected as shown below:

In column 1, line 35, "adapted" should be --adapter--.

In column 1, line 43, the first appearance of "to" should be --of--.

In column 2, lines 24-38 and lines 40-53 should not be indented.

In column 4, line 4, "filmware" should be --firmware--.

In column 5, line 35, "interfere" should be --interface--.

In column 6, line 33, "preserves" should be --provides--.

In column 6, line 68, before "high", the word "a" should be --the--.

In column 8, line 4, "avaiable" should be --available--.

In column 9, line 17, "FIGS. 1-6" should be --FIGS. 4-6--.

In column 9, line 27, "Q" should be --$\bar{Q}$--.

In column 9, line 30, "Q" should be --$\bar{Q}$--.

In column 9, line 51, "Q" should be --$\bar{Q}$--.

In column 9, line 56, "Q" should be --$\bar{Q}$--.

In column 10, line 37, "Q" should be --$\bar{Q}$--.

UNITED STATES PATENT AND TRADEMARK OFFICE
CERTIFICATE OF CORRECTION

PATENT NO. : 4,413,319

DATED : November 1, 1983

INVENTOR(S) : Ronald E. Schultz et al

It is certified that error appears in the above—identified patent and that said Letters Patent is hereby corrected as shown below:

In column 11, line 32, --a-- should appear before "flip-flop 68".

In column 12, line 9 "AN" should be --AND--.

In column 15, line 26, "23a" should be --23i--.

In column 15, line 36, "Q" should be --$\overline{Q}$--.

In column 15, line 42, --(-- should be inserted before "SEN".

In column 16, Table 3, line 44, --Slot-- should be inserted before "6".

In column 19, line 15, "Done" should be --DONE--.

In column 25, line 23, "return" should be --returns--.

In column 31, line 67, "bbits" should be --bits--.

In column 32, line 46, "flow" should be --fly--.

In column 32, line 59, "routine" should be --routines--.

In column 34, line 43, "replay" should be --reply--.

UNITED STATES PATENT AND TRADEMARK OFFICE
CERTIFICATE OF CORRECTION

PATENT NO. : 4,413,319

DATED : November 1, 1983

INVENTOR(S) : Ronald E. Schultz et al

It is certified that error appears in the above—identified patent and that said Letters Patent is hereby corrected as shown below:

In column 34, line 43, "meassage" should be --message--.

In column 36, line 33, "work" should be --word--.

In column 44, line 54, --connected-- should be inserted after "electrically".

Signed and Sealed this

Twenty-first Day of February 1984

[SEAL]

Attest:

GERALD J. MOSSINGHOFF

*Attesting Officer*  *Commissioner of Patents and Trademarks*